(12) United States Patent
Banba et al.

(10) Patent No.: US 10,164,487 B2
(45) Date of Patent: Dec. 25, 2018

(54) MOTOR, METHOD FOR MANUFACTURING MAGNETIC PLATE, AND METHOD FOR MANUFACTURING STATOR

(71) Applicant: ASMO CO., LTD., Shizuoka-ken (JP)

(72) Inventors: Tatsunori Banba, Hamamatsu (JP); Hiroshi Katai, Okazaki (JP); Yuusuke Tateishi, Kosai (JP); Yuuji Yamashita, Toyohashi (JP); Takumi Suzuki, Toyohashi (JP); Kenji Obata, Kosai (JP); Yoshimasa Kinpara, Toyohashi (JP); Takashi Nagaya, Kosai (JP)

(73) Assignee: ASMO CO., LTD., Shizuoka-ken (JP)

( * ) Notice: Subject to any disclaimer, the term of this patent is extended or adjusted under 35 U.S.C. 154(b) by 1120 days.

(21) Appl. No.: 14/162,536

(22) Filed: Jan. 23, 2014

(65) Prior Publication Data

US 2014/0210284 A1  Jul. 31, 2014

(30) Foreign Application Priority Data

Jan. 28, 2013  (JP) ................. 2013-013339
Jan. 28, 2013  (JP) ................. 2013-013342
(Continued)

(51) Int. Cl.
*H02K 1/16* (2006.01)
*H02K 15/03* (2006.01)
(Continued)

(52) U.S. Cl.
CPC ............. *H02K 1/16* (2013.01); *H02K 1/185* (2013.01); *H02K 1/278* (2013.01); *H02K 3/28* (2013.01);
(Continued)

(58) Field of Classification Search
CPC .......... H02K 1/16; H02K 1/185; H02K 1/278; H02K 15/024; H02K 15/03; H02K 3/28;
(Continued)

(56) References Cited

U.S. PATENT DOCUMENTS

2004/0041491 A1  3/2004  Gorohata et al.
2005/0086678 A1  4/2005  Miyamori et al.
(Continued)

FOREIGN PATENT DOCUMENTS

CN  101951104 A  1/2011
CN  102857045 A  1/2013
(Continued)

OTHER PUBLICATIONS

Japanese Office Action of JP 2013-013347, dated Apr. 26, 2016 along with its English Translation.
(Continued)

*Primary Examiner* — Bernard Rojas
*Assistant Examiner* — Rashad H Johnson
(74) *Attorney, Agent, or Firm* — Christensen, Fonder, Dardi & Herbert PLLC

(57) ABSTRACT

A motor includes a rotation shaft, a stator, and a rotor. The stator includes an armature winding and a stator core including a main core portion with an axial stack of core sheets and a magnetic plate on an end thereof. Each core sheet includes a tooth formation portion around which the armature winding is wound. The magnetic plate includes a stacked portion and an axially extending portion. The stacked portion stacked on the axial end of the main core portion and includes an end located toward the rotor. The axially extending portion extends toward the outer side in the axial direction from the end of the stacked portion located toward the rotor and is opposed to the rotor in a radial direction of the motor. The axially extending portion is shaped to be
(Continued)

magnetically skewed in a circumferential direction relative to the tooth formation portion and the stacked portion.

50 Claims, 39 Drawing Sheets

(30) Foreign Application Priority Data

| Jan. 28, 2013 | (JP) | 2013-013343 |
|---|---|---|
| Jan. 28, 2013 | (JP) | 2013-013344 |
| Jan. 28, 2013 | (JP) | 2013-013345 |
| Jan. 28, 2013 | (JP) | 2013-013347 |
| Jan. 28, 2013 | (JP) | 2013-013348 |
| Apr. 3, 2013 | (JP) | 2013-077730 |
| Dec. 20, 2013 | (JP) | 2013-264451 |

(51) Int. Cl.
*H02K 1/27* (2006.01)
*H02K 3/28* (2006.01)
*H02K 1/18* (2006.01)
*H02K 29/03* (2006.01)
*H02K 15/02* (2006.01)

(52) U.S. Cl.
CPC .......... *H02K 15/024* (2013.01); *H02K 15/03* (2013.01); *H02K 29/03* (2013.01); *H02K 2201/06* (2013.01); *Y10T 29/49009* (2015.01)

(58) Field of Classification Search
CPC ................ H02K 2201/06; H02K 29/03; Y10T 29/49009
USPC ......... 310/43, 89, 156.12, 216.001, 216.008, 310/216.015, 216.016, 216.019, 216.043, 310/216.064, 400, 428
See application file for complete search history.

(56) References Cited

U.S. PATENT DOCUMENTS

| 2005/0225194 | A1 | 10/2005 | Murakami et al. | |
| 2006/0066172 | A1* | 3/2006 | Takeuchi | H02K 1/148 |
| | | | | 310/52 |
| 2006/0113861 | A1* | 6/2006 | Mukai | H02K 19/22 |
| | | | | 310/263 |
| 2006/0130314 | A1* | 6/2006 | Harada | H02K 1/16 |
| | | | | 29/596 |
| 2006/0197402 | A1 | 9/2006 | Gomyo et al. | |
| 2007/0114870 | A1* | 5/2007 | Lee | H02K 1/02 |
| | | | | 310/166 |
| 2007/0205687 | A1 | 9/2007 | Murakami et al. | |
| 2007/0205688 | A1 | 9/2007 | Murakami | |
| 2008/0106167 | A1 | 5/2008 | Gomyo et al. | |
| 2009/0072657 | A1 | 3/2009 | Moroto | |
| 2009/0083964 | A1* | 4/2009 | Tokizawa | H02K 15/026 |
| | | | | 29/596 |
| 2009/0200887 | A1* | 8/2009 | Okamoto | H02K 1/185 |
| | | | | 310/195 |
| 2010/0219714 | A1 | 9/2010 | Abe et al. | |
| 2010/0237752 | A1 | 9/2010 | Yoshikawa et al. | |
| 2011/0001386 | A1 | 1/2011 | Kawasaki et al. | |
| 2011/0006620 | A1 | 1/2011 | Kawasaki et al. | |
| 2011/0175497 | A1 | 7/2011 | Kawasaki et al. | |
| 2012/0038238 | A1* | 2/2012 | Ishikawa | H02K 3/28 |
| | | | | 310/208 |
| 2012/0326552 | A1 | 12/2012 | Kinpara et al. | |
| 2012/0326554 | A1 | 12/2012 | Kinpara et al. | |
| 2013/0342065 | A1* | 12/2013 | Horizumi | H02K 1/16 |
| | | | | 310/156.15 |
| 2014/0021831 | A1* | 1/2014 | Hayashi | H02K 5/22 |
| | | | | 310/432 |

FOREIGN PATENT DOCUMENTS

| JP | S 51-125208 U | 4/1975 |
| JP | H02-111253 A | 4/1990 |
| JP | H04-258338 A | 9/1992 |
| JP | 05-284679 A | 10/1993 |
| JP | H06-31348 U | 4/1994 |
| JP | H09-285044 A | 10/1997 |
| JP | H11-146584 A | 5/1999 |
| JP | 2001-112197 A | 4/2001 |
| JP | 2001-211576 A | 8/2001 |
| JP | 2002-084722 A | 3/2002 |
| JP | 2002-136003 A | 5/2002 |
| JP | 2004-32882 A | 1/2004 |
| JP | 2004-034117 A | 2/2004 |
| JP | 2005-151798 A | 6/2005 |
| JP | 2006-129688 A | 5/2006 |
| JP | 2006-174525 A | 6/2006 |
| JP | 2006-187131 A | 7/2006 |
| JP | 2007-244004 A | 9/2007 |
| JP | 2009-038904 A | 2/2009 |
| JP | 2009-077497 A | 4/2009 |
| JP | 2009-095130 A | 4/2009 |
| JP | 2009-095131 A | 4/2009 |
| JP | 2009-124863 A | 6/2009 |
| JP | 2010-75027 A | 4/2010 |
| JP | 2010-115054 A | 5/2010 |
| JP | 2010-220271 A | 9/2010 |
| JP | 2011-015598 A | 1/2011 |
| JP | 2011-019303 A | 1/2011 |
| JP | 2011-147302 A | 7/2011 |
| JP | 2001-314921 A | 11/2011 |
| JP | 2011-239533 A | 11/2011 |
| JP | 2012-29444 A | 2/2012 |
| JP | 2013-005683 A | 1/2013 |
| JP | 2013-009567 A | 1/2013 |

OTHER PUBLICATIONS

Japanese Office Action of JP 2013-013348, dated May 31, 2016 along with its English Translation.
Japanese Office Action of JP 2013-013345, dated Jun. 7, 2016.
Japanese Office Action of JP 2013-013339 dated Jun. 7, 2016.

* cited by examiner

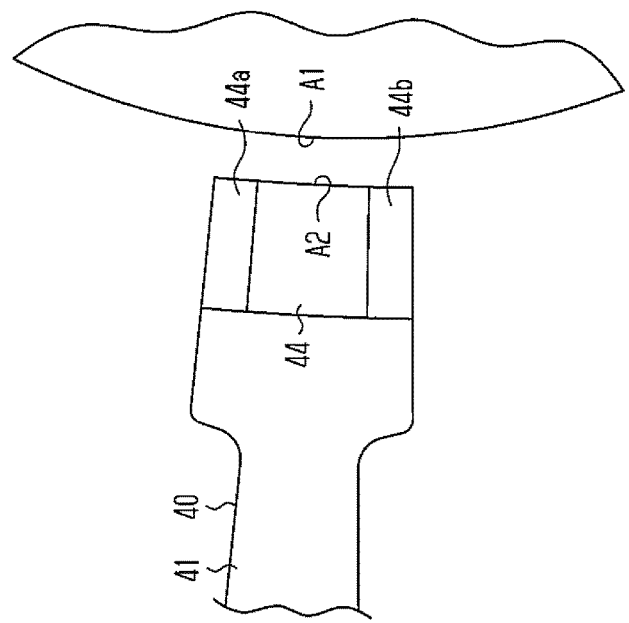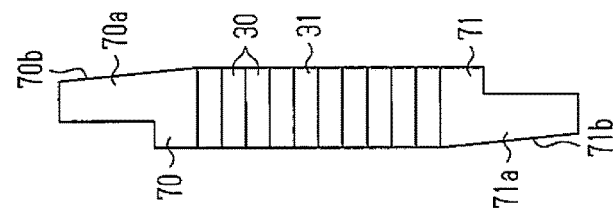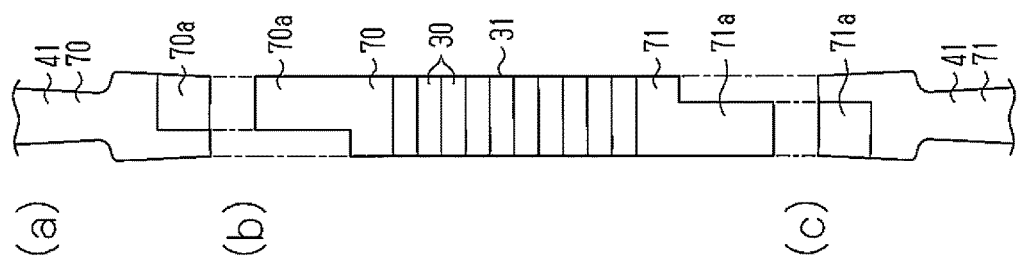

Fig. 31
(a)
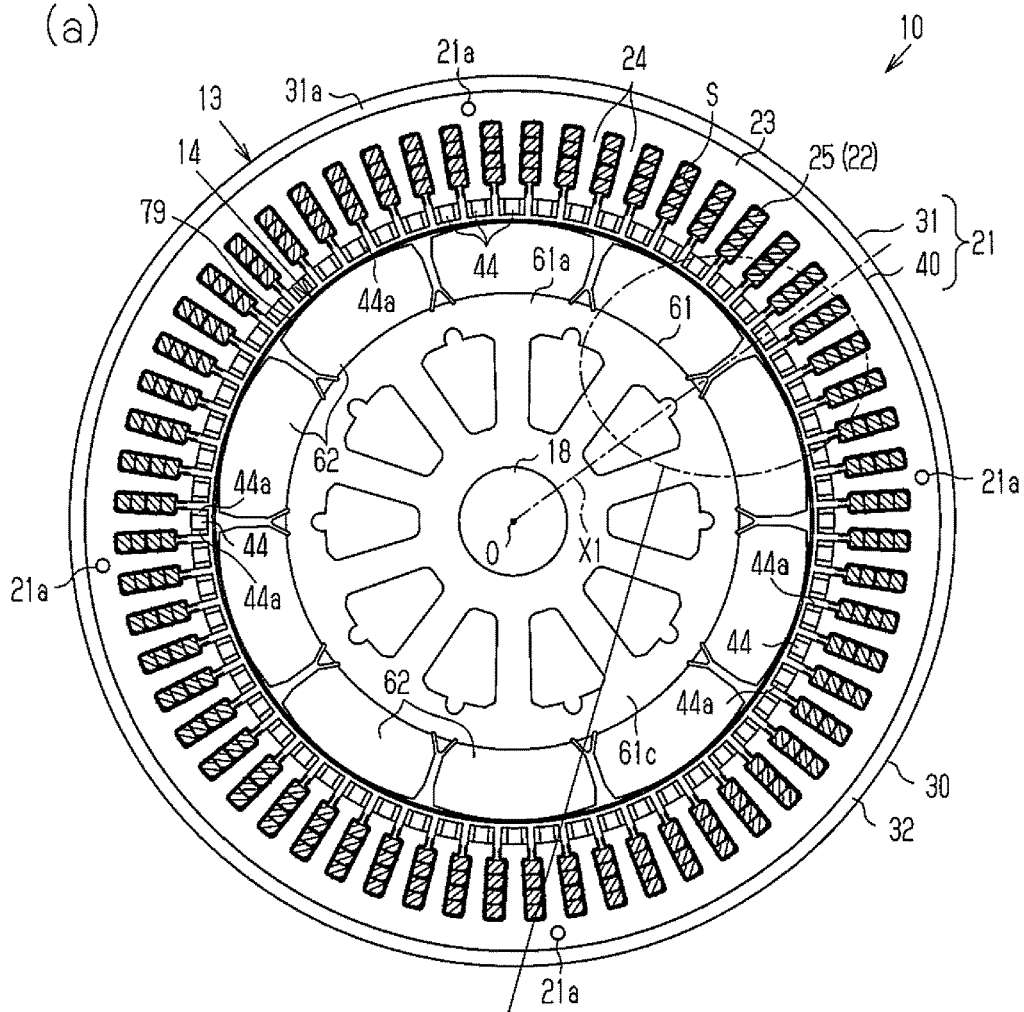
(b)
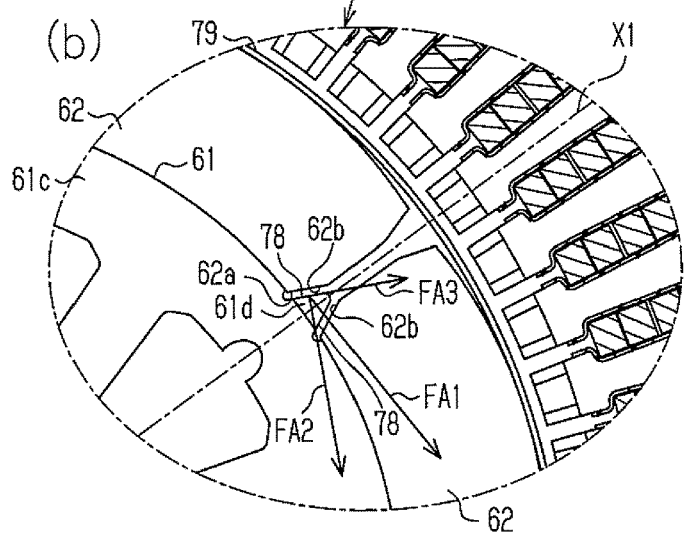

MOTOR, METHOD FOR MANUFACTURING MAGNETIC PLATE, AND METHOD FOR MANUFACTURING STATOR

BACKGROUND OF THE INVENTION

The present invention relates to a motor, a method for manufacturing a magnetic plate, and a method for manufacturing a stator.

Japanese Laid-Open Patent Publication No. 5-284679 describes an example of a known motor including a magnetic plate (auxiliary rotor core in the above publication). The magnetic plate includes a stacked portion, which is stacked on an axial end surface of a core, and an opposing portion, which extends outward from the stacked portion in the axial direction and which is opposed to a magnet in a radial direction of the core. The arrangement of the opposing portion, which is opposed to the magnet in the radial direction, allows for an increase in the drawn amount of magnetic flux.

In the above motor, the magnetic plate includes an opposing surface. This may result in the concentration of magnetic flux at the magnetic plate and thereby increase the cogging torque. Thus, it is desirable that the cogging torque be decreased in the above motor.

SUMMARY OF THE INVENTION

It is an object of the present invention to provide a motor capable of reducing cogging torque.

To achieve the above object, one aspect of the present invention is a motor including a rotation shaft, a stator, and a rotor. The stator includes a stator core and an armature winding. The stator core includes a main core portion and a magnetic plate. The main core portion is formed by a plurality of core sheets stacked in an axial direction of the rotation shaft. The magnetic plate is arranged on an axial end of the main core portion. The rotor is opposed to the stator core in a radial direction. Each of the core sheets includes a tooth formation portion around which the armature winding is wound. The magnetic plate includes a stacked portion, which is stacked on the axial end of the main core portion and which includes an end located toward the rotor, and an axially extending portion, which extends toward an outer side in the axial direction from the end located toward the rotor and which is opposed to the rotor in the radial direction. The axially extending portion is shaped to be magnetically skewed in a circumferential direction relative to the tooth formation portion and the stacked portion.

BRIEF DESCRIPTION OF THE DRAWINGS

The invention, together with objects and advantages thereof, may best be understood by reference to the following description of the presently preferred embodiments together with the accompanying drawings in which:

FIGS. 13A to 13C are diagrams illustrating a magnetic plate in another example of the first embodiment, in which FIG. 13A is a plan view of a stator core, FIG. 13B is a front view of the stator core, and FIG. 13C is a bottom view of the stator core;

FIG. 14 is a front view of a stator core illustrating a magnetic plate in another example of the first embodiment;

FIG. 15 is a partially enlarged schematic plan view of a motor in another example of the first embodiment;

FIG. 31A is a plan view of a motor in another example of the second embodiment, and FIG. 31B is a partially enlarged plan view of FIG. 31A;

DETAILED DESCRIPTION OF PREFERRED EMBODIMENTS

A first embodiment of a motor will now be described with reference to FIGS. 1 to 19.

Figure 1:
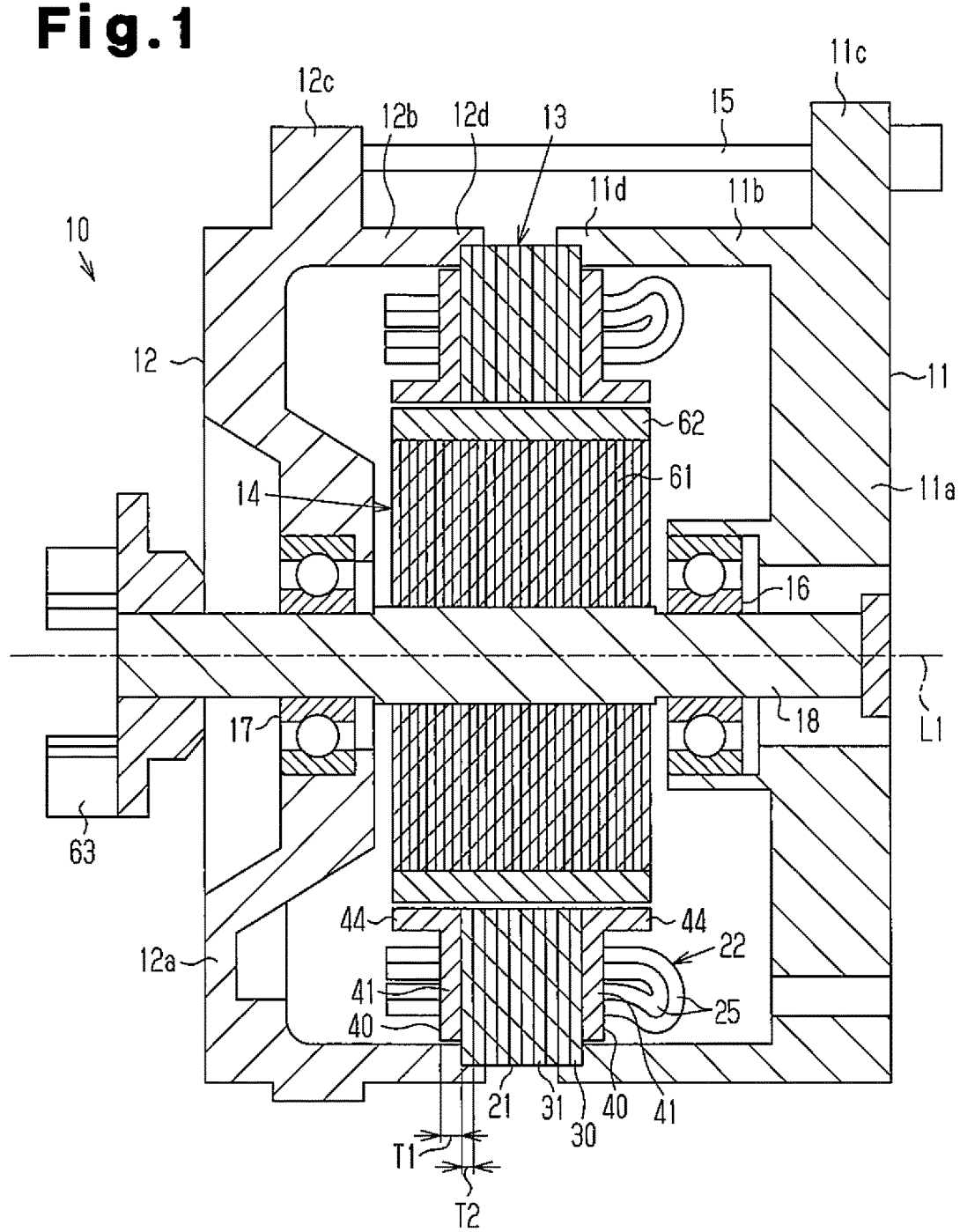
FIG. 1 is a schematic cross-sectional view of a motor according to a first embodiment of the present invention.

As shown in FIG. 1, the motor 10 of this embodiment includes a rear frame 11 (first frame), a front frame 12 (second frame), an annular stator 13 held between the rear frame 11 and the front frame 12 in an axial direction of the motor 10, and a rotor 14 arranged on the inner side of the stator 13. A frame which holds a portion of the motor 10 on an output side in the axial direction (portion closer to later-described joint 63) is the front frame 12, and a frame which holds a portion opposite from the output side in the axial direction is the rear frame 11. The frames 11 and 12 are fastened and fixed by a through bolt 15 at a position on an outer circumferential side of the stator 13 so that the frames 11 and 12 do not separate from each other.

The rear frame 11 and the front frame 12 are made of metal material such as aluminum and steel or resin. The rear frame 11 includes a substantially disk-shaped body portion 11a, and a cylindrical stator holding portion 11b extending from an outer circumferential edge of the body portion 11a in an axial direction of the motor 10. The front frame 12 also has a similar structure, and includes a substantially disk-shaped body portion 12a, and an annular stator holding portion 12b extending from an outer circumferential edge of the body portion 12a in the axial direction of the motor 10. Bearings 16 and 17 arranged coaxially are held at radial central positions of the body portions 11a and 12a of the frames 11 and 12, and the bearings 16 and 17 rotatably support a rotation shaft 18 of the rotor 14.

Fastening portions 11c and 12c extending radially outward from a plurality of (two for example) locations of outer circumferential edges of the body portions 11a and 12a of the frames 11 and 12 are formed thereon. FIG. 1 shows only one of the fastening portions 11c and only one of the fastening portions 12c which are provided in a circumferential direction of the motor 10. The number of the fastening portions 11c of the rear frame 11 and the number of the fastening portions 12c of the front frame 12 are the same, and the fastening portions 11c and the fastening portions 12c are opposed to each other in the axial direction of the rotation shaft 18. By fastening and fixing the pairs of the fastening portions 11c and 12c to each other through the through bolts 15, the frames 11 and 12 are fixed to each other holding the stator 13 in between.

The stator 13 includes an annular stator core 21 held between the stator holding portions 11b and 12b of the frames 11 and 12, and an armature winding 22 attached to the stator core 21.

Figure 2:
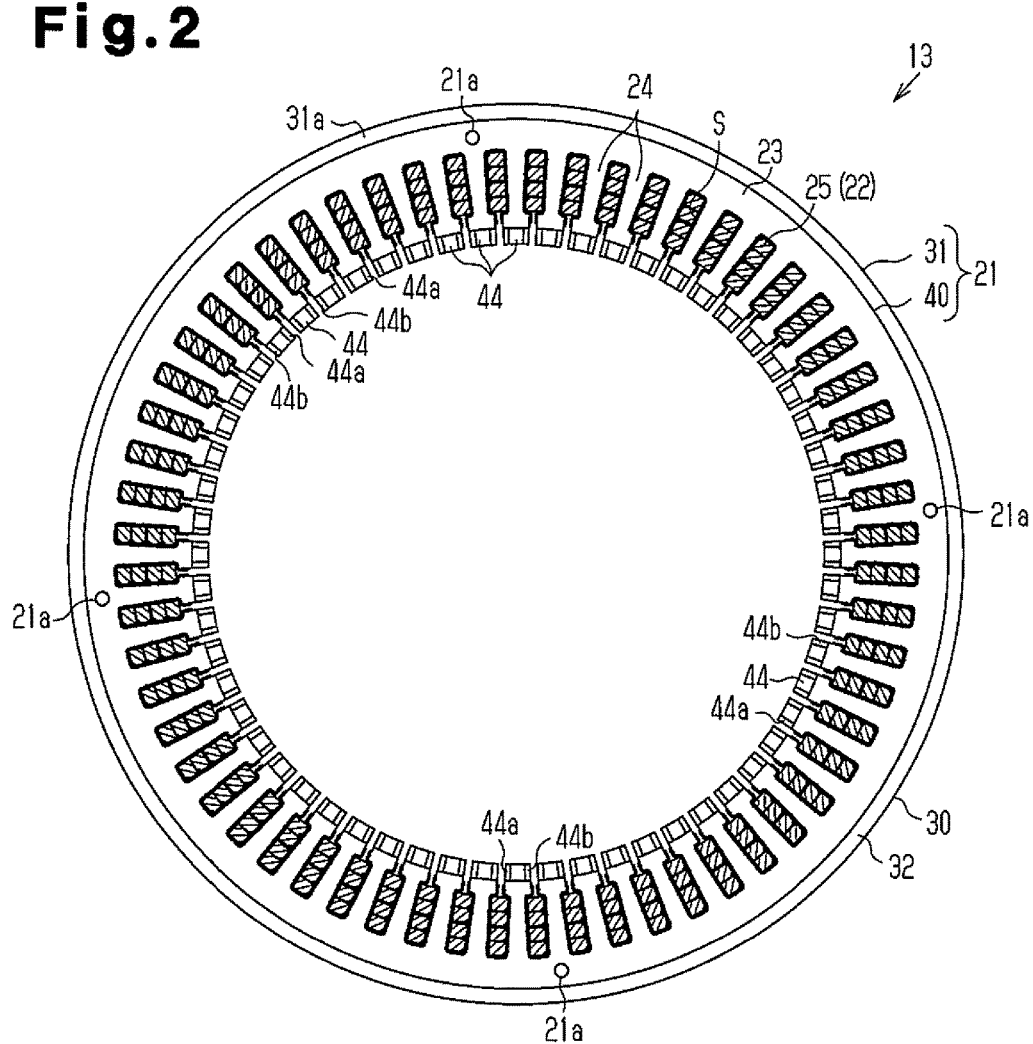
FIG. 2 is a plan view of a stator shown in FIG. 1.
Figure 6:
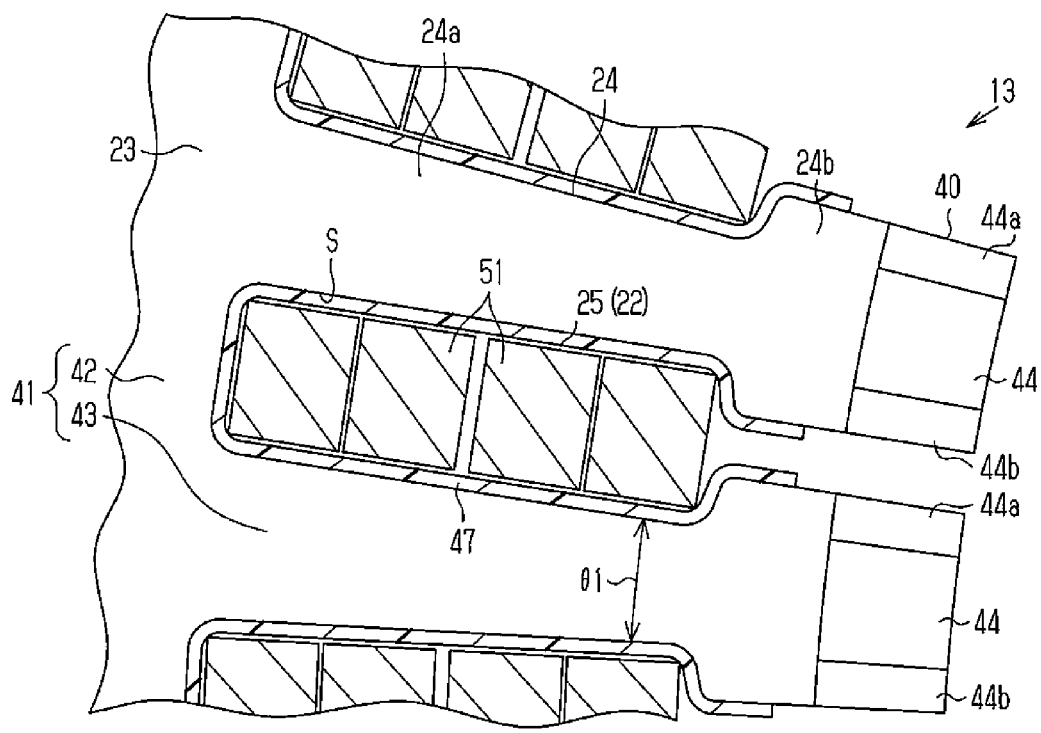
FIG. 6 is a partially enlarged plan view of the stator shown in FIG. 1.

As shown in FIGS. 2 and 6, the stator core 21 includes a cylindrical portion 23 forming an outer circumference of the stator core 21, and a plurality of (sixty, in the first embodiment) teeth 24 extending radially inward from the cylindrical portion 23. A radially extending portion 24a which is tapered is formed on each of the teeth 24. A circumferential width of the radially extending portions 24a is reduced radially inward. A wide portion 24b of which circumferential width is greater than that of the radially extending portions 24a is formed on a distal end (radial inner end) of each of the radially extending portions 24a. Both circumferential end surfaces of the radially extending portions 24a are flat surfaces which are parallel to an axis L1 of the rotation shaft 18, and circumferential end surfaces of the radially extending portions 24a which are adjacent to each other in the circumferential direction are parallel to each other.

Spaces between the adjacent teeth 24 are formed as slots S in which segment conductors 25 forming the armature winding 22 are accommodated. That is, each of the slots S includes a circumferential side surface of each of the teeth 24 and an inner circumferential surface of the cylindrical portion 23 between the teeth 24. In the first embodiment, since the teeth 24 are formed such that circumferential end surfaces of the radially extending portions 24a which are adjacent to each other in the circumferential direction are parallel to each other, each of the slots S has a substantially rectangular shape as viewed from the axial direction. The slot S penetrates the stator core 21 in the axial direction, and has a shape which opens radially inward. The number of the slots S formed in the stator core 21 is the same as that of the teeth 24 (sixty in the first embodiment).

The stator core 21 having the above-described shape is formed by stacking and integrating a plurality of steel sheets.

Figure 4:
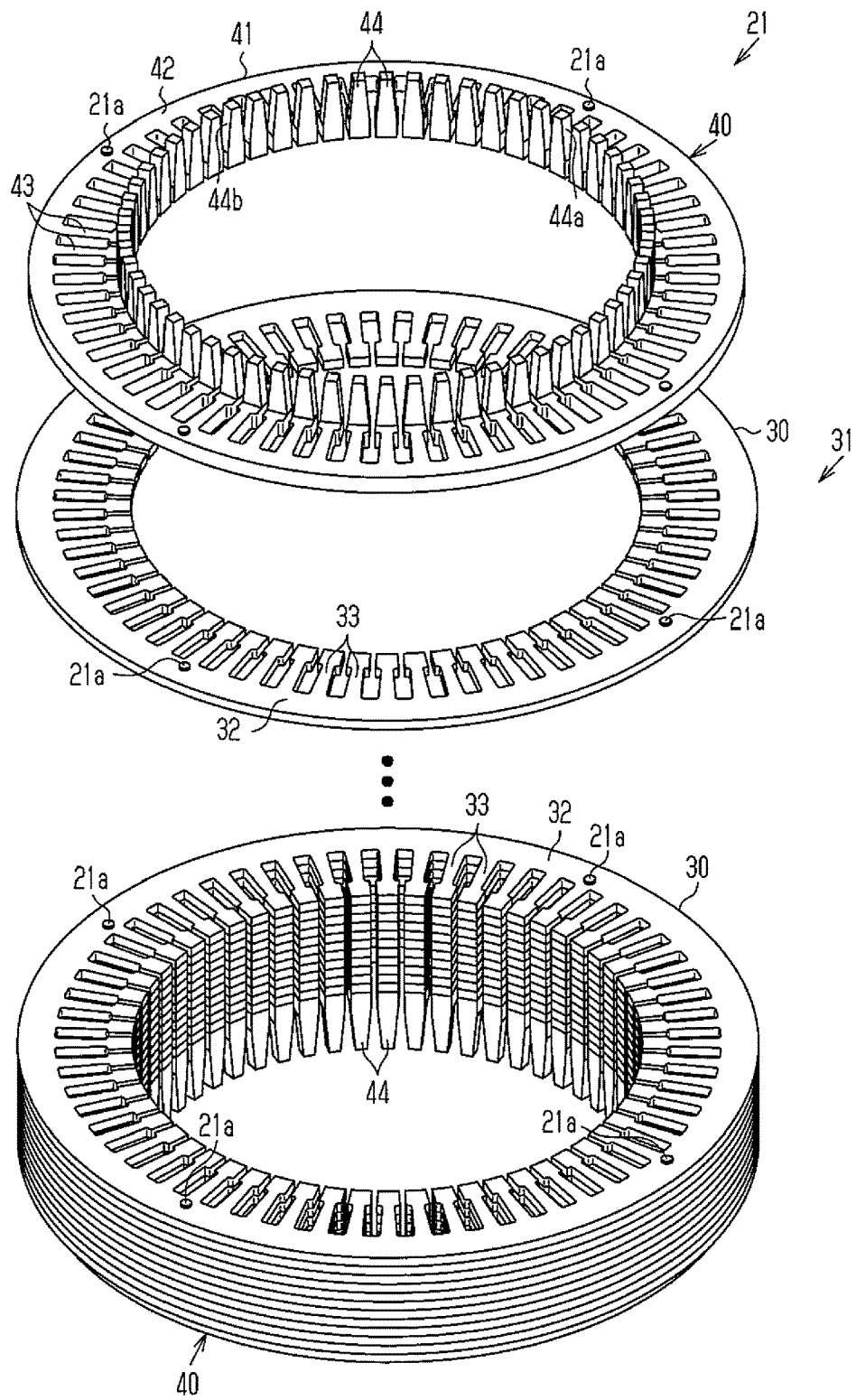
FIG. 4 is an exploded perspective view of a stator core shown in FIG. 1.

More specifically, as shown in FIG. 4, the stator core 21 includes a main core portion 31 formed by stacking, in the axial direction on one another, a plurality of core sheets 30 into which a steel sheet is punched by metal punching, by swaging the stacked core sheets 30 and by integrally forming the swaged stacked core sheets 30 as one sheet, and also includes magnetic plates 40 (auxiliary core portions) respectively fixed to both axial ends of the main core portion 31. In the first embodiment, the magnetic plates 40 having the same shapes are provided on two axial sides of the main core portion 31 one each.

The plurality of core sheets 30 of the main core portion 31 have the same shapes, and are arranged such that their plate surfaces intersect with each other in the axial direction at right angles. Each of the core sheets 30 includes an annular portion 32, and a plurality of (sixty in this embodiment) tooth formation portions 33 extending radially inward (toward the rotor 14) from the annular portion 32.

As shown in FIG. 2, each of the tooth formation portions 33 is formed such that a portion of the tooth formation portion 33 from its radial outer side to a halfway portion of its radial inner side has a circumferential width which becomes smaller toward a radial inner side (portion closer to the rotor 14) of the tooth formation portion 33. The plurality of core sheets 30 are stacked such that the tooth formation portions 33 are overlapped on one another in the axial direction.

As shown in FIGS. 2, 4 and 6, each of the magnetic plates 40 is formed through metal punching, and has a plate-shaped stacked portion 41 stacked on the core sheets 30 of both axial ends of the main core portion 31. The stacked portion 41 is coaxially stacked on the core sheets 30 of the main core portion 31 in parallel to each other. A thickness T1 of the magnetic plate 40 is set to be greater than a thickness T2 of the core sheet 30 of the main core portion 31 (see FIG. 1).

An annular portion 42 which is overlapped on the annular portion 32 of the core sheet 30 in the axial direction, and a plurality of tooth formation portions 43 extending from the annular portion 42 radially inward are formed on the stacked portion 41. Each of the tooth formation portions 43 of the stacked portion 41 and each of the tooth formation portions 33 of the core sheet 30 have the same shapes as viewed from the axial direction. The magnetic plate 40 is provided such that the annular portion 42 of the stacked portion 41 and the tooth formation portion 43 are overlapped, in the axial direction, on the annular portion 32 and the tooth formation portion 33 of the core sheet 30, respectively. The core sheet 30 and the annular portions 32 and 42 of the magnetic plate 40 form the cylindrical portion 23 of the stator core 21. The tooth formation portions 33 and 43 form the teeth 24 of the stator core 21. An outer diameter of the annular portion 42 of the stacked portion 41 is smaller than that of the annular portion 32 of the core sheet 30 (see FIG. 2). Thus, an entire outer circumferential edge of the annular portion 32 of the core sheet 30 is exposed as viewed from the axial direction.

Rotor opposing portions 44 as axially extending portions extending axially outward (opposite side from the main core portion 31) are formed on a radial inner end of the tooth formation portions 43 of the magnetic plate 40 (end thereof closer to the rotor 14). Each of the rotor opposing portions 44 is formed by bending the radial inner end of the tooth formation portion 43 axially outward at the right angles (90°). That is, the magnetic plate 40 is formed such that its plate surface is oriented in the radial direction by the rotor opposing portion 44 which is bent axially outward. Inner diameter surfaces of the rotor opposing portions 44 is formed into a curved surface such that an inner diameter thereof becomes equal to an inner diameter of the main core portion 31 (core sheet 30). A thickness of the stacked portion 41 in the axial direction and a thickness of the rotor opposing portion 44 in the radial direction are determined by the thickness T1 of the magnetic plate 40, and these thicknesses are equal to each other. A thickness of a bent portion (corner formed between the tooth formation portion 43 and the rotor opposing portion 44) between the rotor opposing portion 44 and the tooth formation portion 43 is greater than a thickness of the rotor opposing portion 44 (i.e., thickness T1 of the magnetic plate 40).

Figure 3A:
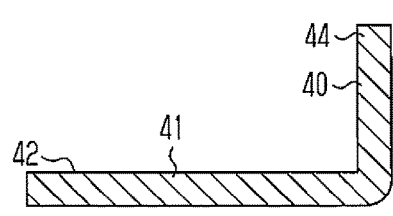
FIG. 3A is a cross-sectional view illustrating a magnetic plate shown in FIG. 1.
Figure 3B:
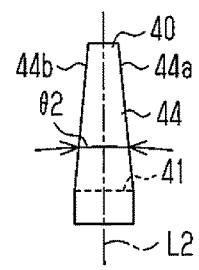
FIG. 3B is a front view illustrating a rotor opposing portion of the magnetic plate shown in FIG. 1.

As shown in FIGS. 3A and 3B, each of the rotor opposing portions 44 is provided at its circumferential both sides with side edges 44a and 44b as circumferential sides. The side edges 44a and 44b incline with respect to a direction of the axis L1 (axial direction) of the rotation shaft 18. The side edges 44a and 44b incline such that portions thereof closer to their axially outer sides (opposite side from the stacked portion 41) more approach a circumferential center of the rotor opposing portion 44. That is, the rotor opposing portion 44 has an axial length which varies along the circumferential direction. The side edge 44a on one of sides in the circumferential direction and the side edge 44b on the other side in the circumferential direction have symmetric shapes with respect to a phantom line L2 (straight line extending along the axis L1) extending through a circumferential center of the rotor opposing portion 44. Hence, a circumferential width of the rotor opposing portion 44 on the side of its axial basal end (axial inner side) is equal to a circumferential width of a distal end of each of the tooth formation portions 33 and 43 which form the wide portion 24*b* of the tooth 24. A portion of the rotor opposing portion 44 closer to an axial distal end (axial outer side) has a smaller circumferential width, and the rotor opposing portion 44 has a trapezoidal shape as viewed from the radial direction. All of the rotor opposing portions 44 in the first embodiment have the same shape.

As shown in FIG. 2, each of the rotor opposing portions 44 is not overlapped on other rotor opposing portions 44 which are adjacent to each other in the circumferential direction and on other tooth formation portions 33 which are adjacent to each other in the circumferential direction (i.e., the former rotor opposing portion 44 is not overlapped on other axially extending portions which are adjacent to each other in the circumferential direction and on the tooth formation portions 33 which is opposed to the former rotor opposing portion 44 in the radial direction as viewed from the axial direction). As shown in FIG. 3B, inclined surfaces of the side edges 44*a* and 44*b* of the rotor opposing portion 44 are straight surfaces and an inclination angle $\theta 2$ of the rotor opposing portion 44 is smaller than a radiation angle $\theta 1$ (see FIG. 6) of the tooth formation portions 33 and 43.

Figure 5:
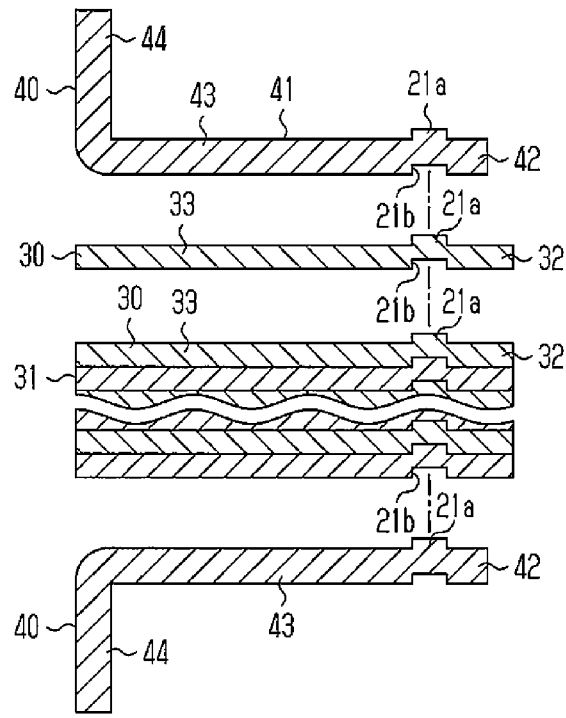
FIG. 5 is a schematic cross-sectional view of the stator core shown in FIG. 1.

As shown in FIGS. 4 and 5, a plurality of (four in the first embodiment) projections 21*a* (dowels) projecting in the thickness direction are formed on the core sheets 30 and the annular portions 32 and 42 of the stacked portion 41 of the magnetic sheet by metal punching. The projections 21*a* are formed in the annular portions 32 and 42 in the circumferential direction. The annular portions 32 and 42 include recesses 21*b* formed in a back side of the projections 21*a* when the projections 21*a* are formed. The projections 21*a* are press fitted into and fixed to (swaged and fixed to) the recesses 21*b* of the core sheets 30 which are adjacent to each other in the axial direction. Thus, the core sheets 30 are integrally formed together to form the main core portion 31, and the magnetic plates 40 are fixed to two axial sides of the main core portion 31.

As shown in FIG. 6, an insulating member 47 formed by a sheet of insulative resin is attached into each of the slots S of the stator core 21. Each of the insulating members 47 is folded back at a radial outer end of the slot S, and extends along an inner circumferential surface of the slot S. Each of the insulating members 47 is inserted into the slot S in the axial direction, and an axial length of the insulating member 47 is set to be greater than an axial length of the slot S. That is, both axial ends of the insulating member 47 project outside from both axial ends of the slot S.

Figure 8:
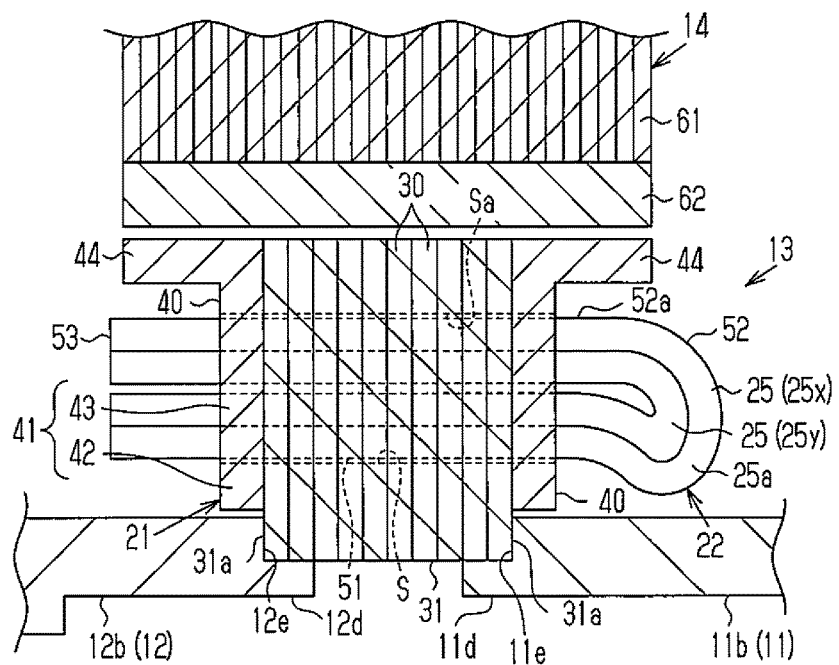
FIG. 8 is a partially enlarged schematic cross-sectional view of the motor shown in FIG. 1.

As shown in FIGS. 6 and 8, the armature winding 22 attached to the stator core 21 includes the plurality of segment conductors 25. Predetermined some of the plurality of segment conductors 25 are connected to each other, and they form an armature winding 22 of three-phase (U-phase, V-phase and W-phase) Y-connection. The plurality of segment conductors 25 are made of wire material having the same cross-sections (rectangular cross-sections).

Each of the segment conductors 25 includes a pair of straight portions 51 which is inserted into the slot S, a first projection 52 projecting to one of sides of the axial direction (toward the rear frame 11) from the slot S, and a second projection 53 projecting to the other side of the axial direction (toward the front frame 12) from the slot S. The first projection 52 and the second projection 53 function as projections. Each of the segment conductors 25 is formed into a substantially U-shape which is folded back on the side of the first projection 52. The first and second projections 52 and 53 are opposed to the rotor opposing portion 44 of the magnetic plate 40 through a gap in the radial direction.

The pair of straight portions 51 is formed such that their radial positions are deviated from each other and are inserted into slots S located at different circumferential positions. The straight portion 51 is arranged on the inner side of the insulating member 47 in the slot S (see FIG. 6). The segment conductor 25 and the stator core 21 are electrically insulated from each other by the insulating member 47.

The segment conductors 25 are arranged such that four straight portions 51 are arranged in each of the slots S in the radial direction. The plurality of segment conductors 25 include two kinds of segment conductors, i.e., segment conductors 25 having straight portions 51 arranged at first and fourth positions in the slot S from a radial inner side (segment conductors 25*x* shown on the outer side in FIG. 8), and segment conductors 25 having two straight portions 51 arranged second and third positions in the slot S from the radial inner side (segment conductors 25*y* shown on the inner side in FIG. 8). Although the armature winding 22 mainly includes two kinds of segment conductors 25*x* and 25*y*, a different kind of segment conductor (e.g., segment conductor having only one straight portion) is used as a segment conductor which forms an end (e.g., power source connection terminal or neutral point connection terminal) of the armature winding 22 for example.

Each of the straight portions 51 penetrates the slot S in the axial direction, the second projection 53 projecting toward the front frame 12 is bent in the circumferential direction and is electrically connected to the straight portion 51 of another segment conductor 25 or a special kind of segment conductors by welding. Thus, the armature winding 22 is formed by the plurality of segment conductors 25.

Figure 7:
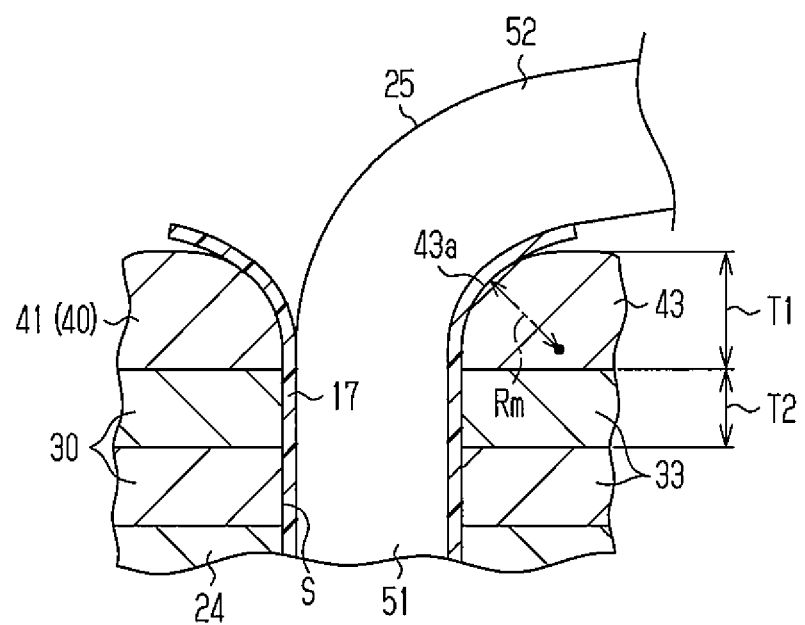
FIG. 7 is a schematic cross-sectional view showing a bent portion of a segment conductor shown in FIG. 6.

The first and second projections 52 and 53 of the segment conductor 25 are bent in the circumferential direction with respect to the straight portion 51 at both axial ends of the slot S. Here, FIG. 7 is an enlarged view of an axial end of the slot S at which the first projection 52 is bent in the circumferential direction. As shown in FIG. 7, a chamfered portion 43*a* which is chamfered into an arc shape is formed at a corner of the tooth formation portion 43 of the magnetic plate 40 (stacked portion 41) which forms an axial one end of the slot S. Similarly, another chamfered portion 43*a* is formed also at the magnetic plate 40 closer to the second projection 53 (corner of the tooth formation portion 43 forming the other axial end of the slot S). Each of the chamfered portions 43*a* is formed into an arc shape extending along a bent shape of the bent portion in the circumferential direction of the first and second projections 52 and 53, and comes into contact with the bent portion with a large area. This structure limits local application of force from the corner of the tooth formation portion 43 to the bent portion of the circumferential direction of the first and second projections 52 and 53, and limits damage to the bent portion. Similarly, this structure limits damage to the insulating member 47 held between the chamfered portion 43*a* and the bent portion of the first and second projections 52 and 53. In the first embodiment, the thickness T1 of the magnetic plate 40 (thickness of the tooth formation portion 43) is greater than the thickness T2 of the core sheet 30, a radius of curvature Rm of the chamfered portion 43*a* can be set greater than the thickness T2 of the core sheet 30. Thus, it is possible to limit damages, in a further preferable manner, to the bent portion of the segment conductor 25 by the chamfered portion 43*a* having the greater radius of curvature Rm.

As shown in FIG. 8, the first projection 52 on which a folded portion 25a of the segment conductor 25 is formed inclines (bulges) radially outward. Thus, the folded portion 25a is biased radially outward from the radial center of the slot S, and a radial inner end 52a of the first projection 52 is located on the radial outer side of a radial inner end Sa of the slot S. Thus, since a gap between the first projection 52 and the rotor opposing portion 44 of the magnetic plate 40 is formed wide, interference between the first projection 52 and the rotor opposing portion 44 is limited in a further preferable manner. As a result, insulation properties between the segment conductor 25 and the rotor opposing portion 44 are improved in a further preferable manner, and it is possible to avoid a case in which the first projection 52 and the rotor opposing portion 44 interfere with each other, the rotor opposing portion 44 is deformed, and this deformation increases cogging torque and reduces output.

Folded portions are not formed on the second projections 53 of the segment conductor 25, and the second projections 53 are welded and bonded to each other. Hence, it is possible to easily obtain a gap between the second projection 53 and the rotor opposing portion 44. The welded portion between the second projections 53 is located closer to an axially outer side (opposite side from the main core portion 31) than an axial distal end of the rotor opposing portion 44 closer to the front frame 12. Thus, the rotor opposing portion 44 is less likely to hinder the welding operation of the second projections 53, the operability is enhanced, and it is possible to more reliably obtain the insulation properties between the second projection 53 and the rotor opposing portion 44. The welding portion between the second projections 53 may be set closer to an axial inner side (closer to the main core portion 31) than the axial distal end of the rotor opposing portion 44 closer to the front frame 12. In this case, since the second projection 53 does not project axially outward than the rotor opposing portion 44, the stator 13 can be reduced in size in the axial direction.

As shown in FIG. 1, the stator holding portions 11b and 12b of the frames 11 and 12 which hold the stator 13 having the above-described structure are formed into cylindrical shapes extending from the body portions 11a and 12a of the frames 11 and 12 in the axial direction. Outer diameters of the stator holding portions 11b and 12b are greater than an outer diameter of the main core portion 31 of the stator core 21. Inner diameters of the stator holding portions 11b and 12b are smaller than the outer diameter of the main core portion 31 and is greater than an outer diameter of the magnetic plate 40 (stacked portion 41).

As shown in FIG. 8, fitting portions 11d and 12d are respectively formed on distal ends of the stator holding portions 11b and 12b (axial inner ends). The fitting portions 11d and 12d are portions in which thicknesses of the stator holding portions 11b and 12b in the radial direction are made thin by increasing the inner diameters of the stator holding portions 11b and 12b in sizes, and the fitting portions 11d and 12d are formed into annular shapes. Inner diameters of the fitting portions 11d and 12d are substantially equal to the outer diameter of the main core portion 31, and flat abutting surfaces 11e and 12e intersecting with the axial direction at right angles are respectively formed on radial inner sides of the fitting portions 11d and 12d.

Outer circumferential edges of the main core portion 31, i.e., portions (exposed surfaces 31a) of the main core portion 31 which are located closer to a radial outer side than the stacked portion 41 of the magnetic plate 40 and which are exposed to two axial sides are held between the stator holding portions 11b and 12b of the frames 11 and 12. More specifically, the fitting portions 11d and 12d of the stator holding portions 11b and 12b are respectively fitted over outer circumferential edges of both axial ends of the main core portion 31, and the abutting surfaces 11e and 12e abut against the exposed surfaces 31a on two axial sides of the main core portion 31 in the axial direction. In this state, the frames 11 and 12 are connected and fixed to each other through the through bolt 15, and the main core portion 31 is held between the stator holding portions 11b and 12b in the axial direction. An outer circumferential surface of the main core portion 31 of the stator core 21 is exposed from between distal ends of the stator holding portions 11b and 12b.

As shown in FIGS. 1, 2 and 8, the rotor 14 includes the rotation shaft 18 rotatably supported by the bearings 16 and 17, a cylindrical rotor core 61 fixed to the rotation shaft 18 such that the rotor core 61 can integrally rotate with the rotation shaft 18, and a plurality of (ten in the first embodiment) field magnets 62 fixed to an outer circumferential surface of the rotor core 61. The field magnets 62 are ferrite magnets and are arranged such that magnetic poles (north poles and south poles) are different from one another alternately in the circumferential direction. The field magnets 62 are so-called segment magnets which are arranged at distances from one another in the circumferential direction and which are fixed to an outer circumferential surface of the rotor core.

Lengths of the rotor core 61 and the field magnet 62 of the rotor 14 in the axial direction are set to be greater than a length of an inner circumferential end of the stator core 21 in the axial direction (i.e., length from the distal end of the rotor opposing portion 44 of one of the magnetic plates 40 to the distal end of the rotor opposing portion 44 of the other magnetic plate 40). That is, the field magnet 62 is opposed to an inner circumferential surface of the main core portion 31 of the stator core 21 and the rotor opposing portion 44 of each of the magnetic plates 40 in the radial direction.

As shown in FIG. 1, a distal end (left end in FIG. 1) of the rotation shaft 18 penetrates the front frame 12 and projects outside of the motor 10. A joint 63 which integrally rotates with the rotation shaft 18 is provided on the distal end of the rotation shaft 18. The joint 63 is connected to an external device (not shown) and transmits rotation of the rotation shaft 18 to the external device.

The operation of the first embodiment will now be described.

A magnetic field generated by supplying power to the armature winding 22 of the stator 13 and a magnetic field of the field magnet 62 of the rotor 14 act on each other through an inner circumferential surface of the main core portion 31 and the rotor opposing portions 44 of the magnetic plates 40, and the rotor 14 rotates. In the first embodiment, the thickness T1 of the magnetic plate 40 is set to be greater than the thickness T2 of the core sheet 30. Hence, magnetic saturation in the magnetic plate 40 is limited, and it becomes easy to draw magnetic flux into the stacked portion 41 and the tooth formation portions 33 (main core portion 31) through the magnetic plates 40.

Here, each of the rotor opposing portions 44 has a trapezoidal shape as viewed from the radial direction, and has such a shape that the rotor opposing portion 44 is magnetically skewed in the circumferential direction. That is, the rotor opposing portion 44 inclines relative to the axial direction. Hence, an effect of skew is obtained and cogging torque is reduced.

The rotor opposing portion 44 of each of the magnetic plates 40 is formed such that its end (radial inner end) closer to the rotor 14 of the tooth 24 of the stator core 21 extends in the axial direction. Thus, it is possible to obtain an axial length of a surface (inner circumferential surface of the stator core 21) of the stator core 21 opposed to the rotor 14, to increase output, and to suppress a stacking thickness of the main core portion 31. By suppressing the stacking thickness of the main core portion 31, it is possible to suppress variation (tolerance) in the stacking thickness of the main core portion 31. Hence, variations in an axial gap between the frames 11 and 12, which hold in between the main core portion 31 is suppressed, and variation in an axial size of the entire motor 10 is suppressed.

In the magnetic plate 40, an increase in the thickness T1 increases variations (tolerance) in the thickness T1 becomes. According to the first embodiment, however, the frames 11 and 12 hold in between only the main core portion 31 and the frames 11 and 12 do not abut against the magnetic plate 40 in the axial direction. Hence, variation in the axial size of the entire motor 10 is further suppressed.

According to the structure using the segment conductor 25 as the armature winding 22, there is a tendency that the number of slots S (number of the teeth 24) in which the segment conductors 25 are accommodated is large, and a circumferential width of the tooth 24 becomes small. Hence, in order to increase an area of a surface (radial inner end surface) of the tooth 24 which is opposed to the rotor 14 and to enhance the output, it is suitable to axially extend the radial inner end surface of the tooth 24 by the rotor opposing portion 44 as in the first embodiment. The tooth 24 of the first embodiment has such a structure in which magnetic flux easily concentrates at a boundary between the wide portion 24b and the radially extending portion 24a of which the circumferential width becomes smaller toward the inner circumference of the motor. However, since the stacked portion 41 of the magnetic plate 40 is overlapped on the boundary, the concentrated magnetic flux is reduced.

The advantages of the first embodiment will now be described.

(1) The rotor opposing portion 44 serving as the axially extending portion which extends axially outward has such a shape that the rotor opposing portion 44 is magnetically skewed in the circumferential direction with respect to the tooth formation portions 33 of the main core portion 31 and the tooth formation portion 43 of the stacked portion 41. Hence, it is possible to smooth the variation in magnetic flux and reduce cogging torque. Further, the rotor opposing portion 44 (magnetic plate 40) inclines in the circumferential direction relative to the axial direction, it is possible to easily produce a skewed portion as compared with a case in which the main core portion 31 includes a plurality of core sheets 30 and the core sheets 30 are magnetically skewed. Since the magnetic plate 40 includes the stacked portion 41, it is easy to couple the magnetic plate 40 and the main core portion 31 to each other.

(2) The side edges 44a and 44b as circumferential sides of the rotor opposing portion 44 incline in the circumferential direction relative to the axial direction. Thus, the rotor opposing portion 44 is magnetically skewed in the circumferential direction. Hence, it is possible to form the rotor opposing portion 44 from a plate-shaped member by the metal punching. Thus, since it is unnecessary to weld the stacked portion 41 and the rotor opposing portion 44 to each other, it is possible to relatively easily produce the rotor opposing portion 44.

(3) The rotor opposing portion 44 is not overlapped on other rotor opposing portions 44 which are adjacent to the former rotor opposing portion 44 in the circumferential direction and on the tooth formation portions 33 of other main core portions 31 which are adjacent to the former rotor opposing portion 44 in the circumferential direction as viewed from the axial direction. Hence, it is possible to reduce the influence of the rotor opposing portions 44 on one another and suppresses reduction in the magnetic flux.

(4) Since the stacked portion 41 (tooth formation portion 43 of magnetic plate 40) has the same shape as that of the tooth formation portion 33 of the main core portion 31, it is easy to couple the stacked portion 41 with respect to the tooth formation portions 33. Since the stacked portion 41 and the rotor opposing portions 44 are integrally formed, it is possible to draw the magnetic flux, which has been drawn into the rotor opposing portions 44, into the stacked portion 41 and the tooth formation portions 33 (main core portion 31) that are shaped identically to the stacked portion 41.

(5) The circumferential width of the rotor opposing portion 44 becomes smaller in the axially outward direction. Hence, it is possible to suppress leakage magnetic flux, and to suppress increase in torque ripple caused by increase in the leakage magnetic flux. In an inner rotor type motor in which the rotor 14 is provided on the inner side of the stator 13 for example, the rotor opposing portions 44 are located on the radial inner side. Hence, when a steel sheet is punched out by metal punching and then it is bent substantially 90° to form the rotor opposing portion 44, a portion of the rotor opposing portion 44 which becomes a distal end (axial outer side) is located on the radial inner side. Hence, since the circumferential width of the rotor opposing portion 44 becomes smaller in the axially outward direction, a steel sheet can be punched out by metal punching when the plurality of stacked portions 41 and the rotor opposing portions 44 provided in the circumferential direction are integrally formed.

(6) The inclined surfaces of the side edges 44a and 44b of the rotor opposing portion 44 are straight in shapes. Hence, it is possible to further smooth the variation in the magnetic flux, and to reduce cogging torque. In the inner rotor type motor in which the rotor 14 is provided on the inner side of the stator 13 for example, the rotor opposing portions 44 are located on the radial inner side. Hence, when a steel sheet is punched out by metal punching and then it is bent substantially 90° to form the rotor opposing portion 44, a portion of the rotor opposing portion 44 which becomes a distal end (axial outer side) is located on the radial inner side. Hence, since the inclination angle θ2 (circumferential width) of the rotor opposing portion 44 (side edges 44a and 44b) is smaller than the radiation angle θ1 of the tooth formation portion 33, a steel sheet can be punched out by metal punching when the plurality of stacked portions 41 and the rotor opposing portions 44 provided in the circumferential direction are integrally formed.

(7) The tooth formation portion 33 extends toward the rotor 14, and the circumferential width of the tooth formation portion 33 becomes smaller toward the rotor 14. Hence, in the inner rotor type motor for example, it is possible to obtain a void for the armature winding 22 on the radial inner side. In this case, the tooth formation portions 33 are in abutment against the magnetic plate 40. Hence, magnetic flux concentrated at a narrow portion of the tooth formation portion 33 close to the rotor 14 may be reduced thereby limiting magnetic saturation.

(8) The magnetic plates 40 having the rotor opposing portions 44 are formed on the two axial sides. Therefore, it is possible to suppress the axial length of the main core portion 31 and to increase the amount of magnetic flux drawn to the stator core 21. Further, since the armature winding 22 can be arranged on a portion (radial outer side portion) of the rotor opposing portion 44 opposite from the rotor 14, the axial length can be suppressed.

(9) Since the field magnet 62 of the rotor 14 is made of a relatively inexpensive ferrite magnet, costs can be reduced.

(10) The armature windings 22 include the plurality of segment conductors 25 which are respectively inserted into the plurality of slots S formed in the stator core 21 in the axial direction, and which include the first and second projections 52 and 53 projecting from the slots S in the axial direction. The first and second projections 52 and 53 of the segment conductor 25 are opposed to the rotor opposing portion 44 of the magnetic plate 40 in the radial direction. Thus, it is possible to obtain the surface of the stator core 21 which is opposed to the rotor 14 by the rotor opposing portion 44 of the magnetic plate 40, to increase the output, and to limit enlargement of the stator 13 in the axial direction. The stator 13 having the armature winding 22 includes the segment conductor 25 with structure in which a void factor occupied by the armature winding 22 can be increased, but since the segment conductors 25 are radially aligned with each other in the slots S, the stator 13 easily generates heat especially in the radial direction. However, since the outer circumferential surface of the stator core 21 (main core portion 31) is exposed outside from between the stator holding portions 11b and 12b of the frames 11 and 12, heat generated by the stator 13 can easily be released to outside, which is preferable.

(11) Since the outer circumferential surface of the stator core 21 is exposed when the frames 11 and 12 hold in between the stator core 21 in the axial direction, it becomes easy to release heat of the stator core 21 (stator 13) to the exterior.

(12) The thickness T1 of the magnetic plate 40 is set greater than the thickness T2 of the core sheet 30. Hence, it becomes easy to draw magnetic flux through the magnetic plate 40. As a result, it is possible to further increase the output.

(13) The stator holding portions 11b and 12b of the frames 11 and 12 directly hold in between the outer circumferential edge of the main core portion 31 (exposed surface 31a), and the stator holding portions 11b and 12b do not abut against the magnetic plate 40 in the axial direction. Hence, it is possible to suppress variations (tolerance) in the axial interval between the frames 11 and 12, which hold in between the main core portion 31, and as a result, it is possible to suppress variations in the axial size of the entire motor 10. When the thickness T1 of the magnetic plate 40 is greater than the thickness T2 of the core sheet 30 to enhance the output as in the first embodiment, variations are increased in the thickness of the magnetic plate 40. Hence, if the structure that the frames 11 and 12 do not abut against the magnetic plate 40 in the axial direction is employed, an effect for suppressing the variation in the axial size of the entire motor 10 becomes more significant.

(14) The stator core 21 held between the frames 11 and 12 includes the main core portion 31 formed by stacking the plurality of core sheets 30 on one another in the axial direction, and the magnetic plates 40 provided at axial ends of the main core portion 31. The magnetic plate 40 includes the stacked portion 41 stacked on the core sheet 30 which is the axial end of the main core portion 31, and the rotor opposing portions 44 which extend axially outward from the ends of the stacked portion 41 close to the rotor 14 and which are opposed to the rotor 14 in the radial direction. According to this structure, since the rotor opposing portion 44 of the magnetic plate 40 extends axially outward (direction opposite from the main core portion 31), it is possible to suppress the stacking thickness of the stator core 21 without reducing the surface of the stator core 21 (inner circumferential surface of the stator core 21) opposed to the rotor 14. Thus, since the stacking thickness is suppressed, inclination of the stator core 21 is suppressed and as a result, inclinations of the frames 11 and 12 can be suppressed, the surface of the stator core 21 opposed to the rotor 14 can be obtained, and the output can be increased. Since the magnetic plate 40 includes the flat stacked portion 41 stacked on the main core portion 31, it is possible to fix (swag and fix in this embodiment) the stacked portion 41 like the core sheet 30 of the main core portion 31, and the manufacturing step can be simplified.

(15) The chamfered portions 43a are formed at the corners of the tooth formation portions 43 of the magnetic plate 40 which form the axial ends of the slots S. Hence, it is possible to limit local application of force to the circumferential bent portions of the first and second projections 52 and 53 of the segment conductor 25 from the corners of the tooth formation portions 43, and it is possible to limit damages to the bent portions.

(16) Since the stacked portion 41 of the magnetic plate 40 is swaged and fixed to the core sheet 30 of the axial end in the main core portion 31, it is possible to fix the stacked portion 41 of the magnetic plate 40 and the core sheet 30 to each other by the simple structure including the projection 21a (dowel) and the recess 21b.

The first embodiment may be modified as follows.

Although the rotor opposing portion 44 has the substantially trapezoidal shape as viewed from the radial direction in the first embodiment, the present invention is not limited to this structure. The shape of the rotor opposing portion 44 as viewed from the radial direction can freely be changed only if the rotor opposing portion 44 is magnetically skewed (variation in magnetic flux is smoothed) with respect to the stacked portion 41 and the tooth formation portion 33 of the main core portion 31. One example thereof will now be described as structures S1 to S3. The structures S1 to S3 which will now be described may be combined with the first embodiment and other modifications when necessary.

Structure S1

Figure 9:
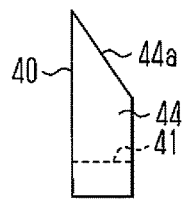
FIG. 9 is a front view illustrating a rotor opposing portion in another example of the first embodiment.

As shown in FIG. 9, only the side edge 44a on the one side in the circumferential direction may be inclined, and the rotor opposing portion 44 may magnetically be skewed. That is, the rotor opposing portion 44 in this example has an axial length which is varied along the circumferential direction.

Structure S2

Figure 10:
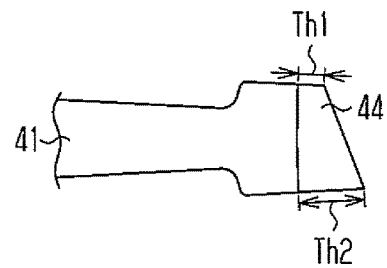
FIG. 10 is a plan view of a magnetic plate illustrating a rotor opposing portion in another example of the first embodiment.

As shown in FIG. 10, a radial length (thickness) of the rotor opposing portion 44 may be varied in the circumferential direction and the rotor opposing portion 44 may magnetically be skewed. In FIG. 10, a thickness Th1 of the rotor opposing portion 44 on the one side in the circumferential direction is less than a thickness Th2 of the rotor opposing portion 44 on the other side in the circumferential direction, and the thickness Th1 is gradually increased from the one side to the other side in the circumferential direction.

Structure S3

The rotor opposing portion 44 may be formed into a trapezoidal shape such that a circumferential width thereof is increased axially outward, and the rotor opposing portion 44 may magnetically be skewed.

Although the magnetic plates 40 provided on two axial sides have the same shapes in the first embodiment, the present invention is not limited to this structure. One example thereof will now be described as structures S4 and S5. The structures S4 and S5 which will now be described may be combined with the first embodiment and other modifications if necessary.

Structure S4

Figure 11:
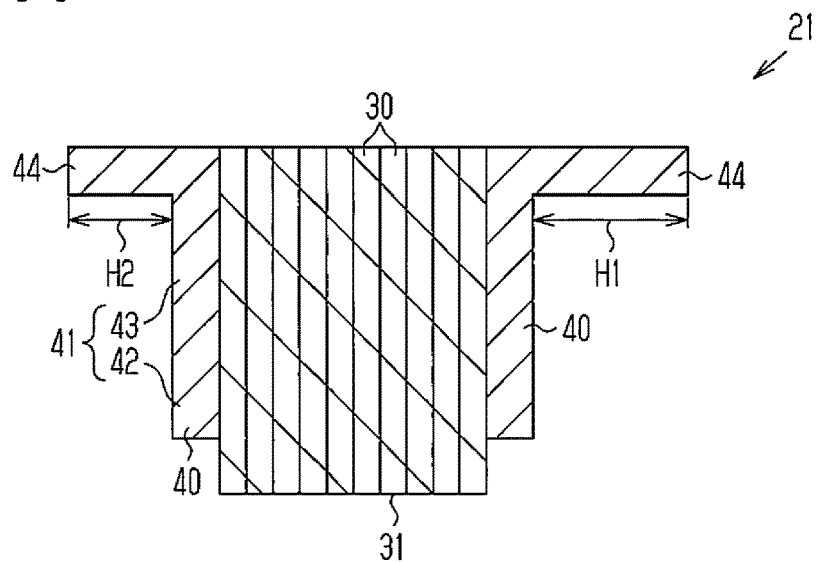
FIG. 11 is a cross-sectional view of a stator core illustrating a magnetic plate in another example of the first embodiment.

As shown in FIG. 11, an axial length H1 of the rotor opposing portion 44 of the magnetic plate 40 which is provided on one axial side of the main core portion 31 may be greater than an axial length H2 of the rotor opposing portion 44 of the magnetic plate 40 which is provided on the other axial side.

Structure S5

Figure 12:
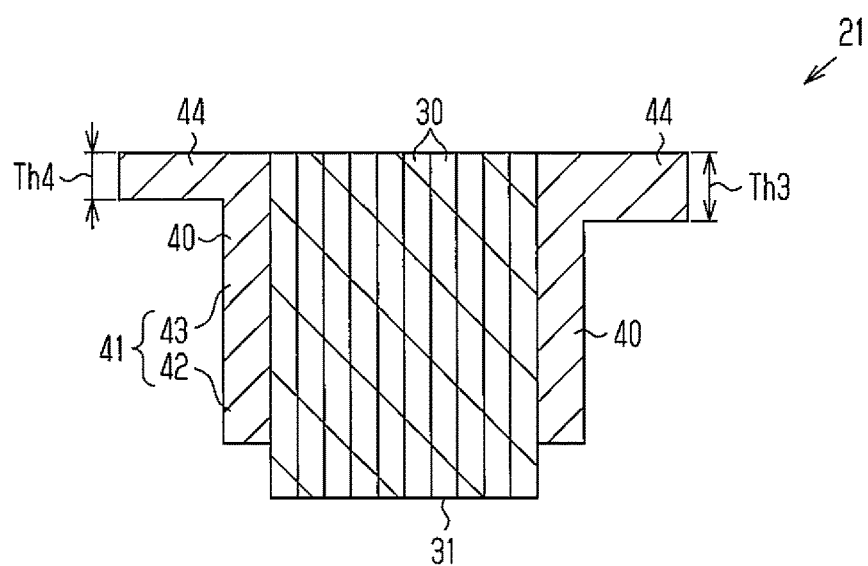
FIG. 12 is a cross-sectional view of a stator core illustrating a magnetic plate in another example of the first embodiment.

As shown in FIG. 12, a radial length (thickness) Th3 of the rotor opposing portion 44 of the magnetic plate 40 which is provided on one axial side of the main core portion 31 may be greater than a radial length (thickness) Th4 of the rotor opposing portion 44 of the magnetic plate 40 which is provided on the other axial side.

In the first embodiment, the circumferential width of the axial basal end side (axial inner side) of the rotor opposing portion 44 is formed equal to the circumferential widths of the distal ends of the tooth formation portions 33 and 43 which form the wide portion 24b of the tooth 24, but the invention is not limited to this structure. One example thereof will now be described as structures S6 and S7. The structures S6 and S7 which will now be described may be combined with the first embodiment and other modifications if necessary.

Structure S6

As shown in FIGS. 13A, 13B, and 13C, magnetic plates 70 and 71 are provided on two axial sides of the main core portion 31. As shown in FIGS. 13A and 13B, a rotor opposing portion 70a of the magnetic plate 70 provided on one axial side has a circumferential width on the axial basal end side which is smaller than circumferential widths of the distal ends of the tooth formation portions 33 and 43 which form the wide portion 24b of the tooth 24. The rotor opposing portion 70a has such a shape that it leans toward one side in the circumferential direction with respect to the tooth formation portions 33 and 43, and the rotor opposing portion 70a does not exist on the other side in the circumferential direction.

As shown in FIGS. 13B and 13C, a rotor opposing portion 71a of the magnetic plate 70 provided on the other axial side has a circumferential width on the axial basal end side which is smaller than circumferential widths of the distal ends of the tooth formation portions 33 and 43 which form the wide portion 24b of the tooth 24. The rotor opposing portion 71a has such a shape that it leans toward one side in the circumferential direction with respect to the tooth formation portions 33 and 43 and thus, the rotor opposing portion 71a does not exist on the other side in the circumferential direction.

The rotor opposing portion 70a on the one side in the axial direction and the rotor opposing portion 71a on the other side in the axial direction are overlapped on each other as viewed from the axial direction in substantially central portions of the magnetic plates 70 and 71. The rotor opposing portion 70a on the one side in the axial direction is not overlapped on the rotor opposing portion 71a on the other side in the axial direction as viewed from the axial direction on the one side in the circumferential direction of the magnetic plates 70 and 71. The rotor opposing portion 71a on the other side in the axial direction is not overlapped on the rotor opposing portion 70a on the one side in the axial direction as viewed from the axial direction on the other side in the circumferential direction of the magnetic plates 70 and 71. According to this structure, areas of the rotor opposing portions 70a and 71a which are opposed to the rotor 14 in the circumferential direction are varied and magnetic skew can be applied in the circumferential direction.

Structure S7

Although it is not mentioned in the Structure S6, the side edges 70b and 71b of the rotor opposing portions 70a and 71a may be inclined in the circumferential direction relative to the axial direction, and the rotor opposing portions 70a and 71a may have tapered surfaces as shown in FIG. 14.

Although it is not especially mentioned in the first embodiment and the modifications, a surface of the rotor opposing portion which is opposed to the rotor may have an arc shape as viewed from the axial direction, and this arc shape may have a curvature smaller than that of the outer circumference of the rotor as shown in FIG. 15. According to this structure, a circumferentially outward portion of the rotor opposing surface more separates from the rotor. Therefore, it is possible to more reliably reduce cogging torque.

Figure 16:
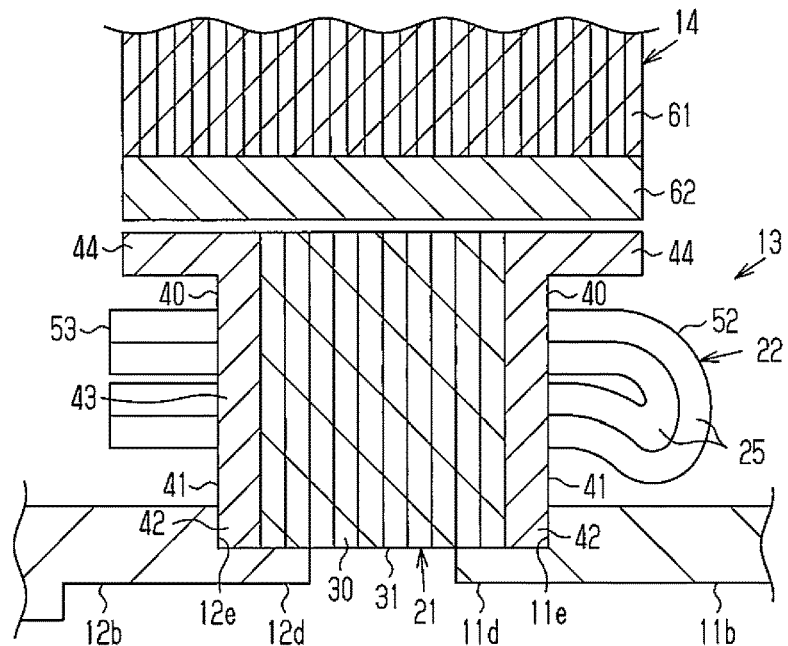
FIG. 16 is a partially enlarged schematic cross-sectional view of a motor in another example of the first embodiment.

The stator holding portions 11b and 12b of the frames 11 and 12 directly hold in between the outer circumferential edge (exposed surface 31a) of the main core portion 31 in the axial direction, and the stator holding portions 11b and 12b do not abut against the magnetic plate 40 in the axial direction in the first embodiment, but the invention is not especially limited to this structure. As shown in FIG. 16 for example, the main core portion 31 may be held in the axial direction with the annular portion 42 (stacked portion 41) of the magnetic plate 40. According to the structure shown in FIG. 16, since it is unnecessary to reduce the stacked portion 41 of the magnetic plate 40 in size in the radial direction so that the stacked portion 41 does not interfere in the axial direction with the stator holding portions 11b and 12b, it is possible to limit decreases in the output. When the thickness T1 of the magnetic plate 40 is greater than the thickness T2 of the core sheet 30 to enhance the output, it is possible to suppress the variation in the axial size of the entire motor 10 by adjusting the number of the core sheets 30 which are thinner than the magnetic plate 40.

Figure 17:
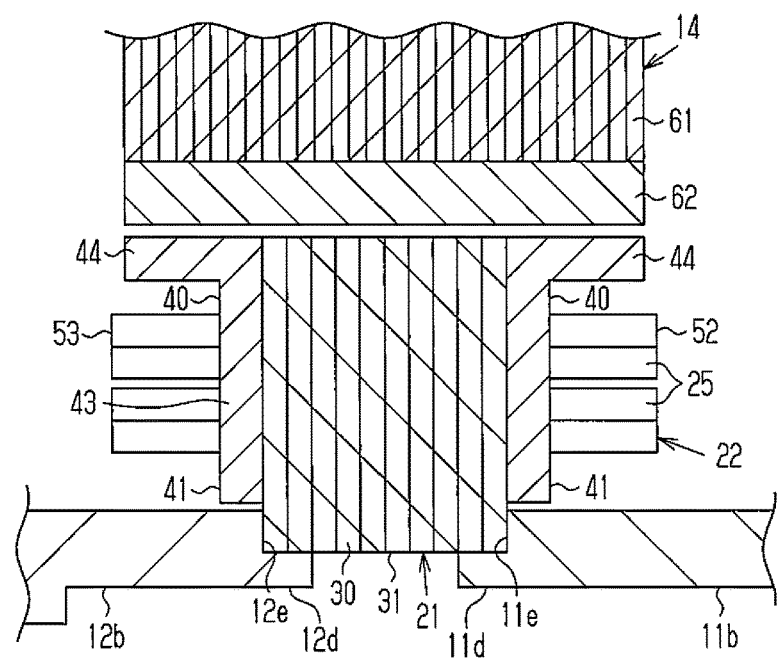
FIG. 17 is a partially enlarged schematic cross-sectional view of a motor in another example of the first embodiment.

In the first embodiment, each of the segment conductors 25 is folded back on the side of the first projection 52 which connects the pair of straight portions 51 inserted through the slots S, and the segment conductors 25 are bonded to one another on the side of the second projection 53 through welding or the like, but the invention is not especially limited to this structure. As shown in FIG. 17 for example, the pair of straight portions 51 may be formed as separated members, and they may be bonded to each other also in the first projection 52 through welding or the like. The connecting method of the segment conductors 25 is not limited to welding, and a connection structure using another member such as a bus bar may be employed.

In the first embodiment, the exposed surface 31a is formed over the entire outer circumference of the axial end surface of the main core portion 31 by making the outer diameter of the stacked portion 41 of the magnetic plate 40 smaller than that of the core sheet 30, and the stator holding portions 11b and 12b of the frames 11 and 12 hold in between the exposed surface 31a, but the invention is not especially limited to this structure. For example, a projection projecting radially outward from the outer circumferential surface of the main core portion 31 (core sheet 30) may be formed, and the stator holding portions 11b and 12b may hold in between this projection.

Although the magnetic plate 40 is swaged and fixed to the main core portion 31 (core sheet 30) in the first embodiment, the magnetic plate 40 may be fixed thereto through adhesion or welding.

Although the thickness T1 of the magnetic plate 40 is set to be greater than the thickness T2 of the core sheet 30 in the first embodiment, the invention is not especially limited to this structure. The thickness T1 of the magnetic plate 40 may be set to be less than or equal to the thickness T2 of the core sheet 30

Although the magnetic plates 40 are provided on the two axial sides of the main core portion 31 in the first embodiment, the invention is not especially limited to this structure. The magnetic plate 40 may be provided only on one of axial sides of the main core portion 31.

The main core portion 31 of the stator core 21 is of the stacked structure including the plurality of core sheets 30 in the above embodiment, but the main core portion 31 may be an integrally molded product which is formed by molding for example.

The armature winding 22 formed from the segment conductor 25 is used in the first embodiment, but an armature winding formed by winding a copper wire around a tooth may be used.

Although a ferrite magnet is used as the field magnet 62 of the rotor 14 in the first embodiment, other magnets such as a neodymium magnet may be used.

In the first embodiment, the invention is embodied in the inner rotor type motor 10 in which the rotor 14 is arranged on the inner peripheral side of the stator 13, but the invention is not especially limited to this structure. The invention may be embodied in an outer rotor type motor in which the rotor is arranged on the outer circumferential side of the stator.

Figure 18:
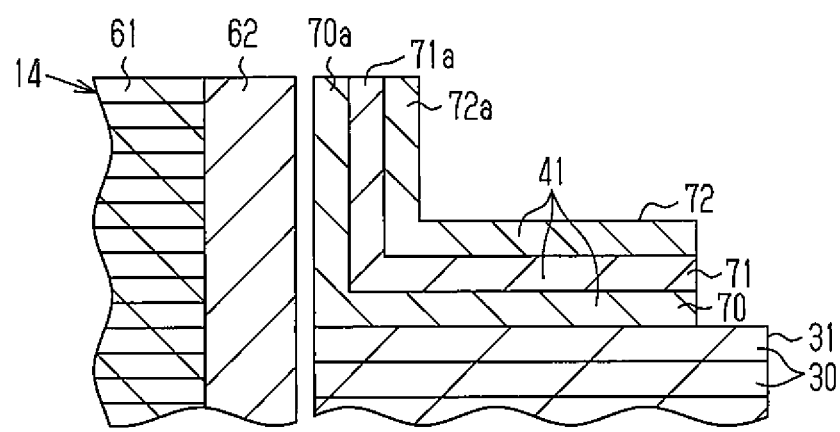
FIG. 18 is a cross-sectional view illustrating a magnetic plate of a motor in another example of the first embodiment.
Figure 19:
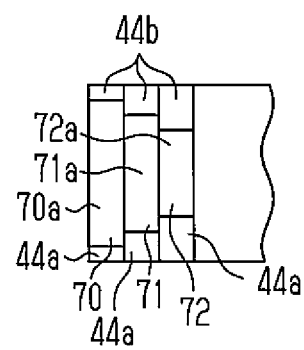
FIG. 19 is a plan view of the magnetic plate shown in FIG. 18 as viewed from the outer side in the axial direction.

Although it is not especially mentioned in the first embodiment, a plurality of magnetic plates may be stacked one another as shown in FIGS. 18 and 19 for example. In FIGS. 18 and 19, since three magnetic plates 70, 71 and 72 are stacked, rotor opposing portions 70a, 71a and 72a of the magnetic plates 70, 71 and 72 are stacked one another in the radial direction. Circumferential widths of portions of the rotor opposing portions 70a, 71a and 72a on the axial basal end side (closer to the main core portion 31) are substantially equal to one another, and circumferential widths of portions thereof on the axial distal end side (opposite side from the main core portion 31) are different from one another. That is, on the axial distal end side of the rotor opposing portions 70a, 71a and 72a, a longer distance between the rotor opposing portions and the rotor 14 (radially outward in this structure) increases the inclination angle formed by the side edges 44a and 44b at the two circumferential sides. The plurality of rotor opposing portions 70a, 71a and 72a which are stacked in the radial direction are formed such that a longer distance between the rotor opposing portions and the rotor 14 increases the inclination angle of the side edges 44a and 44b relative to the axial direction. Hence, as the distance decreases between the rotor opposing portions and the rotor 14, the area of the surface (rotor opposing portion 44 as viewed from the radial direction) of the rotor opposing portion 44 opposed to the rotor 14 increases, and magnetic flux is drawn more easily. As the distance increases between the rotor opposing portions 70a, 71a and 72a and the rotor 14, the inclination angle of the side edges 44a and 44b increases and the area of the rotor opposing portion 44 as viewed from the radial direction decreases. Hence, it is possible to gradually vary the magnetic flux. This contributes to the skew effect.

A second embodiment of the motor will now be described with reference to FIGS. 20 to 29. A motor 10 of the second embodiment is partially common to the motor 10 of the first embodiment. Therefore, only portions which are different from the first embodiment will be described in detail, and description of the common portions will be omitted for the sake of convenience.

Figure 20:
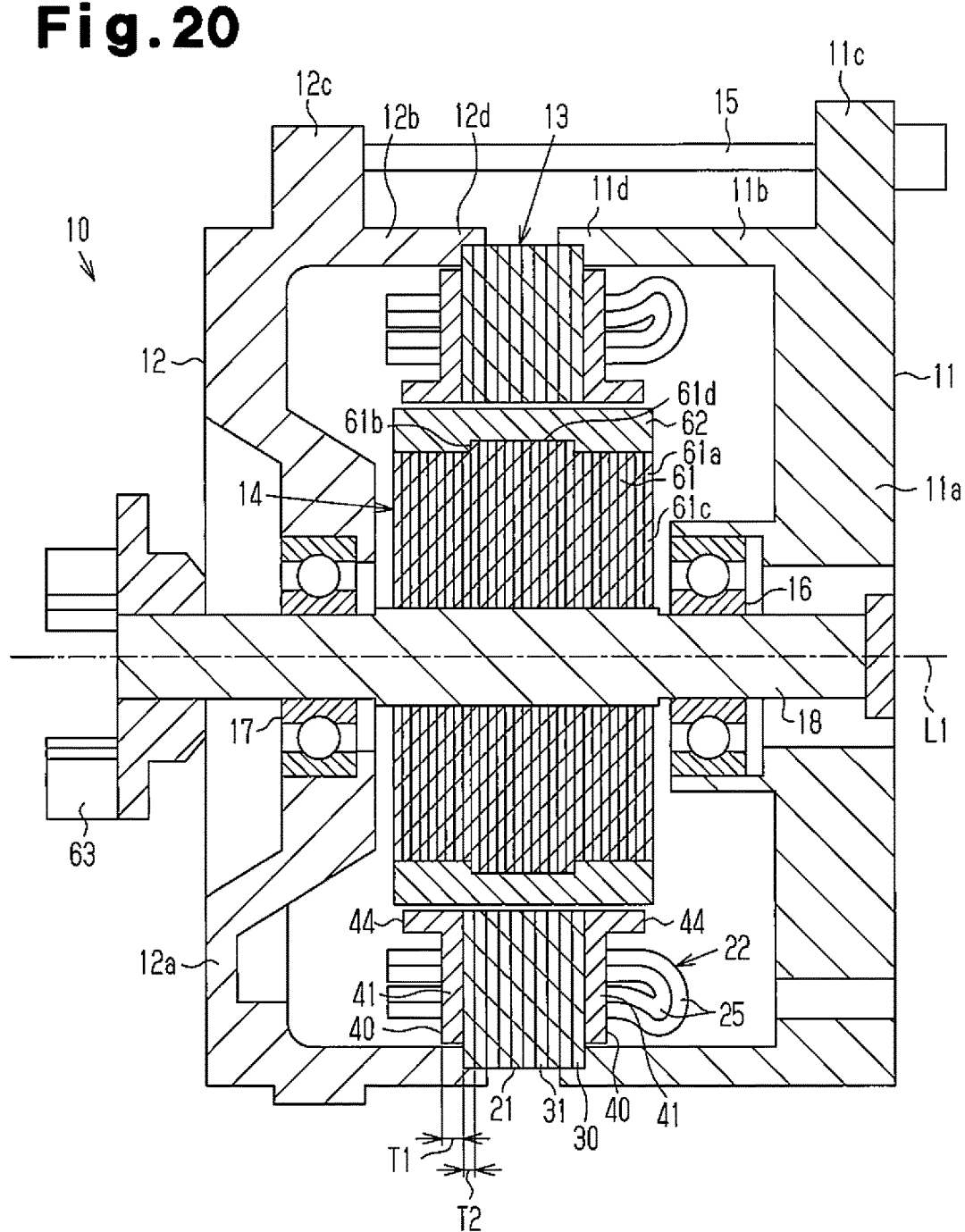
FIG. 20 is a schematic cross-sectional view of a motor according to a second embodiment of the present invention.
Figure 21:
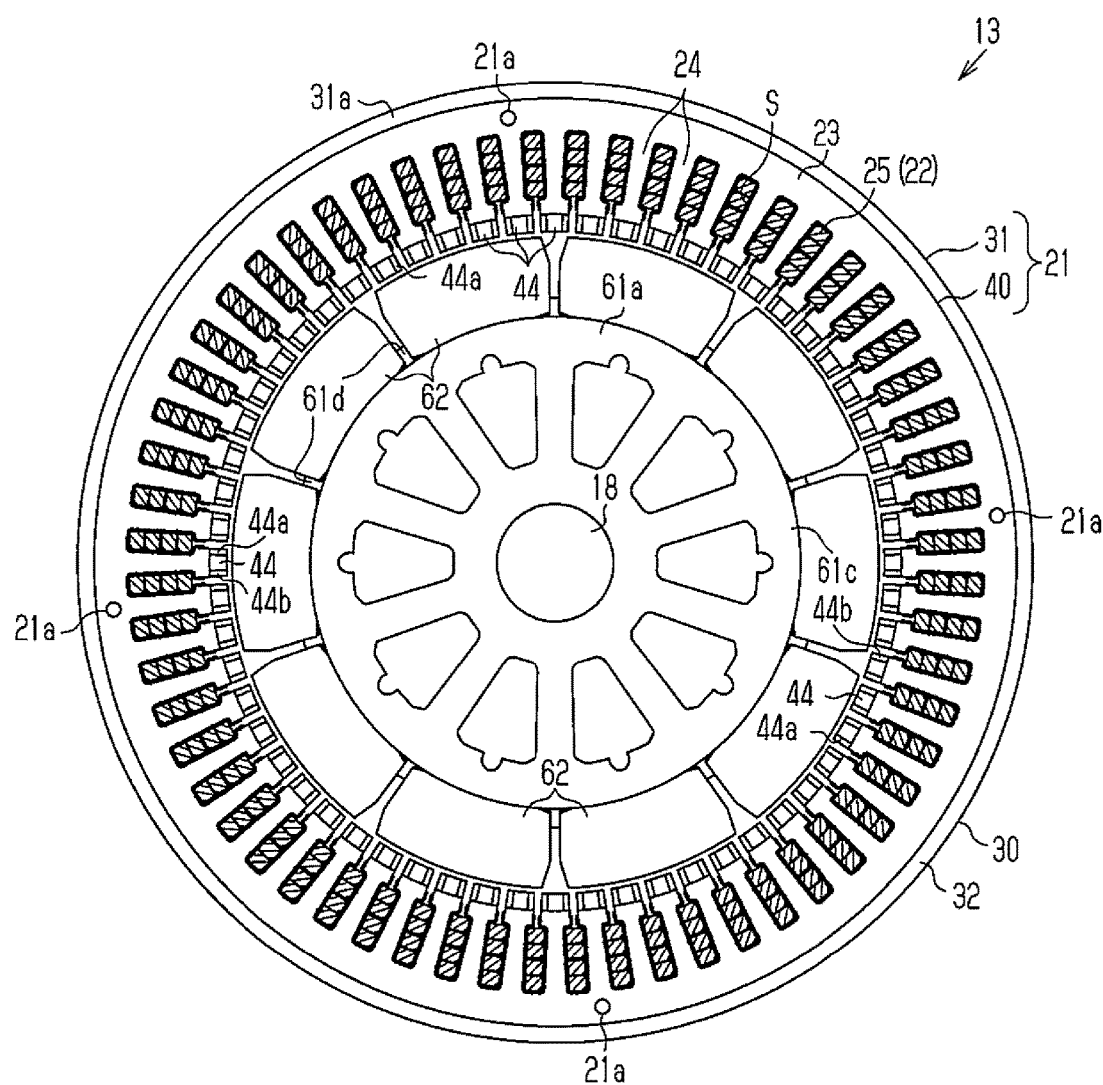
FIG. 21 is a plan view of a stator shown in FIG. 20.
Figure 22:
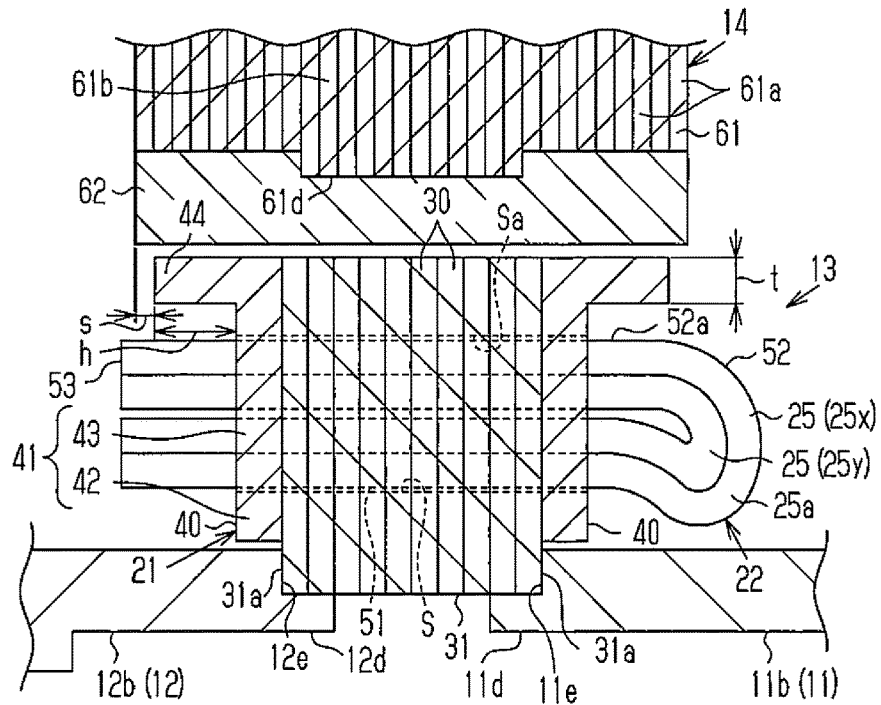
FIG. 22 is a partially enlarged schematic cross-sectional view of the motor shown in FIG. 20.

As shown in FIGS. 20 to 22, a rotor core 61 is formed by stacking a plurality of first and second core sheets 61a and 61b on one another in an axial direction of the motor 10. As shown in FIGS. 20 and 21, the first core sheet 61a includes an annular portion 61c. The second core sheet 61b has substantially the same shape as that of the first core sheet 61a. An outer surface of the annular portion 61c of the second core sheet 61b in a radial direction of the motor 10 includes a plurality of projections 61d (positioning portions) which project radially outward and which are arranged along a circumferential direction of the motor 10.

As shown in FIG. 22, the rotor core 61 of the second embodiment is formed by stacking a plurality of the second core sheets 61b provided substantially at their axial central portions with the projections 61d on one another, and by stacking a plurality of the first core sheets 61a on one another on two axial sides. That is, the projections 61d are located at an axial central portion of the rotor core 61.

As shown in FIG. 21, field magnets 62 are ferrite magnets, and are arranged such that their magnetic poles (north poles and south poles) are different from one another alternately in the circumferential direction. The field magnets 62 are so-called segment magnets fixed to an outer circumferential surface of the rotor core at distances from one another in the circumferential direction.

Axial lengths of the rotor core 61 and the field magnet 62 of the rotor 14 are set to be greater than an axial length of an inner circumferential end of a stator core 21 (i.e., length from the distal end of the rotor opposing portion 44 of one magnetic plate 40 to the distal end of the rotor opposing portion 44 of the other magnetic plate 40). That is, the field magnet 62 is opposed to an inner circumferential surface of a main core portion 31 of the stator core 21 and the rotor opposing portion 44 of each of the magnetic plates 40 in the radial direction. Each of the field magnets 62 is arranged such that it abuts, in the circumferential direction, against the projection 61d provided on the substantially central side of the rotor core 61 in the axial direction, or such that the field magnet 62 is arranged at a slight distance from the projection 61d. Thus, positional deviation (idling) of the field magnet 62 in the circumferential direction is suppressed.

The relationship of the rotor 14 and the stator 13 will now be described.

Figure 23:
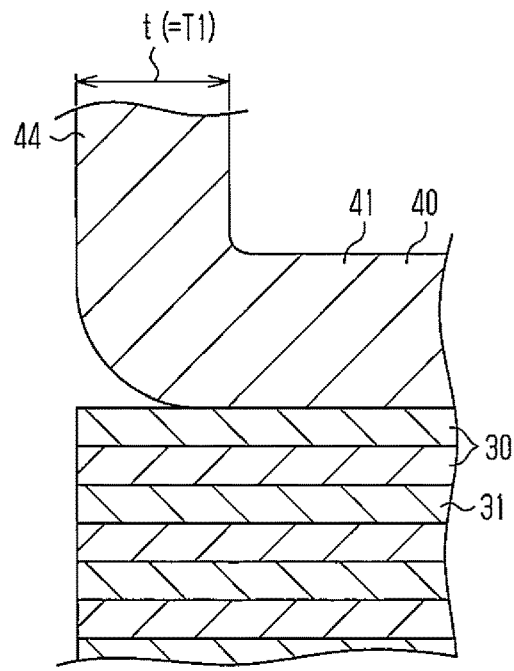
FIG. 23 is a cross-sectional view of a stator core of a structure using one sheet of a magnetic plate shown in FIG. 20.
Figure 24:
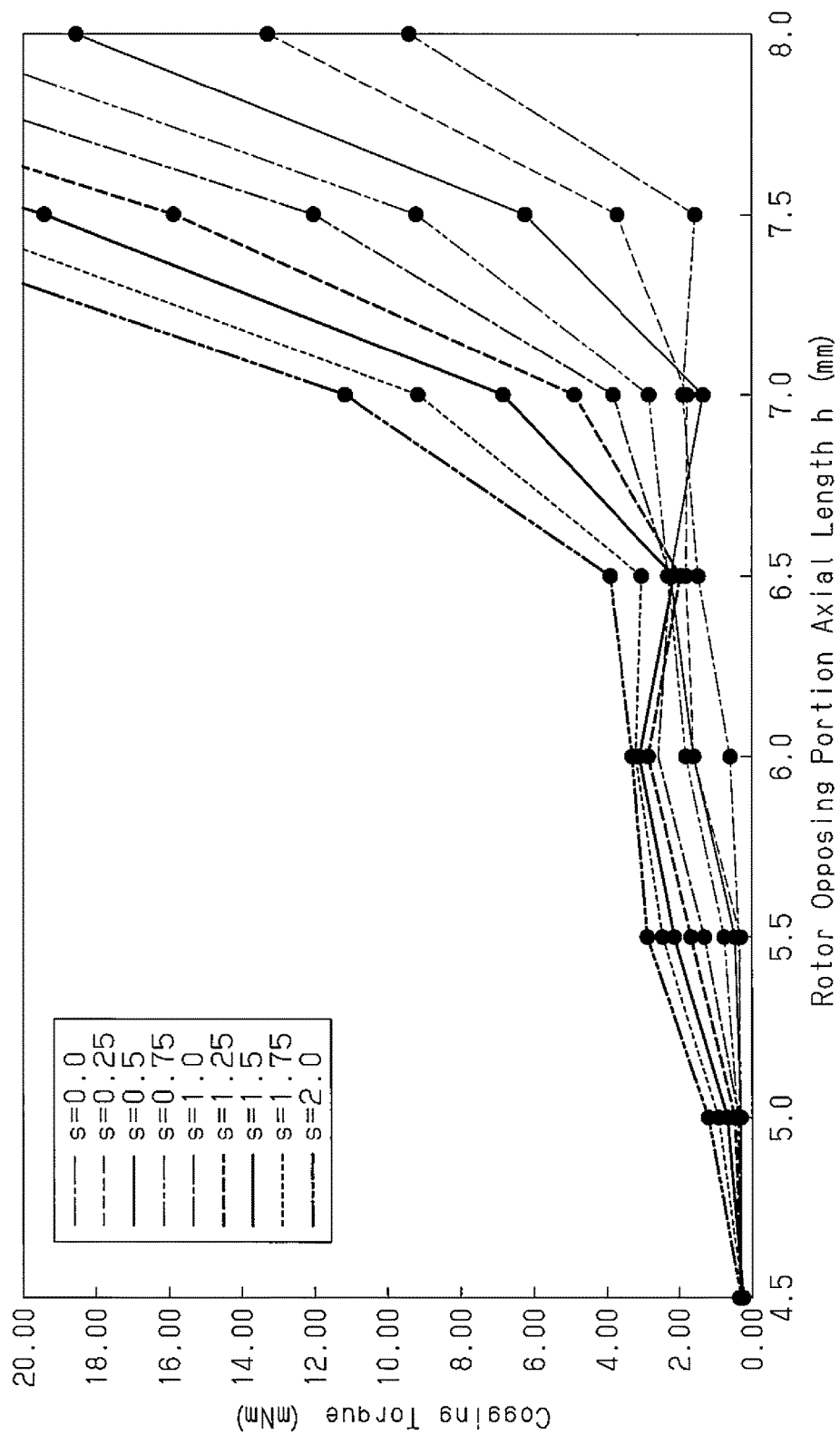
FIG. 24 is a graph showing the relationship between a rotor opposing portion of the magnetic plate shown in FIG. 20 and the cogging torque.
Figure 25:
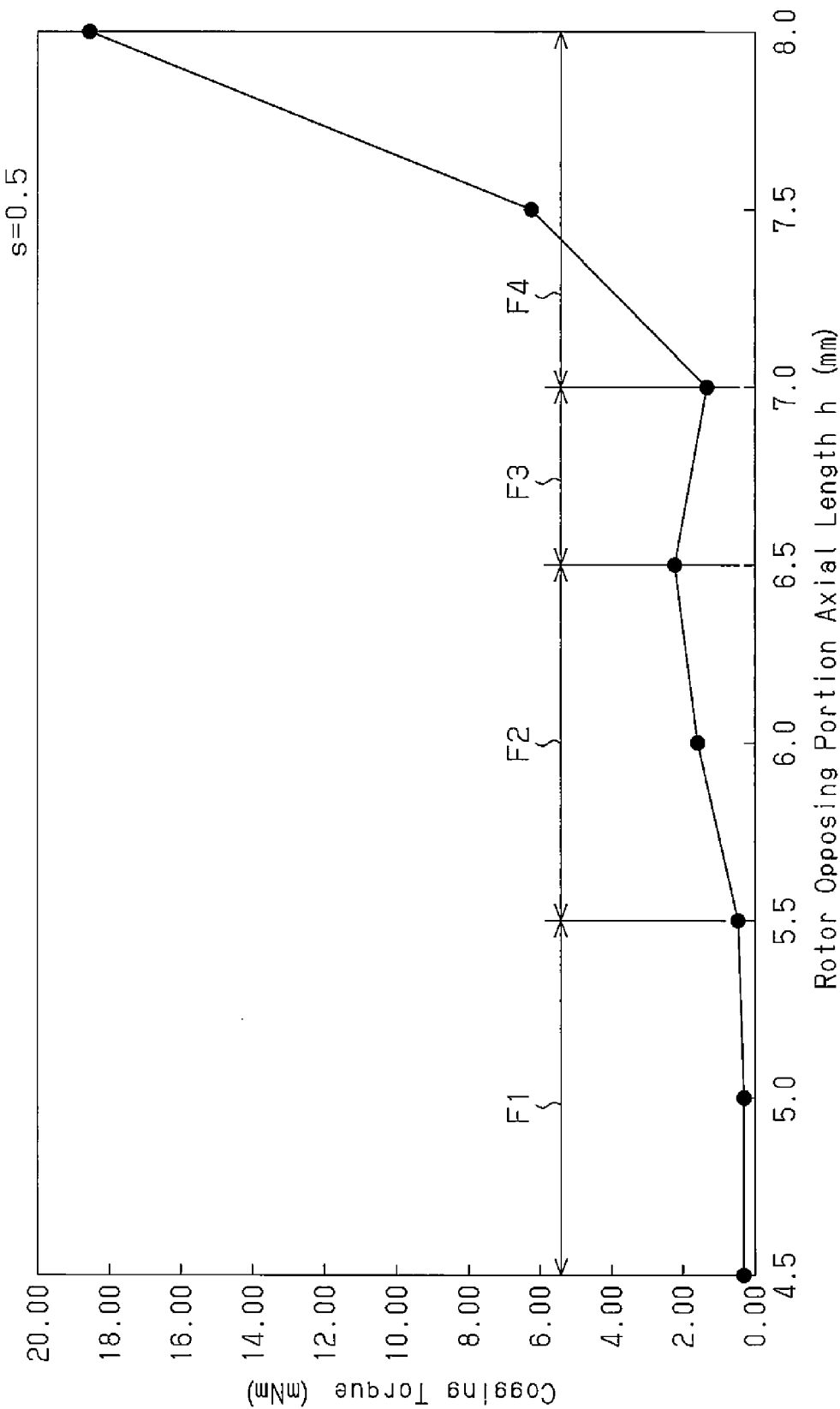
FIG. 25 is a graph showing the relationship between the rotor opposing portion and the cogging torque when an axial length of a field magnet is 0.5 mm from the rotor opposing portion of the magnetic plate shown in FIG. 20.

FIG. 24 shows the relationship between cogging torque and an axial length of the rotor opposing portion 44. A horizontal axis shows the axial length h of the rotor opposing portion 44, and a vertical axis shows cogging torque. In FIG. 24, a variety of axial extending lengths s of the field magnet 62 with respect to the rotor opposing portion 44 is shown by changing kinds of lines. More specifically, as the axial extending length s of the field magnet 62 with respect to the rotor opposing portion 44, nine kinds of axial extending lengths s, i.e., 0.0, 0.25, 0.5, 0.75, 1.0, 1.25, 1.5, 1.75 and 2.0 are shown in total, and these lengths are shown by alternate long and short dash line, long broken line, solid line, alternate long and two short dashes line, thick alternate long and short dash line, thick broken line, thick solid line, broken line and thick alternate long and two short dashes line in this order. FIG. 25 only shows a case in which the axial extending length s of the field magnet 62 with respect to the rotor opposing portion 44 shown by solid line in FIG. 24 is 0.5. In any of cases, a radial length (thickness) t of the rotor opposing portion 44 is 1.2 mm, and is the same thickness as the thickness T1 as shown in FIG. 23. If the axial length h of the rotor opposing portion 44 is increased, the axial length of the field magnet 62 itself is also relatively increased.

As can be found from FIGS. 24 and 25, variation in cogging torque is small in a first range (F1 in FIG. 25) where the axial length h of the rotor opposing portion 44 is relatively short. If the axial length h of the rotor opposing portion 44 exceeds the first range F1 where the axial length h is relatively short and the axial length h falls in a predetermined second range (F2 in FIG. 25), on the axial basal end side which is a root portion of the rotor opposing portion 44, increase in magnetic fluxes is induced and cogging torque gradually increases. If the axial length h of the rotor opposing portion 44 exceeds the second range F2 and falls in a predetermined third range (F3 in FIG. 25), phase of cogging torque at the rotor opposing portion 44 (magnetic plate 40) is inverted with respect to the main core portion 31, an offset relation is established, and increase in cogging torque is temporarily suppressed. If the axial length h of the rotor opposing portion 44 exceeds the third range F3 and falls in a relatively long range (F4 in FIG. 25), it can be found that cogging torque is suddenly deteriorated.

Figure 26:
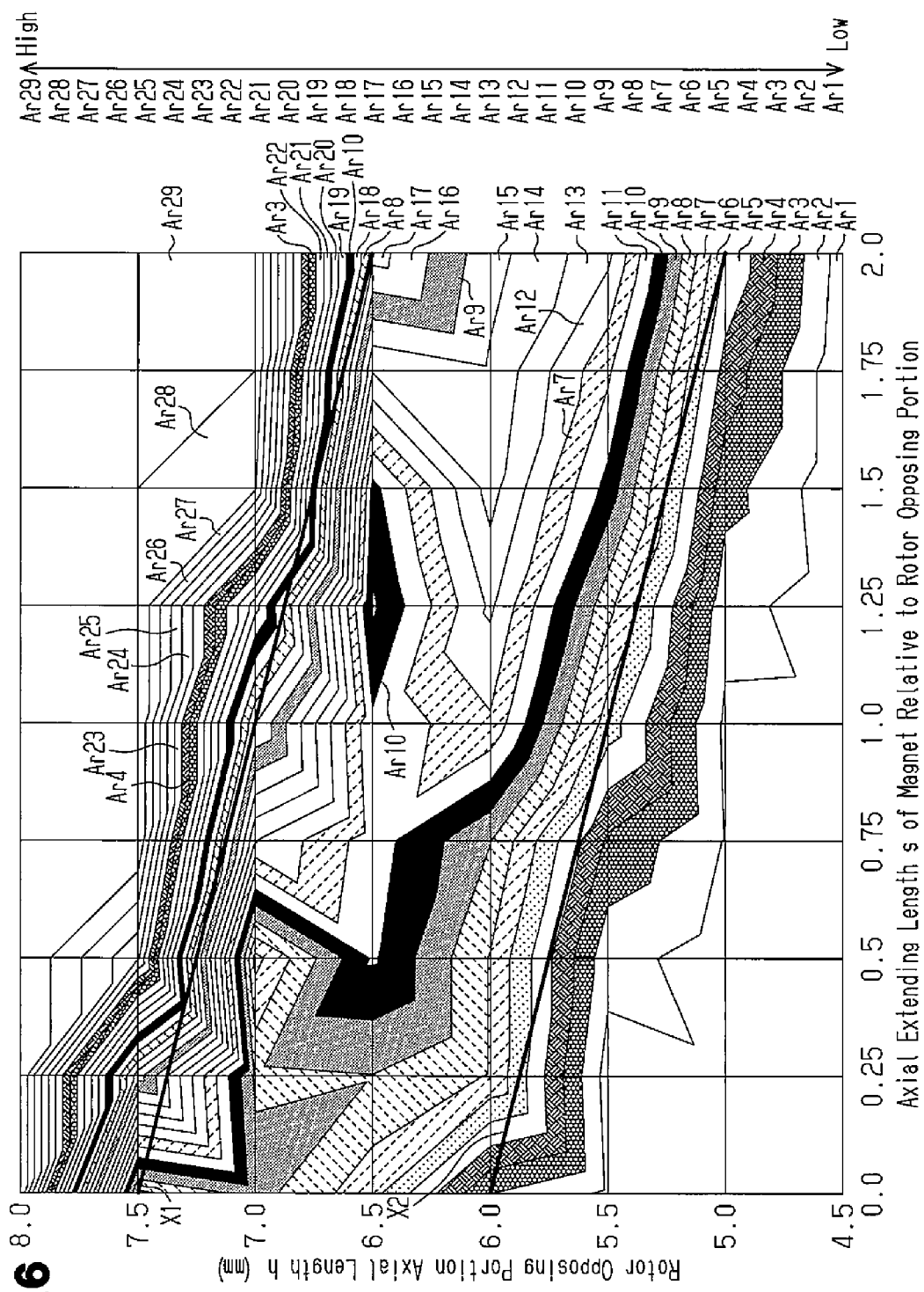
FIG. 26 is a planar graph showing the relationship between the rotor opposing portion of FIG. 20, the field magnet, and the cogging torque.
Figure 27:
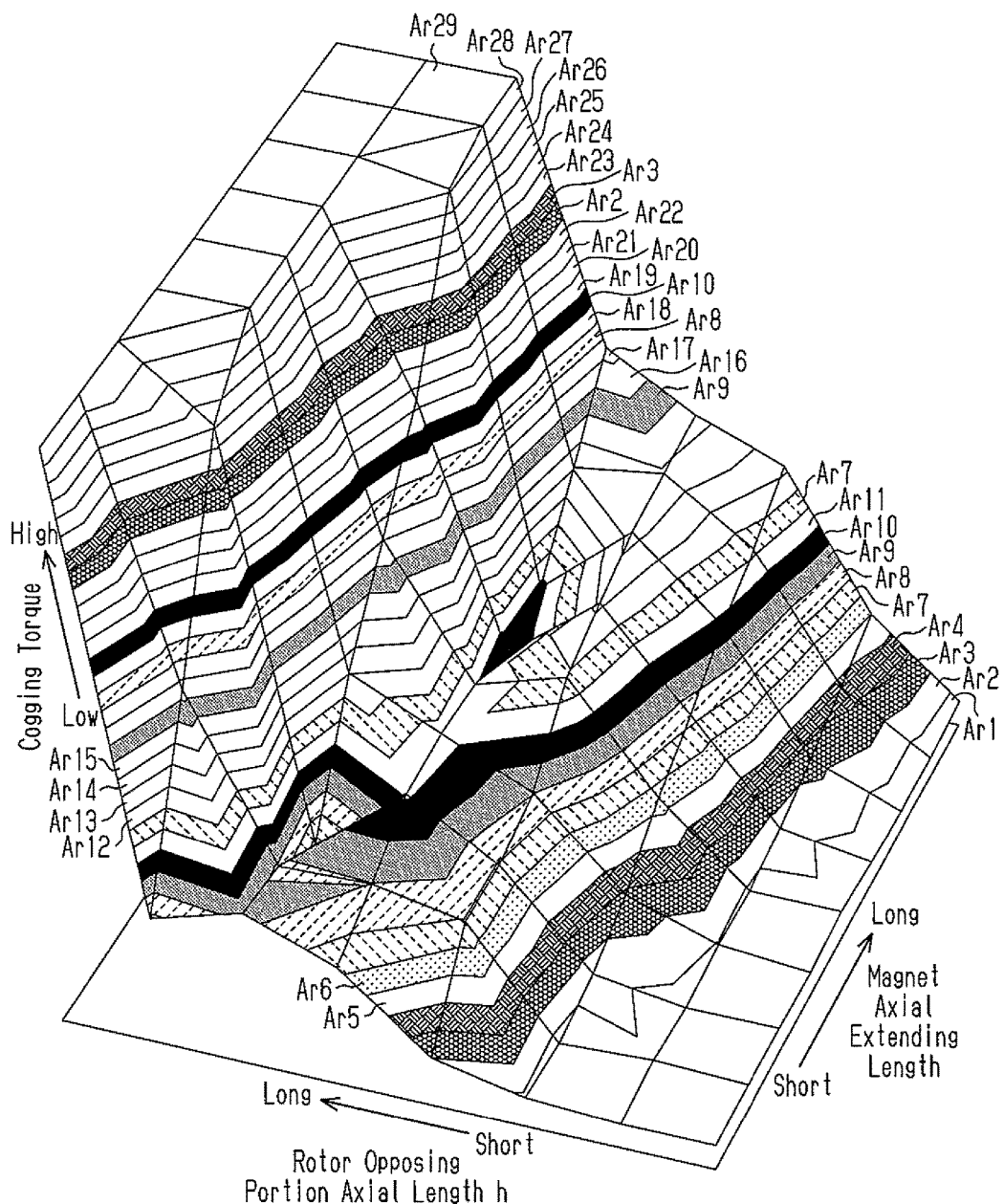
FIG. 27 is a three-dimensional graph showing the relationship between the rotor opposing portion in the magnetic plate of FIG. 20 and the cogging torque.

FIGS. 26 and 27 show the relationship between the axial length h of the rotor opposing portion, the axial extending length s of the field magnet with respect to the rotor opposing portion, and cogging torque. In FIG. 26, a vertical axis shows the axial length h of the rotor opposing portion 44, a horizontal axis shows the axial extending length s of the field magnet 62 with respect to the rotor opposing portion 44, and regions Ar1 to Ar29 show magnitude of cogging torque. FIG. 27 shows FIG. 26 in three dimensions. FIGS. 26 and 27 show regions Ar1, Ar2 . . . Ar28 and Ar29 in increasing order of cogging torque. Regions having the same range of cogging torque are shown by the same pattern.

As can be found from FIGS. 26 and 27, there is a tendency that an increase in the axial length h of the rotor opposing portion 44 generally increases the cogging torque, and an increase in the axial extending length s of the field magnet 62 with respect to the rotor opposing portion 44 generally increases the cogging torque. These relations can be expressed by the following equation 1. In the equation 1, h shows the axial length of the rotor opposing portion 44, t shows a radial length (thickness) of the rotor opposing portion 44, and s shows the axial extending length of the field magnet 62 with respect to the rotor opposing portion 44.

$$h = t \times K - 0.5\,s \quad \text{(equation 1)}$$

In the case of the second embodiment, if a coefficient K is set in a range of 0<K<6.3, it is possible to obtain cogging torque in a range lower than a straight line X1 in FIG. 26. That is, if the magnetic plate 40 and the field magnets 62 are formed such that the coefficient K is set in the range of 0<K<6.3 and the equation 1 is satisfied, it is possible to bring cogging torque into a range (first range F1, second range F2 and third range F3 in FIG. 25) where sudden variation in cogging torque is small while taking the drawn amount of magnetic flux into consideration.

If a lower limit of the coefficient K is set to 5.4 and the range of the coefficient K is set in a range of 5.4<K<6.3, cogging torque can be set to a range (range corresponding to third range F3) between a straight line X2 and the straight line X1 in FIG. 26. That is, if the magnetic plate 40 and the field magnets 62 are formed such that the coefficient K is set in the range of 5.4<K<6.3 and the equation 1 is satisfied, it is possible to increase, in a preferable manner, the drawn amount of magnetic flux in the range (third range F3) where sudden variation in cogging torque is small.

Hence, according to the motor 10 of the second embodiment, the coefficient K is in the range of 0<K<6.3 and the equation 1 is satisfied. More preferably, the motor 10 is formed such that the coefficient K is in the range of 5.4<K<6.3 and the equation 1 is satisfied.

The operation of the second embodiment will now be described.

According to the motor 10 of the second embodiment, the coefficient K is in the range of 0<K<6.3 and the equation 1 is satisfied. Hence, the rotor opposing portion 44 of the magnetic plate 40 is provided in the range where sudden increase in cogging torque is suppressed, and the amount of drawn magnetic flux is obtained. Further, the motor 10 can also be formed such that the coefficient K is in the range of 5.4<K<6.3 and the equation 1 is satisfied. In this case, it is possible to increase, in a preferable manner, the amount of drawn magnetic flux in the range (third range F3) in which the sudden variation in cogging torque is small.

The rotor 14 is formed such that the field magnets 62 fixed to the outer circumferential surface of the rotor core 61 abut against the projections 61*d* of the rotor core 61 in the circumferential direction, or such that the field magnets 62 are arranged at slight distances from the projections 61*d*. Hence, positional deviation of the field magnets 62 in the circumferential direction is suppressed. The projections 61*d* are provided on axial central portions of the rotor core 61 so that the projections 61*d* are not opposed to the magnetic plate 40 in the radial direction. Thus, since portions which are easily demagnetized are dispersed in the axial direction, it is possible to relatively enhance anti-demagnetization properties.

The advantages of the second embodiment will now be described.

(17) The motor 10 is formed such that h=t×K−0.5 s is satisfied (K is in range of 0<K<6.3) wherein h is the axial length of the rotor opposing portion 44, t is the radial length (thickness) of the rotor opposing portion 44, and s is the axial extending length of the field magnet 62 with respect to the rotor opposing portion 44. Thus, it is possible to obtain cogging torque in the range equal to or lower than the straight line X1 in FIG. 26. Hence, it is possible to provide the rotor opposing portion 44 to obtain the amount of drawn magnetic flux within the range in which an increase in the cogging torque is limited. The motor 10 can also be formed such that the range of the coefficient K satisfies 5.4<K<6.3. In this case, cogging torque in the range of the straight lines X2 to X1 in FIG. 26 can be obtained. Hence, it is possible to increase the axial length of the rotor opposing portion 44 and the axial extending length of the field magnet 62, and to obtain the amount of drawn magnetic flux while limiting an increase in cogging torque.

(18) The projections 61*d* which position the magnets in the circumferential direction are formed at positions of the rotor core 61 where the projections 61*d* are not opposed to the stacked portion 41 of the magnetic plate 40 in the radial direction. Hence, portions of the field magnets 62 which abut against the projections 61*d* in the circumferential direction and portions of the field magnets 62 which are opposed to the stacked portion 41 in the radial direction are located at different positions in the axial direction. Thus, it is possible to enhance the anti-demagnetization properties.

(19) The projections 61*d* are formed at the axial central portions. Hence, the projections 61*d* are more reliably provided at positions where they are not opposed to the stacked portion 41 in the radial direction. Thus, it is possible to more reliably enhance the anti-demagnetization properties.

(20) Both the rotor core 61 and the stator core 21 are formed by stacking the plurality of core sheets 61a, 61b and 30 on one another in the axial direction. Hence, it is possible to carry out so-called simultaneous molding in which a plate-shaped member is punched into the core sheets 61a, 61b and 30 of both the cores 61 and 21 by metal punching and they are formed for example.

The second embodiment may be modified as follows.

Figure 28:
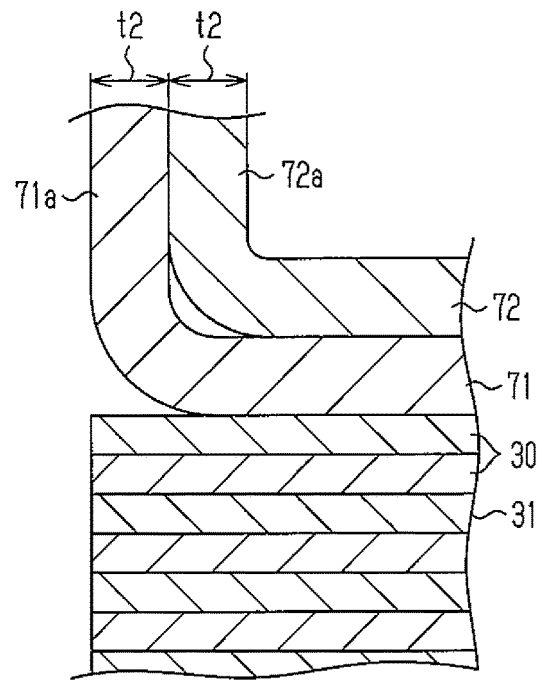
FIG. 28 is a cross-sectional view of a stator core in a structure in which two magnetic plates are stacked.
Figure 29:
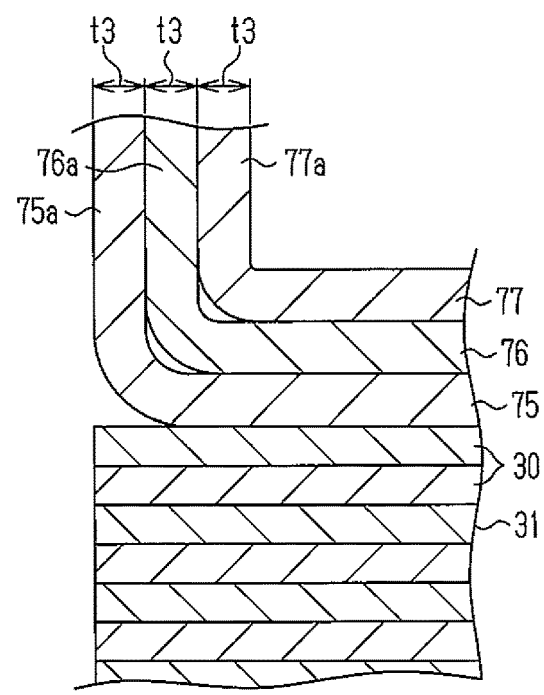
FIG. 29 is a cross-sectional view of a stator core in a structure in which three magnetic plates are stacked.

In the second embodiment, the magnetic plate 40 is used one each on each of both the axial ends of the main core portion 31, but the invention is not especially limited to this structure. For example, two magnetic plates may be stacked on each of both the axial ends of the main core portion 31 as shown in FIG. 28, or three magnetic plates may be stacked on each of both the axial ends of the main core portion 31 as shown in FIG. 29. As shown in FIG. 28, radial lengths of the rotor opposing portions 71a and 72a of the first and second magnetic plates 71 and 72 are respectively defined as t2. A total length of the radial length t2 of the rotor opposing portion 71a of the magnetic plate 71 and the radial length t2 of the rotor opposing portion 72a of the magnetic plate 72 corresponds to the radial length t of the rotor opposing portion 44 of the second embodiment. As shown FIG. 29, radial lengths of rotor opposing portions 75a, 76a and 77a of first to third magnetic plates 75, 76 and 77 may respectively be defined as t3. In this case also, a total length of the radial lengths t3 of the rotor opposing portions 75a, 76a and 77a of the first to third magnetic plates 75, 76 and 77 corresponds to the radial length t of the rotor opposing portion 44 of the second embodiment.

Although the stacked portion 41 of the magnetic plate 40 includes the annular portion 42 and the tooth formation portion 43 in the second embodiment, the invention is not limited to this structure. For example, the stacked portion 41 may be formed by only the tooth formation portion 43.

Although the rotor core 61 is of the stacked structure including the plurality of first and second core sheets 61a and 61b in the second embodiment, the invention is not limited to this structure. The rotor core 61 may be an integrally molded product which is formed by molding for example. According to this structure also, the projections 61d as positioning portions are formed on the rotor core.

The projections 61d as the positioning portions are provided at the positions where they are not opposed to the stacked portion 41 of the magnetic plate 40 in the radial direction in the second embodiment and preferably, the projections 61d are provided at the axial central portions of the rotor core 61, but the invention is not limited to this structure.

Figure 30:
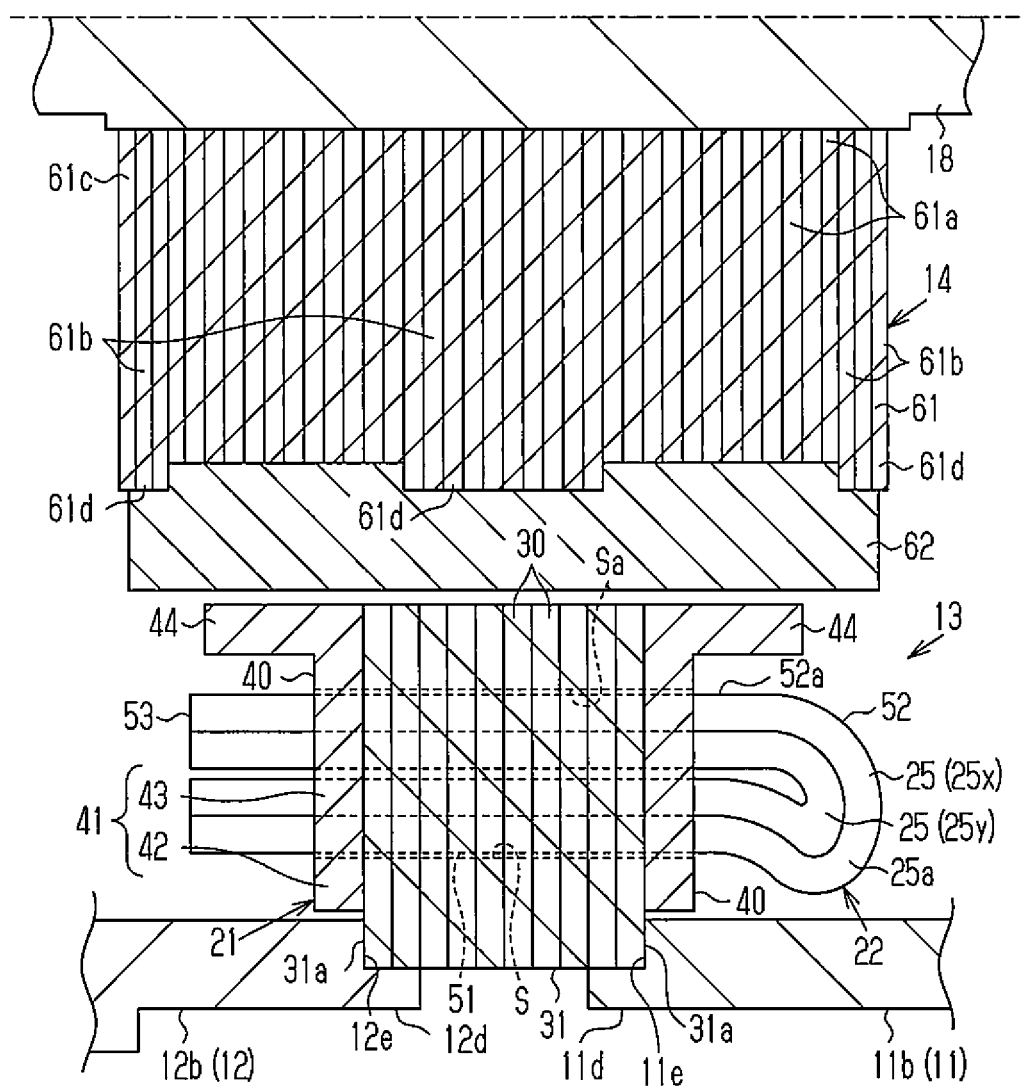
FIG. 30 is a partially enlarged schematic cross-sectional view of a motor in another example of the second embodiment.

As shown in FIG. 30 for example, the rotor core 61 may include the projections 61d at the axial central portions of the rotor core 61, and may include the projections 61d at the axial end of the rotor core 61. Alternatively, the rotor core 61 may include the projections 61d only on the axial end of the rotor core 61. If the projections 61d are provided on both the axial ends of the rotor core 61, the projections 61d and both longitudinal ends (both axial ends) of the field magnets 62 can abut against each other in the circumferential direction. Hence, it is possible to stably hold (position) the field magnet 62.

In the second embodiment and the modifications of the second embodiment, the projections 61d are provided at the positions of the rotor core 61 where the projections 61d are not opposed to both the stacked portion 41 and the rotor opposing portion 44 of the magnetic plate 40 in the radial direction, but the invention is not limited to this structure. The axial positions of the projections 61d may be changed only if the projections 61d are provided at positions where they are not opposed to at least the stacked portion 41 in the radial direction.

Although shapes of the projections 61d as the positioning portions are not specifically mentioned in the second embodiment, various shapes can be employed. The projections 61d may have rectangular shapes as viewed from the axial direction as shown in FIG. 21.

Further, the circumferential width of each of the projections 61d may be narrower radially outward as shown in FIG. 31. More specifically, the projection 61d is provided at its both circumferential sides with a pair of inclined surfaces 78 as shown in FIG. 31(b). The pair of inclined surfaces 78 inclines such that the circumferential width of the projection 61d becomes narrower radially outward (toward the stator 13). The pair of inclined surfaces 78 has symmetric shape with respect to the straight line X1 which extends through the radial center O of the rotation shaft 18 and the circumferential center of the projection 61d.

As shown in FIGS. 31(a) and (b), corners 62a are formed on the radial inner side and on both circumferential sides of the field magnets 62 (circumferential ends closer to the rotor core 61 in the radial direction). Each of the corners 62a includes inclined surfaces 62b which are substantially parallel to the inclined surfaces 78 of the projection 61d. The field magnets 62 are held between the rotor core 61 and a cylindrical cover 79 in the radial direction and are fixed to the rotor core 61. The cylindrical cover 79 is located between the rotor 14 and the stator 13 in the radial direction.

The projections 61d and the field magnets 62 are formed as described above. Thus, when the rotor 14 rotates and an inertial force FA1 is applied to the field magnets 62, the inclined surfaces 62b of the field magnets 62 abut against the inclined surfaces 78 of the projections 61d. Hence, the inertial force FA1 is divided into a component force FA2 in a direction intersecting with the inclined surface 78 at right angles and into a component force FA3 in a direction parallel to the inclined surface 78.

As a result, the component force F3 is received mainly by the cylindrical cover 79. Since the component force FA2 in the direction intersecting with the inclined surface 78 at right angles is applied to the projections 61d, an inertial force applied to the projections 61d can be reduced. Thus, damage to the projections 61d and the field magnets 62 can be limited.

Further, since the corner 62a having the inclined surfaces 62b which come into surface contact with the inclined surface 78 of the projection 61d is formed on the field magnet 62, stress concentration caused when the component force FA2 is applied to the projection 61d can be limited.

Hence, the field magnets 62 can be fixed without adhering the field magnets 62 using adhesive or the like. When the field magnets 62 are fixed also using the adhesive in combination, it is possible to reinforce the adhesion force. The cylindrical cover 79 can limit damage to the stator 13 and the like by scattered field magnets 62. In a structure in which the circumferential width of the projection 61d becomes smaller toward the stator 13, an inertial force (component force FA3) of the field magnet 62 caused when the rotor 14 rotates can be received by the cylindrical cover 79. Hence, it is possible to more reliably suppress the idling of the field magnet 62.

In the second embodiment, axial lengths of the rotor core 61 and the field magnet 62 of the rotor 14 are greater than the axial length of the inner circumferential end of the stator core 21 (i.e., length from the distal end of the rotor opposing portion 55 of one of the magnetic plates 40 to the distal end of the rotor opposing portion 44 of the other magnetic plate 40), but the invention is not limited to this structure. For example, the axial lengths of the rotor core 61 and the field magnet 62 of the rotor 14 may be substantially equal to the axial length of the inner circumferential end of the stator core 21. Alternatively, the axial lengths of the rotor core 61 and the field magnet 62 of the rotor 14 may slightly be less than the axial length of the inner circumferential end of the stator core 21.

Figure 32:
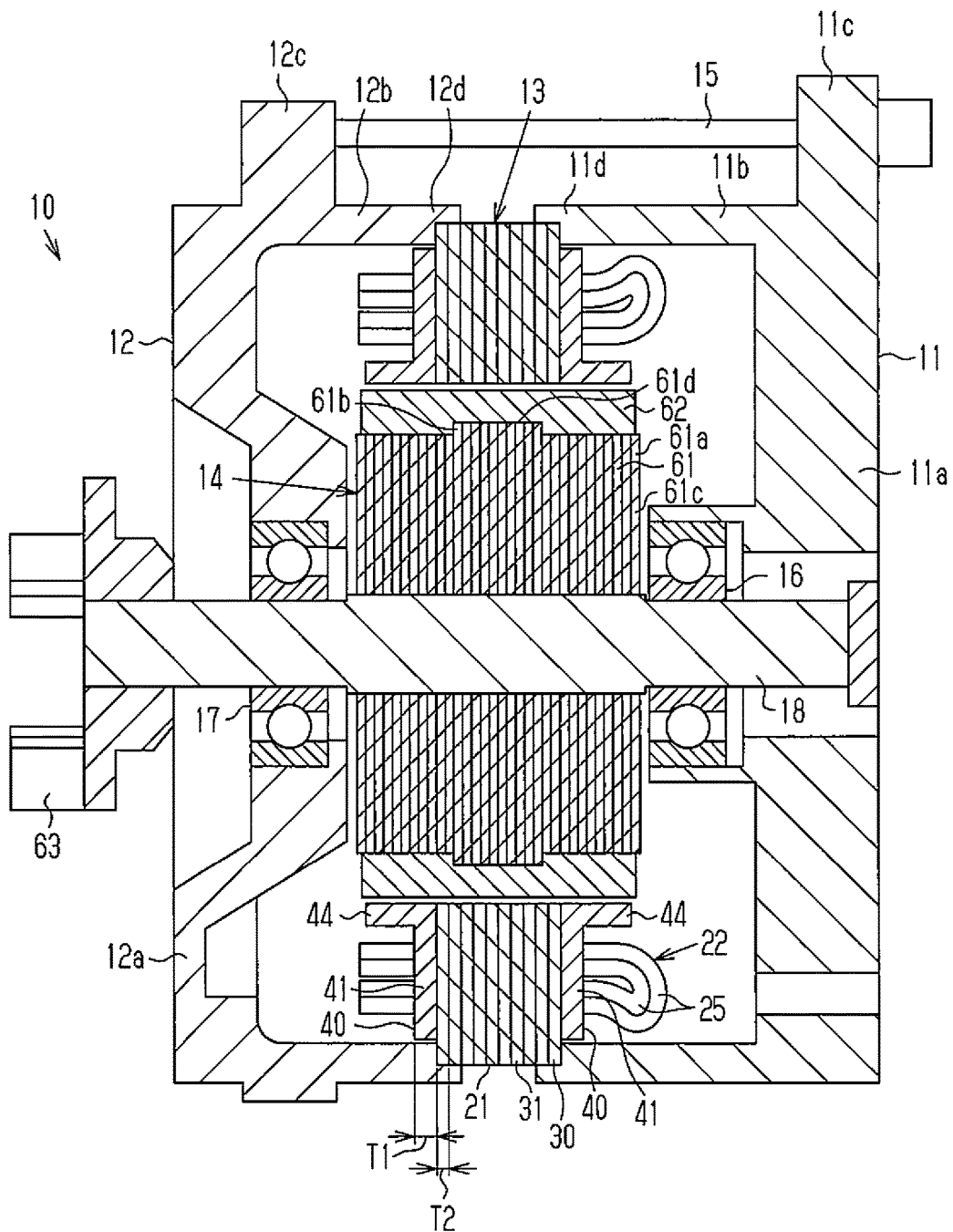
FIG. 32 is a schematic cross-sectional view of a motor in another example of the second embodiment.
Figure 33:
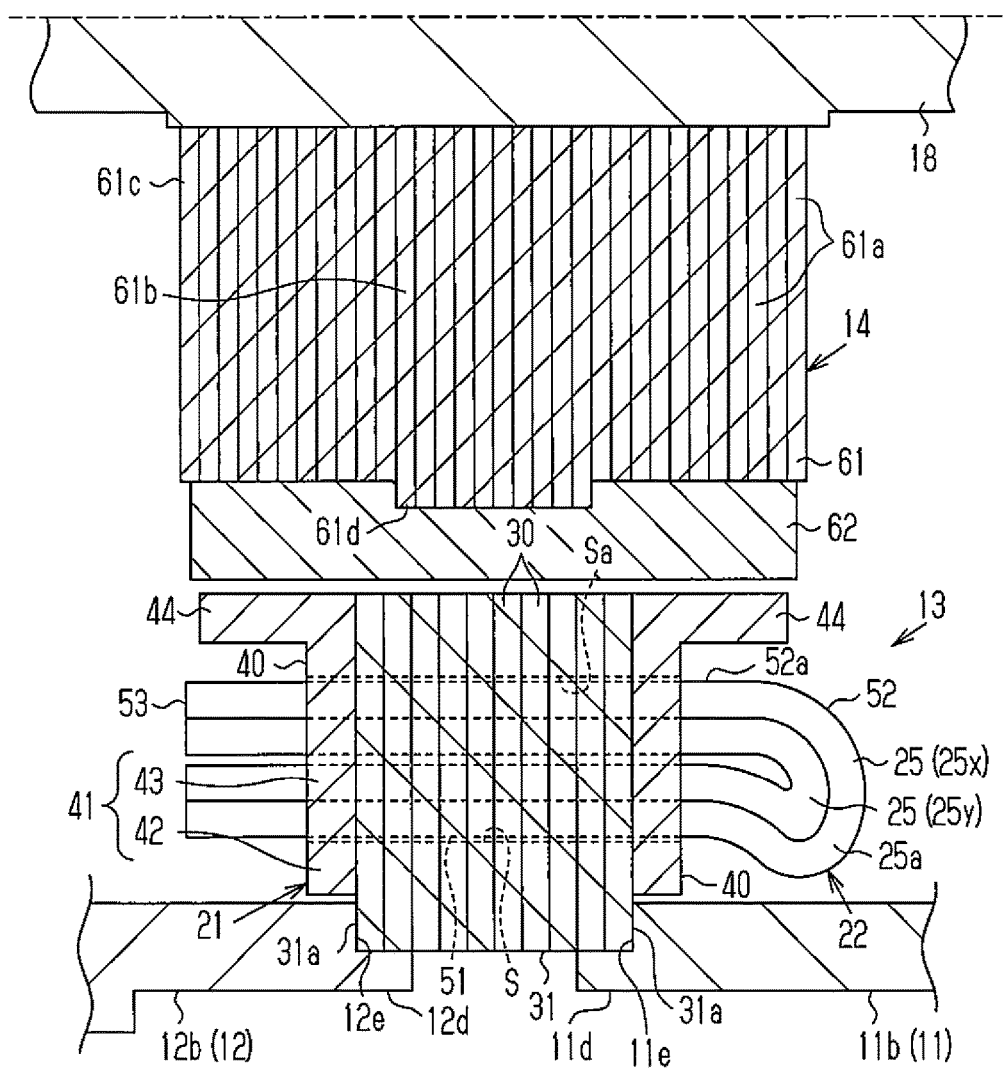
FIG. 33 is a partially enlarged schematic cross-sectional view of FIG. 32.

Although the axial length of the rotor core 61 and the axial length of the field magnet 62 are equal to each other in the second embodiment, the invention is not limited to this structure. The axial length of the field magnet 62 may be greater than the axial length of the rotor core 61. As shown in FIGS. 32 and 33, the axial length of the field magnet 62 may be less than the axial length of the rotor core 61.

A third embodiment of the motor will now be described with reference to FIGS. 34 to 40. A motor 10 of the third embodiment is partially common to the motor 10 of the first embodiment. Therefore, only portions which are different from the first embodiment will be described in detail, and description of the common portions will be omitted for the sake of convenience.

As shown in FIGS. 34 to 37, each of tooth formation portions (second tooth formation portion) 33 of each of core sheets 30 includes a radially extending portion 34 extending radially inward from an annular portion 32, and a flange (second flange) 35 projecting toward both circumferential sides at a distal end (end closer to rotor 14) of the radially extending portion 34. The radially extending portion 34 is tapered such that its circumferential width (angle width centering on the axis of the core sheet 30) becomes narrower toward its distal end (radially inward). A circumferential width of the flange 35 is formed larger than a circumferential width of the radially extending portion 34. That is, the tooth formation portion 33 has such a shape that its circumferential width is the smallest at a boundary B between the radially extending portion 34 and the flange 35. Both circumferential ends of the radially extending portion 34 are straight in shape as viewed from an axial direction of the motor 10, and circumferential end surfaces which are adjacent (opposed) to each other in a circumferential direction of the motor 10 are parallel to each other.

As shown in FIGS. 31 and 32, a magnetic plate 40 has a plate-shaped stacked portion 41 stacked on the core sheets 30 on both axial ends of the main core portion 31.

The number of tooth formation portions (first tooth formation portions) of the stacked portion 41 of the magnetic plate 40 is the same as that of the tooth formation portions 33 of the core sheet 30, and the tooth formation portions 43 are stacked on the tooth formation portions 33 of the core sheet 30 in the axial direction. Each of the tooth formation portions (first tooth formation portions) 43 of the magnetic plate 40 includes a radially extending portion (first radially extending portion) 45 extending radially inward from the annular portion 42, and a flange (first flange) 46 projecting toward both circumferential sides at a distal end (end closer to the rotor 14) of the radially extending portion 45. The radially extending portion 45 is tapered such that a circumferential width thereof (angle width centering on the axis of the core sheet 30) becomes narrower toward its distal end (radially inward). A circumferential width of the flange 46 is formed wider than a circumferential width of the radially extending portion 45. Both circumferential ends of the radially extending portion 45 are straight in shape as viewed from the axial direction, and circumferential end surfaces which are adjacent to each other in the circumferential direction are parallel to each other. A circumferential end surface of the radially extending portion 45 is overlapped on a circumferential end surface of the radially extending portion 34 of the tooth formation portion 33 (core sheet 30) in the axial direction.

A rotor opposing portion (axially extending portion) 44 extending axially outward (opposite side from the main core portion 31) is formed on the radial inner end (end closer to the rotor 14) of each of the tooth formation portions 43, i.e., a distal end of the flange 46. The rotor opposing portion 44 is formed by bending the distal end of the flange 46 axially outward at right angles.

The rotor opposing portion 44 includes side edges 44a and 44b as circumferential sides on both circumferential sides. The side edges 44a and 44b incline in shape in the circumferential direction relative to the axial direction of the rotation shaft 18. The side edges 44a and 44b incline such that portions thereof nearer their distal end (opposite side from the main core portion) more approach a circumferential central side of the rotor opposing portion 44. The side edges 44a and 44b are formed laterally symmetrically with respect to a circumferential center line of the rotor opposing portion 44 when the rotor opposing portion 44 is viewed from a radial direction of the motor 10. Hence, the rotor opposing portion 44 is formed such that a circumferential width on an axial basal end side (axial inner side) is equal to a circumferential width of the flange 46, and the circumferential width of the rotor opposing portion 44 becomes narrower toward its axial distal end (axially outward), and the rotor opposing portion 44 is formed into a trapezoidal shape as viewed from the radial direction.

Figure 34:
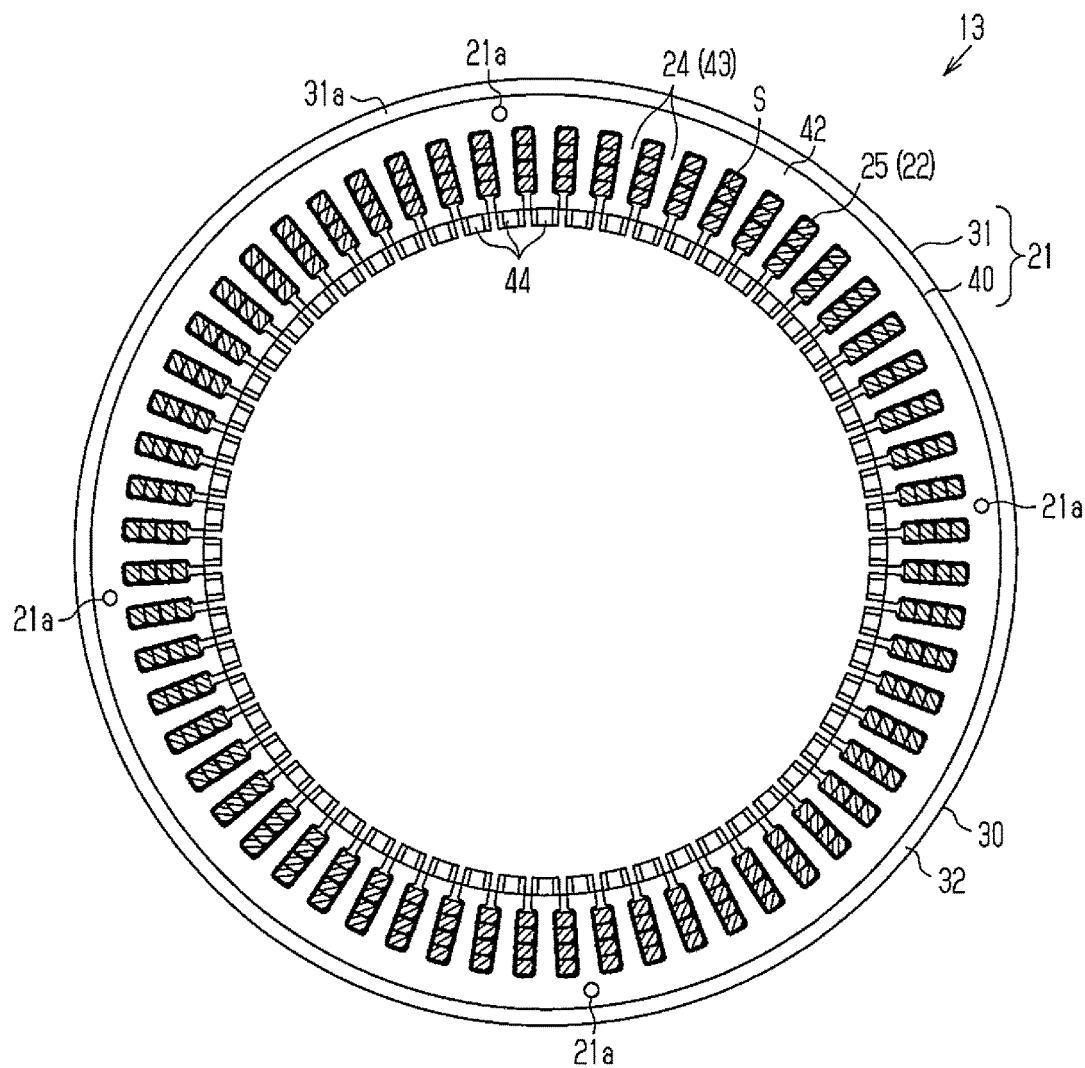
FIG. 34 is a plan view of a stator according to a third embodiment of the present invention.
Figure 35:
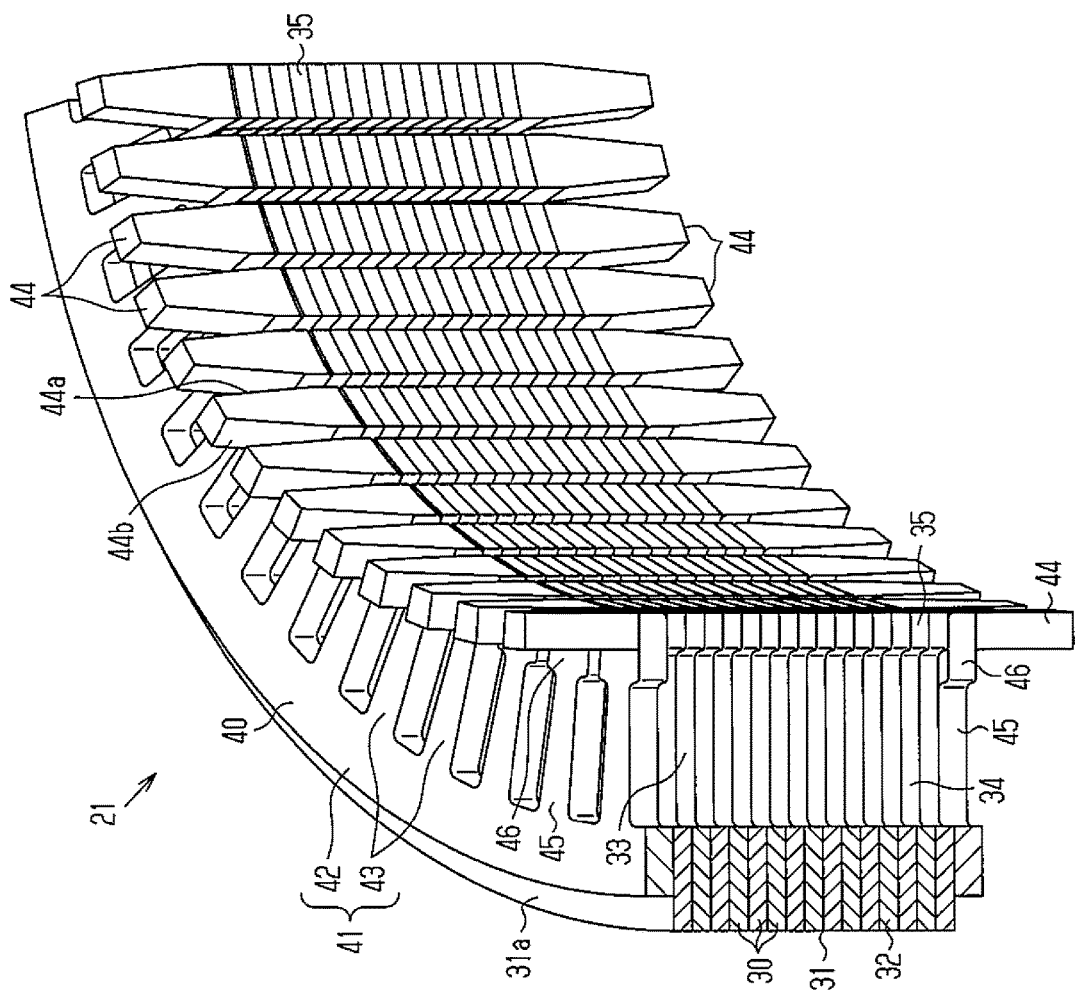
FIG. 35 is a perspective view partially showing a stator core in FIG. 34.

The core sheet 30 and the magnetic plate 40 having the above-described structure are integrally fixed (dowel-swaged) to each other in their stacked state by the annular portion 32 and a projection (swaging portion) 21a provided on the annular portion 42 (see FIG. 34). The tooth formation portions 43 of the magnetic plate 40 and the tooth formation portions 33 of the core sheet 30 are stacked in the axial direction, thereby forming teeth 24 of the stator core 21.

Figure 36:
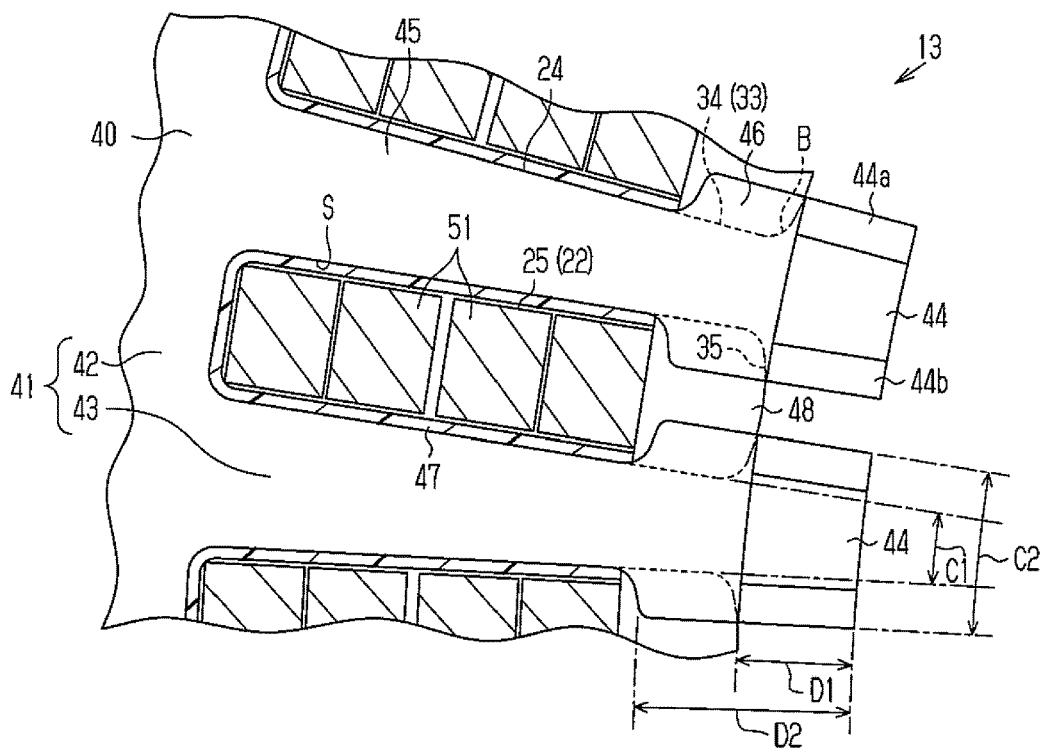
FIG. 36 is a plan view showing a portion of a stator shown in FIG. 34.

As shown in FIG. 36, distal ends (radial inner ends) of the flanges 35 and 46 of the tooth formation portions 33 and the tooth formation portions 43 are formed such that the distal ends are overlapped in the axial direction. A radial width D1 of the flange 35 of the tooth formation portion 33 is set to be smaller than a radial width D2 of the flange 46 of the tooth formation portion 43. Thus, self-inductance of the stator 13 is lowered to a small value. Since the radial width D2 of the flange 46 of the tooth formation portion 43 is obtained, it is possible to easily bend and form the rotor opposing portion 44 on the flange 46.

Further, a circumferential width C2 of the flange 46 of the tooth formation portion 43 is formed larger than a circumferential width C1 of the boundary B of the tooth formation portion 33, and the flange 46 of the tooth formation portion 43 abuts against the boundary B in the axial direction. Since the boundary B of the tooth formation portion 33 is narrow in width as compared with the flange 35, magnetic flux easily concentrates at the boundary B, but since the flange 46 of the tooth formation portion 43 which is wider than the boundary B abuts against the boundary B in the axial direction, the concentration of magnetic flux is reduced at the boundary B.

In the stator core 21, voids between the adjacent teeth 24 are formed as slots S in which the segment conductors 25 are accommodated. Each of the segment conductors 25 is arranged on the radial outer side of the flange 46 of the tooth formation portion 43 in the slot S.

As shown in FIG. 36, a sheet-shaped insulating member 47 made of insulative resin is attached into each of the slots S of the stator core 21.

Figure 37:
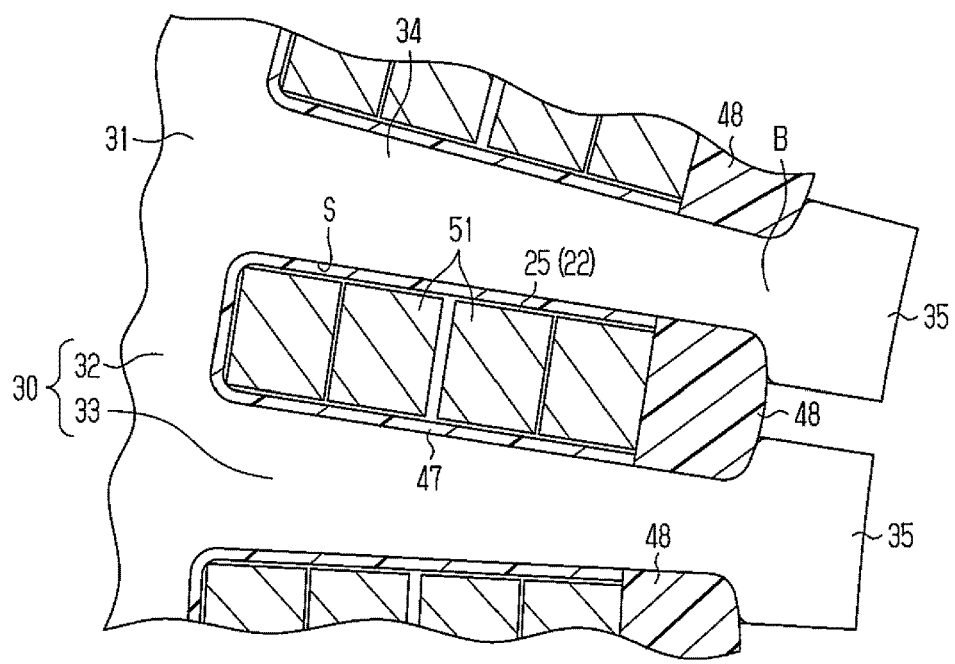
FIG. 37 is a plan view showing a portion of the stator shown in FIG. 34 when the magnetic plate is removed.
Figure 38:
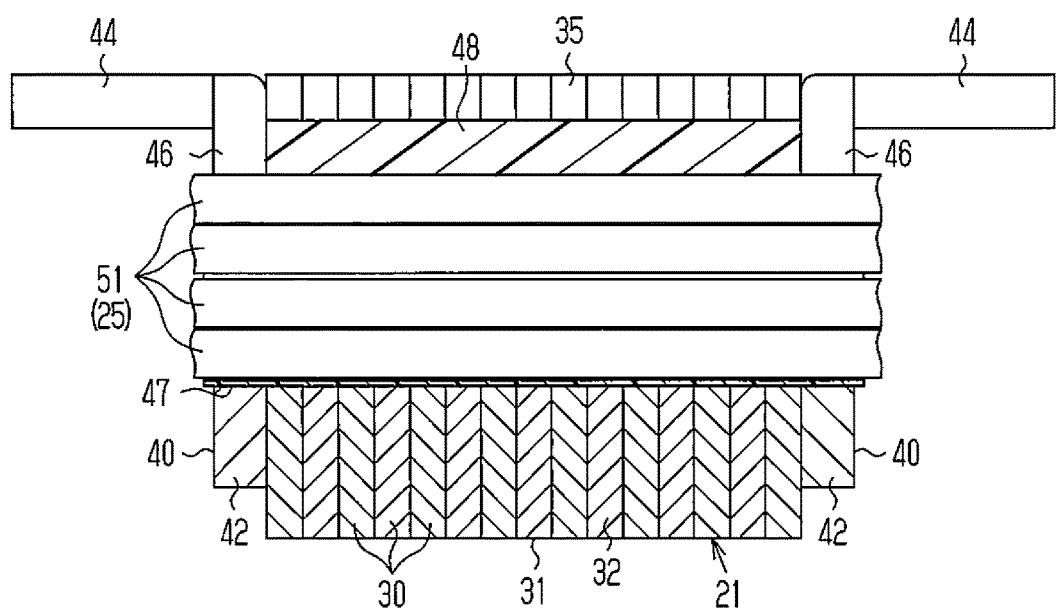
FIG. 38 is a cross-sectional view of the stator shown in FIG. 34.

As shown in FIGS. 36 to 38, interposed members 48 (resin molded products) made of resin are integrally provided on the stator core 21 by insert molding between the flanges 46 of the tooth formation portions 43 in the axial direction located on two axial sides on a radial outer side (opposite side from the rotor) of the flanges 46 of the tooth formation portions 33. Each of the interposed members 48 is radially interposed between the flange 35 of the tooth formation portion 33 and the segment conductor 25 arranged in the slot S.

According to the motor 10 of the third embodiment, the number q of the teeth 24 of the stator 13 is set to "q=2p×n×m" wherein 2p is the number of poles of the rotor 14 (p is a natural number), n is the number of phases of the armature winding 22 (n is natural number which is equal to or higher than three), and m is the number of the teeth 24 per one pole and one phase (m is natural number). In the third embodiment, the number of poles of the rotor 14 is ten, the number of phases of the armature winding 22 is three, and the number of the teeth 24 per one pole and one phase is two and therefore, the number q of the teeth 24 is sixty (10×3×2). The armature winding 22 is formed by entire pitch winding and distributed winding. The straight portions 51 of the segment conductors 25 form a line in the radial direction in the slots S.

The operation of the third embodiment will now be described.

In the stator core 21 of the third embodiment, the radial width D1 of the flange 35 of the tooth formation portion 33 (main core portion 31) is set smaller than the radial width D2 of the flange 46 of the tooth formation portion 43. There is such a correlation that the smaller the radial width D1 of the flange 35 of the tooth formation portion 33 is, the smaller the self-inductance becomes, and the self-inductance of the stator 13 is lowered to a small value. Thus, it is possible to enhance an output increasing effect caused by weak field. According to a structure that the segment conductor 25 (armature winding 22) is formed by entire pitch winding and distributed winding and the straight portions 51 of the segment conductors 25 form a line in the radial direction in the slots S like the stator 13 of the third embodiment, there is a tendency that the number of the teeth 24 increases. In such a structure, the self-inductance is more effectively suppressed by reducing the radial width D1 of the flange 35 of each of the teeth 24.

By making the radial width D1 of the flange 35 of the tooth formation portion 33 smaller than the radial width D2 of the flange 46 of the tooth formation portion 43, a distance between the flange 35 of the tooth formation portion 33 and the straight portion 51 of the segment conductor 25 in the radial direction is increased. Hence, there is concern that a holding function of the segment conductor 25 is deteriorated. Therefore, in the third embodiment, the gap between the flange 35 of the tooth formation portion 33 and the straight portion 51 of the segment conductor 25 in the radial direction is filled with the interposed member 48. Hence, the straight portion 51 of the segment conductor 25 is stably held and as a result, it is possible to limit damage to the insulating member 47 and suppress layer short which may be caused by vibration of the segment conductor 25.

The segment conductor 25 is formed such that not only the welded and bonded second projection 53 but also the first projection 52 including the curved folded portion 25a are located on the radial outer side (opposite side from the rotor opposing portion) as compared with the radial inner end Sa of the slot S. Hence, even if the slot S is not separated from the rotor opposing portion 44 radially outward, it is possible to obtain gaps between the first and second projections 52 and 53 of the segment conductor 25 and the rotor opposing portion 44. Thus, it is possible to limit interference of the rotor opposing portion 44 with the first and second projections 52 and 53 of the segment conductor 25 while limiting enlargement of the stator core 21 in the radial direction.

The advantages of the third embodiment will now be described.

(21) The tooth formation portion 33 of the core sheet 30 and the tooth formation portion 43 of the magnetic plate 40 respectively include the radially extending portions 34 and 45 which extend in the radial direction, and the flanges 35 and 46 which project toward the both circumferential sides from the ends (radial inner ends) of the radially extending portions 34 and 45 closer to the rotor 14. The radial width D1 of the flange 35 of the tooth formation portion 33 is set smaller than the radial width D2 of the flange 46 of the tooth formation portion 43. Thus, while increasing the amount of drawn magnetic flux by employing the magnetic plate 40 including the rotor opposing portion 44 that extends in the axial direction, it is possible to limit increases in the self-inductance of the stator 13. Since the radial width D2 of the flange 46 of the tooth formation portion 43 can be sufficiently obtained, it is possible to easily bend and form the rotor opposing portion 44 which extends from the flange 46 of the tooth formation portion 43 in the axial direction.

(22) The tooth formation portion 43 of the magnetic plate 40 axially abuts against the boundary B at which magnetic flux easily concentrates at the tooth formation portion 33, and the circumferential width C2 of the flange 46 of the tooth formation portion 43 is set larger than the circumferential width C1 of the boundary B. Hence, the concentration of magnetic flux at the boundary B may be reduced, and magnetic saturation may be effectively suppressed.

(23) Since the interposed members 48 (resin molded products) are charged into the voids on the radial outer side (opposite side from the rotor) of the flanges 35 of the tooth formation portions 33, it is possible to obtain, by the interposed members 48, electric insulation between the flanges 35 of the tooth formation portions 33 and the segment conductors 25 arranged in the slots S. The straight portion 51 of each of the segment conductors 25 is stably held by the interposed member 48 and as a result, it is possible to limit damage to the insulating member 47 and suppress layer short which may be caused by vibration of the segment conductor 25. Since the interposed member 48 is a non-magnetic member, the interposed member 48 does not increase the self-inductance of the stator 13. Since the interposed member 48 is formed by insert molding in the stator core 21, it is possible to easily form the interposed member 48 in the void on the radial outer side of the flange 35 of the tooth formation portion 33.

(24) The radially extending portion 34 of the tooth formation portion 33 is formed such that its circumferential width becomes smaller toward the rotor 14 (radially inward). According to this structure, since magnetic flux easily concentrates at the boundary B of the tooth formation portion 33 of the core sheet 30, the tooth formation portion 43 (flange 46) of the magnetic plate 40 is stacked on (made to abut against) the tooth formation portion 33 and according to this, an effect for reducing the concentration of magnetic flux at the boundary B is obtained in a further outstanding manner. Further, in the inner rotor type motor 10, an accommodation void for the armature winding 22 may be formed at the radial inner side.

(25) The armature windings 22 include the plurality of segment conductors 25 which are inserted into the plurality of slots S formed in the stator core 21 in the axial direction, and which include the first and second projections 52 and 53 projecting from the slots S in the axial direction. According to this structure, the void factor occupied by the armature winding 22 can be increased, and the output of the motor 10 can be enhanced and the motor 10 can be reduced in size.

(26) The first and second projections 52 and 53 of the segment conductor 25 are opposed to the rotor opposing portions 44 of the magnetic plates 40 in the radial direction. Thus, while it is possible to limit enlargement of the stator 13 in the axial direction, an axial length of a surface of the stator core 21 which is opposed to the rotor 14 can be obtained by the rotor opposing portion 44 of the magnetic plate 40, and it is possible to limit decreases in the output.

(27) The segment conductors 25 form a line along the radial direction and are arranged in each of the slots S. The segment conductors 25 form a line along the radial direction and are arranged in each of the slot S to form the stator 13, and the stator 13 includes the large number of teeth 24. By reducing the radial width D1 of the flange 35 of the tooth formation portion 33 in the large number of teeth 24, it is possible to adjust the self-inductance in a further preferable manner.

(28) Since the thickness T1 of the magnetic plate 40 is greater than the thickness T2 of the core sheet 30, the large chamfered portion 43a (e.g., chamfered portion of arc cross-section having radius of curvature Rm larger than thickness T2 of the core sheet 30) can easily be formed on the corner of the tooth formation portion 43 of the magnetic plate 40. As a result, it is possible to limit damages to the bent portion of the segment conductor 25 in a further preferable manner.

The third embodiment may be modified as follows.

Figure 39:
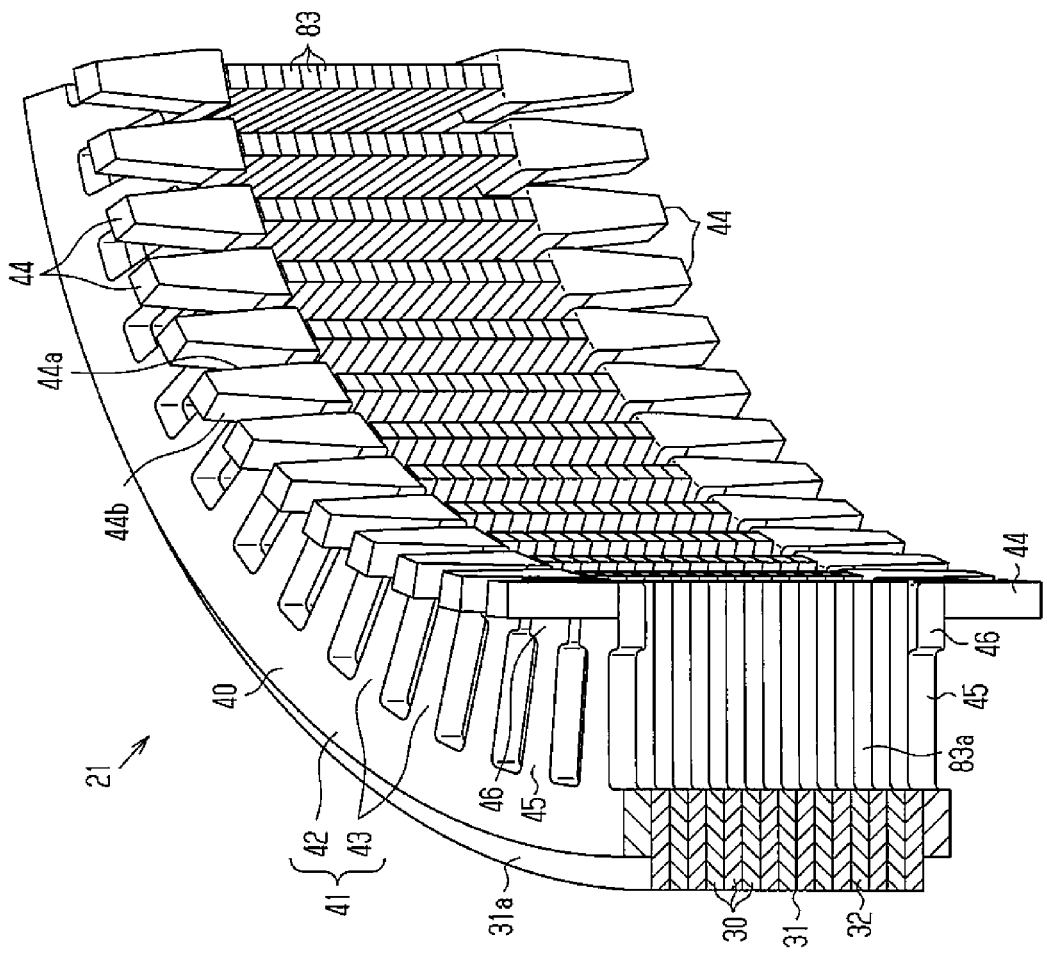
FIG. 39 is a perspective view partially showing a stator core of another example of the third embodiment.
Figure 40:
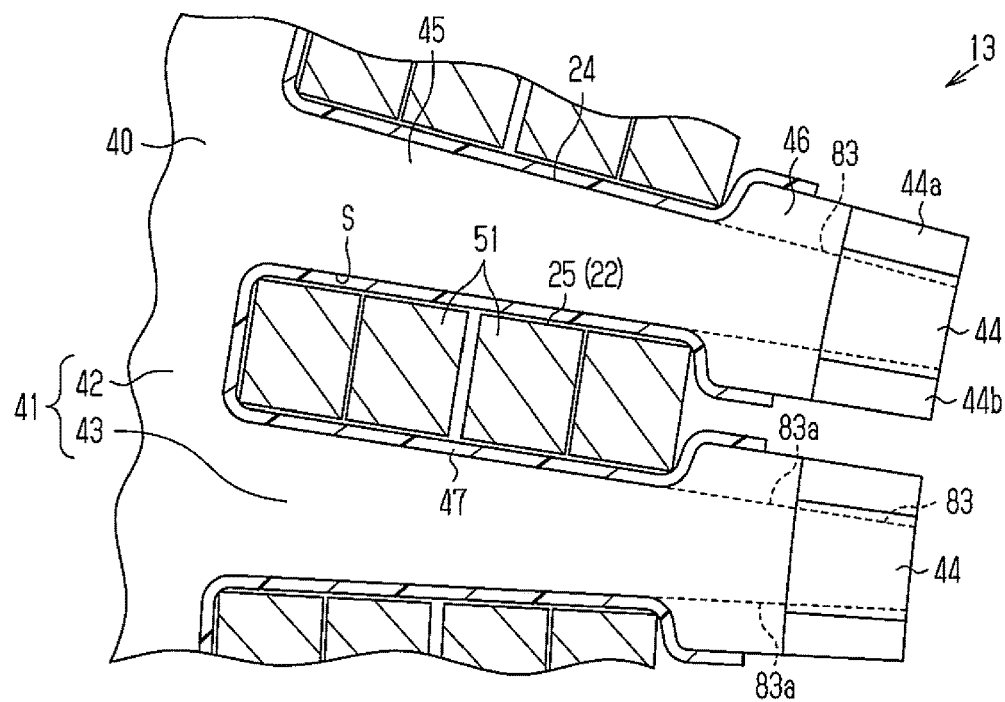
FIG. 40 is a plan view showing a portion of the stator in FIG. 39.

Although the flange 35 is formed on the tooth formation portion 33 of the core sheet 30 in the third embodiment, the invention is not limited to this structure. As shown in FIGS. 39 and 40, tooth formation portions 83 from which the flanges 35 are omitted may be used as the tooth formation portions 33. Each of the tooth formation portions (second tooth formation portion) 83 includes both circumferential end surfaces 83a, and the both circumferential end surfaces 83a extend straightly over their entire lengths as viewed from the axial direction from a radial basal end to a radial distal end of each of the tooth formation portions 83. According to this structure, since the radial width D1 of the flange 35 in the third embodiment becomes zero, it is possible to limit increases in the self-inductance in a further preferable manner. The flange 46 which is wide in the circumferential direction is formed on the radial inner end of the tooth formation portion 43 (magnetic plate 40) like the third embodiment, and the rotor opposing portion 44 extends from the flange 46 in the axial direction. Therefore, the rotor opposing portion 44 which is wide in the circumferential direction can easily be formed, and it is possible to increase the amount of drawn magnetic flux in the rotor opposing portion 44 in a preferable manner. This structure also increases the drawn amount of magnetic flux by employing the magnetic plates 40 including the rotor opposing portions 44 that extend in the axial direction, and allows for increases in the self-inductance of the stator 13 to be limited.

In the structure shown in FIGS. 39 and 40, since the circumferential width of the tooth formation portion 83 becomes narrower radially inward (toward the rotor 14), magnetic flux easily concentrates at the radial inner end of the tooth formation portion 83. Hence, the tooth formation portion 43 of the magnetic plate 40 is stacked on (made to abut against) the tooth formation portion 83 and according to this, an effect for reducing the concentration of magnetic flux is obtained in a further outstanding manner. In the inner rotor type motor, voids for the armature windings 22 can be obtained at the radial inner side.

In the third embodiment, the circumferential widths of the radially extending portions 34 and 45 of the tooth formation portion 33 and the tooth formation portion 43 become narrower toward the rotor 14 (radially inward), but the invention is not limited to this structure. For example, both circumferential end surfaces of the radially extending portions 34 and 45 may extend in parallel to each other.

Although the interposed members 48 are formed on the stator core 21 by insert molding in the third embodiment, the invention is not limited to this structure. For example, individually formed interposed members 48 may be attached to the stator core 21.

Although radial width D1 of the flange 35 of the tooth formation portion 33 is set smaller than the radial width D2 of the flange 46 of the tooth formation portion 43 in the third embodiment, the invention is not limited to this structure. For example, when the main core portion 31 (core sheet 30) is not newly designed and the main core portion 31 having the conventional shape is used as it is, if the radial width D2 of the flange 46 of the tooth formation portion 43 is set smaller than the radial width D1 of the flange 35 of the tooth formation portion 33, it is possible to limit increases in the self-inductance. That is, if the radial width D1 of the flange 35 of the tooth formation portion 33 is made different from the radial width D2 of the flange 46 of the tooth formation portion 43, it is possible to easily adjust the self-inductance by changing the shapes of the flanges 35 and 46.

The straight portions 51 of the segment conductor 25 form a line along the radial direction in the third embodiment. Alternatively, the segment conductor 25 may be arranged such that the straight portions 51 are arranged in the circumferential direction.

The rotor opposing portion 44 is formed into the trapezoidal shape as viewed from the radial direction in the third embodiment. Alternatively, the rotor opposing portion 44 may be formed into a rectangular shape as viewed from the radial direction, and a shape capable of drawing magnetic flux can be employed.

The stacked portion 41 of the magnetic plate 40 includes the annular portion 42 and the tooth formation portion 43 in the third embodiment. Alternatively, the stacked portion 41 may be formed by only the tooth formation portion 43.

The field magnet 62 is provided on the outer circumferential surface of the rotor core 61 in the third embodiment. Alternatively, the field magnet 62 may be embedded in the rotor core 61.

In the third embodiment, the axial lengths of the rotor core 61 and the field magnet 62 of the rotor 14 may be different from the axial length of the inner circumferential end of the stator core 21 (i.e., length from the distal end of the rotor opposing portion 44 of one of the magnetic plates 40 to the distal end of the rotor opposing portion 44 of the other magnetic plate 40).

In the third embodiment, the stator core 21 is held between the pair of frames 11 and 12. Alternatively, the stator core 21 may be fixed to a cylindrical metal housing by press-fitting or shrinkage-fitting.

A fourth embodiment of the invention will now be described with reference to FIGS. 41A to 47. A motor 10 of the fourth embodiment is partially common to the motor 10 of the first embodiment. Therefore, only portions which are different from the first embodiment will be described in detail, and description of the common portions will be omitted for the sake of convenience.

Figure 41A:
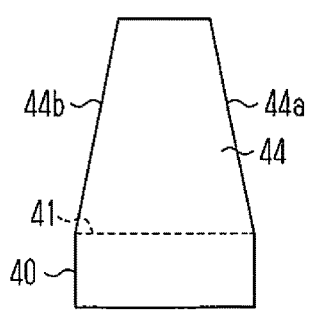
FIG. 41A is a front view illustrating a rotor opposing portion of a magnetic plate in a fourth embodiment of the present invention.

As shown in FIG. 41A, each of rotor opposing portions (axially extending portions) 44 includes side edges 44*a* and 44*b* on both circumferential sides as circumferential sides. The side edges 44*a* and 44*b* incline in a circumferential direction of the motor 10 with respect to an axial direction of the rotation shaft 18. The side edge 44*a* inclines such that it approaches a circumferential central side of the rotor opposing portion 44 toward a distal end of the side edge 44*a* (opposite side from the main core portion 31). The side edge 44*a* is laterally symmetric with respect to a center line of the rotor opposing portion 44 in the circumferential direction when the rotor opposing portion 44 is viewed from a radial direction of the motor 10. Hence, a circumferential width of the rotor opposing portion 44 on an axial basal end side (axially inner side) is equal to a circumferential width of a distal end (wide portion 24*b*) of a tooth formation portion 43, the circumferential width of the rotor opposing portion 44 becomes narrower toward the axial distal end (axially outward) and is formed into a trapezoidal shape as viewed from the radial direction. The rotor opposing portions 44 of the fourth embodiment have the same shapes.

Figure 41B:
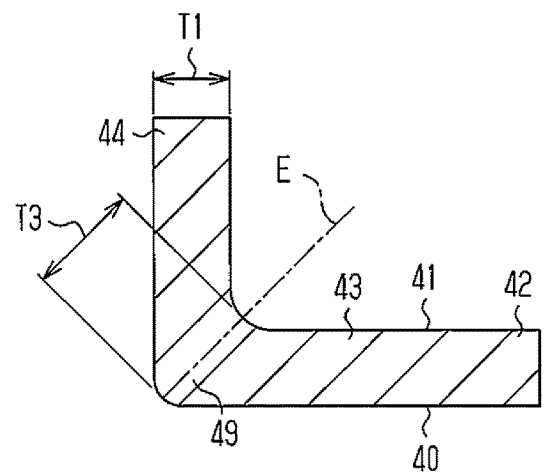
FIG. 41B is a cross-sectional view of the magnetic plate shown in FIG. 41A.

As shown in FIG. 41B, in a magnetic plate 40, a bent portion 49 (corner formed between tooth formation portion 43 and rotor opposing portion 44) between the tooth formation portion 43 and the rotor opposing portion 44 is bent to a right angle. A thickness T3 of the bent portion 49 (length along bisector E of the bent portion 49, i.e., length from center of inner corner of the bent portion 49 to center of the outer corner) is greater than a thicknesses of a stacked portion 41 and the rotor opposing portion 44 (i.e., thickness T1 of the magnetic plate 40). Thus, magnetic saturation is less likely to be generated at the bent portion 49.

The operation of the fourth embodiment will now be described.

In the fourth embodiment, since the thickness T3 of the bent portion 49 of the magnetic plate 40 is greater than the thicknesses of the stacked portion 41 and the rotor opposing portion 44 (equal to thickness T1 of the magnetic plate 40), magnetic saturation is less likely to be generated at the bent portion 49. Further, since the thickness T1 of the magnetic plate 40 is set to be greater than the thickness T2 of the core sheet 30, magnetic saturation is further less likely to be generated at the magnetic plate 40, and it becomes easy to draw magnetic flux through the magnetic plate 40. Since the rotor opposing portion 44 is formed into the trapezoidal shape as viewed from the radial direction, the rotor opposing portion 44 has a circumferentially magnetically skewed shape. Thus, cogging torque is reduced, Next, a manufacturing method of the magnetic plate 40 of the fourth embodiment will be described.

First, a magnetic plate 40 is punched out of a steel sheet before the rotor opposing portion 44 is bent (punching step).

Figure 42:
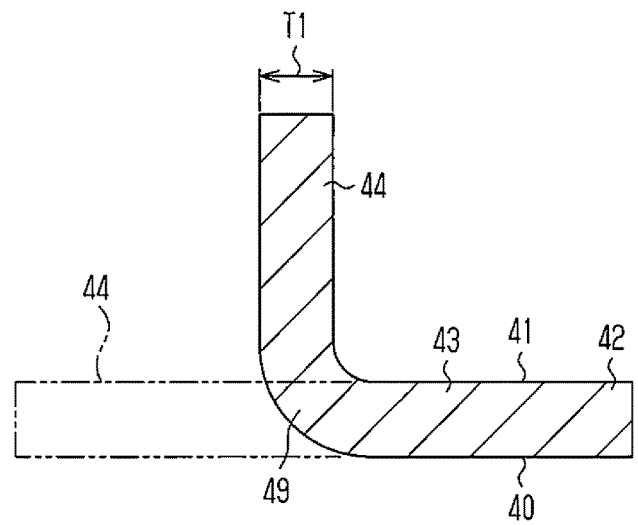
FIG. 42 is a schematic diagram illustrating a bending step in a manufacturing process of the magnetic plate shown in FIG. 41B.

Next, as shown in FIG. 42, the rotor opposing portion 44 of the magnetic plate 40 formed in the punching step is bent to a right angle (90°) with respect to the stacked portion 41 (bending step). At this time, a thickness of the bent portion 49 between the rotor opposing portion 44 and the stacked portion 41 is slightly thinner than a thickness of the rotor opposing portion 44 (i.e., thickness T1 of the magnetic plate 40).

Figure 43:
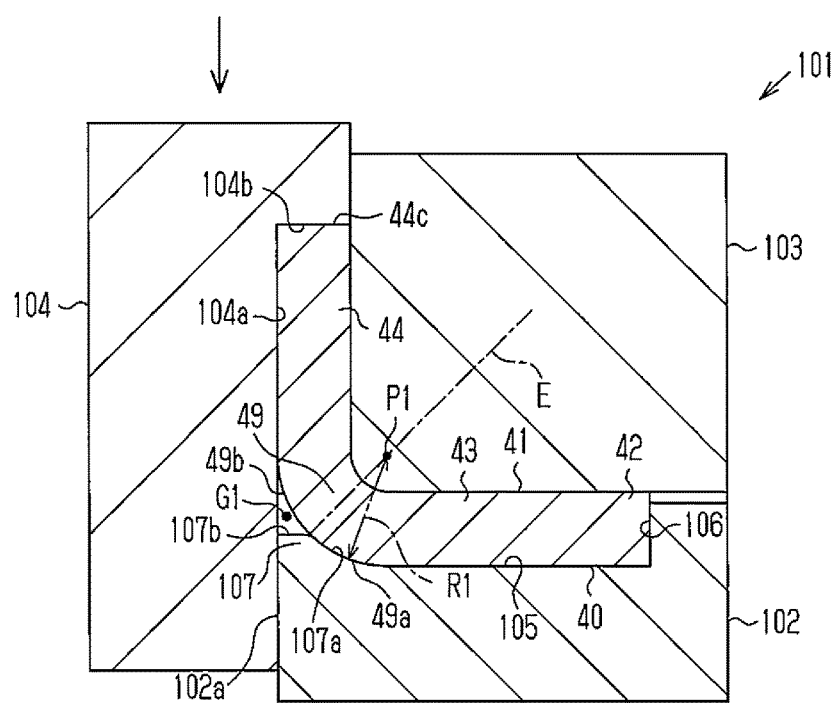
FIG. 43 is a schematic diagram illustrating a constraining-fitting step in the manufacturing process of the magnetic plate.
Figure 44:
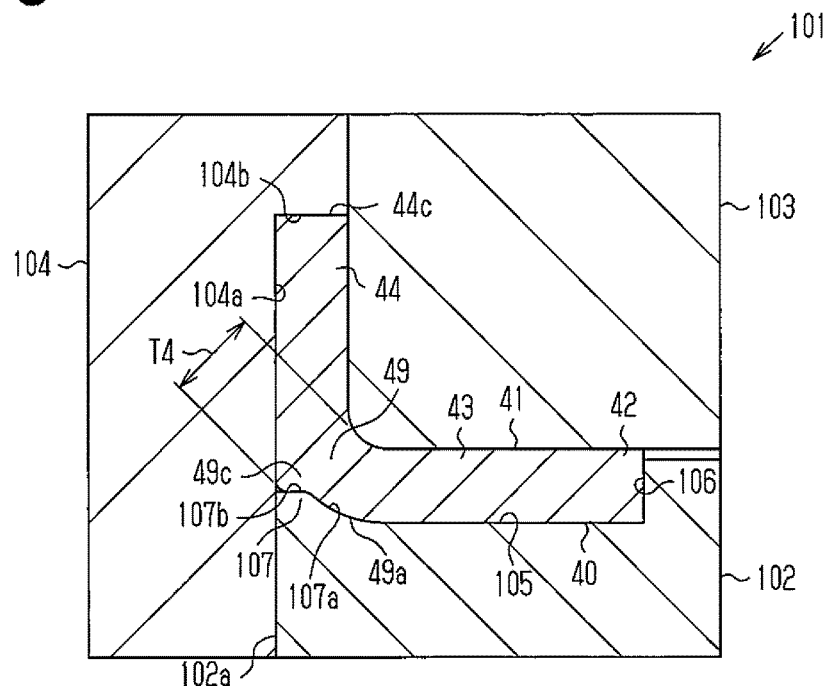
FIG. 44 is a schematic diagram illustrating the constraining-fitting step in the manufacturing process of the magnetic plate.

Next, as shown in FIGS. 43 and 44, a constraining-fitting step is carried out using a first mold 101.

The first mold 101 includes a constraining die 102 as a first die, a work clamp 103 and a fitting punch 104. The constraining die 102 is arranged on a portion of the stacked portion 41 of the magnetic plate 40 opposite from the rotor opposing portion 44. The work clamp 103 is arranged such that the work clamp 103 and the constraining die 102 hold in between the stacked portion 41 in a plate surface direction (extending direction of the rotor opposing portion 44). The fitting punch 104 is arranged on a side of the work clamp 103 and the constraining die 102 such that the fitting punch 104 and the work clamp 103 hold in between the rotor opposing portion 44 in a plate surface direction (radial direction).

The constraining die 102 includes a flat surface 105 on which the stacked portion 41 of the magnetic plate 40 is arranged, and first and second constraining portions 106 and 107 projecting from the flat surface 105 upward (toward work clamp 103). The first constraining portion 106 is formed on a radial outer end of the flat surface 105. When the stacked portion 41 of the magnetic plate 40 is arranged on the flat surface 105, the first constraining portion 106 abuts against an outer circumferential surface of the stacked portion 41 in the radial direction.

The second constraining portion 107 is formed on a radial inner end of the flat surface 105. A constraining arcuate surface 107*a*, which is continuous with the flat surface 105, is formed on the second constraining portion 107. An arc center P1 of the constraining arcuate surface 107*a* is located on a bisector E of the bent portion 49 of the magnetic plate 40 arranged on the flat surface 105. A radius of curvature R1 of the constraining arcuate surface 107*a* is set such that the lowest point of the constraining arcuate surface 107*a* is located on the flat surface 105 and the constraining arcuate surface 107*a* extends along a portion of an outer surface of the bent portion 49.

A parallel surface 107*b* which is parallel to the flat surface 105 is formed on an upper surface of the second constraining portion 107. The parallel surface 107*b* is continuous with the constraining arcuate surface 107*a* and extends to a radial inner end surface 102*a* of the constraining die 102. Corner formed between the parallel surface 107*b* and the constraining arcuate surface 107*a* is chamfered into an arc shape.

As shown in FIG. 43, in the constraining-fitting step using the first mold 101, the stacked portion 41 of the magnetic plate 40 of which rotor opposing portion 44 is bent to a right angle in the bending step is arranged on the flat surface 105 of the constraining die 102, and the work clamp 103 and the fitting punch 104 are arranged at predetermined positions. At this time, the work clamp 103 is in close contact with a bending inner end surface of the stacked portion 41 (plate surface thereof closer to the rotor opposing portion 44 in the axial direction), a bending inner end surface of the rotor opposing portion 44 (plate surface thereof closer to the stacked portion 41), and an inner surface of the bent portion 49. A inner surface 104*a* of the fitting punch 104 is in close contact with a bending outer end surface of the rotor opposing portion 44 and a radial inner end surface 102*a* of the constraining die 102, and a pressing surface 104*b* of the fitting punch 104 is in close contact with a distal end surface 44*c* of the rotor opposing portion 44 in the axial direction (longitudinal direction of the rotor opposing portion 44).

The first constraining portion 106 of the constraining die 102 is in close contact with an outer circumferential surface of the stacked portion 41 arranged on the flat surface 105. The constraining arcuate surface 107*a*, which is continuous with the flat surface 105, is in close contact, without a gap, with a constrained surface 49*a*, which is a portion of an outer surface of the bent portion 49 located toward the stacked portion 41. The constrained surface 49a is set in a range of the outer surface of the bent portion 49 closer to the stacked portion 41 than the bisector E. That is, the constraining arcuate surface 107a constrains one half of the bent portion 49 located toward the stacked portion 41. In a state before pressed by the fitting punch 104, a gap G1 exists between a corner formed by the parallel surface 107b of the second constraining portion 107 and the inner surface 104a of the fitting punch 104, and portions of the outer surface of the bent portion 49 other than the constrained surface 49a (non-restrained portion 49b which is not constrained by constraining arcuate surface 107a). That is, the parallel surface 107b of the second constraining portion 107 is opposed to the non-restrained portion 49b of the bent portion 49 through the gap G1.

As described above, if the fitting punch 104 is pressed downward (toward the constraining die 102) when the bent portion 49 is partially constrained by the constraining arcuate surface 107a, the distal end surface 44c of the rotor opposing portion 44 is pressed by the pressing surface 104b of the fitting punch 104 toward the bent portion 49 of the longitudinal direction (axial direction of the magnetic plate 40) of the rotor opposing portion 44.

Then, as shown in FIG. 44, the rotor opposing portion 44 slides toward the bent portion 49 and deforms, and a wall of the non-restrained portion 49b of the bent portion 49 flows into the gap G1. Thus, the wall of the non-restrained portion 49b which flows into the gap G1 deforms into a shape substantially conforming to a right angle shape of the corner formed by the parallel surface 107b of the second constraining portion 107 and the inner surface 104a of the fitting punch 104. At this time, since the constrained surface 49a of the bent portion 49 is constrained by the constraining arcuate surface 107a without a gap, only about a half of the bent portion 49 close to the rotor opposing portion 44 deforms. A thick portion 49c is formed on the bent portion 49 by deformation of the non-restrained portion 49b, and a thickness T4 of the thick portion 49c is greater than the rotor opposing portion 44 (i.e., greater than thickness T1 of the magnetic plate 40). A length of a portion of the bending outer end surface (surface opposite to the rotor 14) of the rotor opposing portion 44 extending in the axial direction increases.

Figure 45:
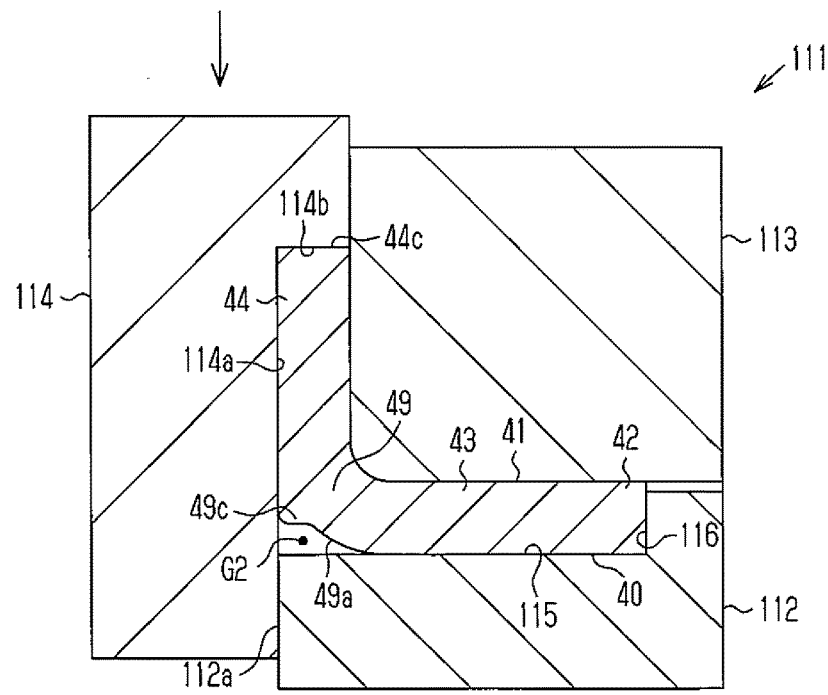
FIG. 45 is a schematic diagram illustrating a fitting step in the manufacturing process of the magnetic plate.

Next, as shown in FIG. 45, the fitting step is carried out using a second mold 111.

The second mold 111 includes a die 112 as a second die, a work clamp 113 and a fitting punch 114, and they are arranged at positions similar to those of the constraining die 102, the work clamp 103 and the fitting punch 104 of the first mold 101. The work clamp 113 and the fitting punch 114 have structures similar to the work clamp 103 and the fitting punch 104 of the first mold 101.

The die 112 includes a flat surface 115 on which the stacked portion 41 of the magnetic plate 40 is arranged, and an outer circumference-restraining portion 116 projecting upward from the flat surface 115. The outer circumference-restraining portion 116 has a Structure Similar to the first constraining portion 106 of the constraining die 102, and is formed on a radial outer end of the flat surface 115. When the stacked portion 41 of the magnetic plate 40 is arranged on the flat surface 115, the outer circumference-restraining portion 116 is in close contact with the outer circumferential surface of the stacked portion 41 in the radial direction. A projection like the second constraining portion 107 of the constraining die 102 is not formed on a radial inner circumference of the flat surface 115 of the die 112, and a flat surface shape of the flat surface 115 extends from an inner circumference of the outer circumference-restraining portion 116 to a radial inner end surface 112a of the die 112.

In the fitting step using the second mold 111, the stacked portion 41 of the magnetic plate 40 which is subjected to the constraining-fitting machining is arranged on the flat surface 115 of the die 112, and the work clamp 113 and the fitting punch 114 are arranged on predetermined positions. At this time, the work clamp 113 is in close contact with a bending inner end surface of the stacked portion 41 (plate surface thereof closer to the rotor opposing portion 44 in the axial direction), a bending inner end surface of the rotor opposing portion 44 (plate surface thereof closer to the stacked portion 41), and an inner surface of the bent portion 49. The fitting punch 114 is arranged such that an inner surface 114a thereof is in close contact with the bending outer end surface of the rotor opposing portion 44 and the radial inner end surface 112a of the die 112, and a pressing surface 114b of the fitting punch 114 is in close contact with the distal end surface 44c of the rotor opposing portion 44 in the axial direction (longitudinal direction of the rotor opposing portion 44). At this time, a gap G2 exists between the flat surface 115 of the die 112 and the bent portion 49 (between the thick portion 49c and the constrained surface 49a constrained by the constraining arcuate surface 107a in the constraining-fitting step)

After the magnetic plate 40 is arranged in the second mold 111 as described above, the fitting punch 114 is pressed downward (toward the constraining die 112). Then, the distal end surface 44c of the rotor opposing portion 44 is pressed by the pressing surface 114b of the fitting punch 114 toward the bent portion 49 of the longitudinal direction of the rotor opposing portion 44 (in the axial direction of the magnetic plate 40).

Figure 46:
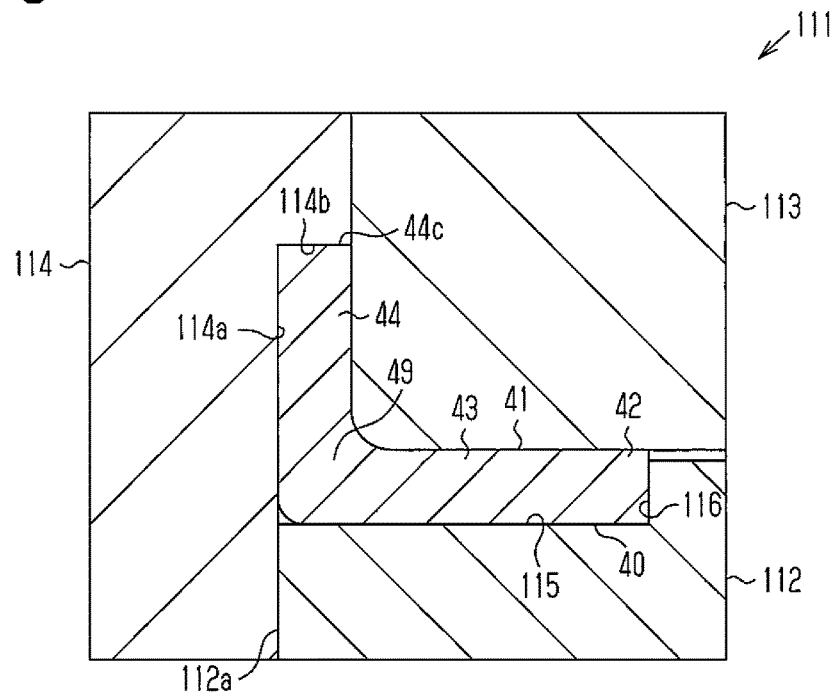
FIG. 46 is a schematic diagram illustrating the fitting step in the manufacturing process of the magnetic plate.

Then, as shown in FIG. 46, the rotor opposing portion 44 slides toward the bent portion 49 and deforms, a wall of the entire bent portion 49 flows into the gap G2, and bent portion 49 deforms into a shape substantially conforming to a right angle shape of the corner formed by the flat surface 115 of the die 112 and the inner surface 114a of the fitting punch 114. An outer surface of the bent portion 49 is formed into a substantially right angle by the fitting step, and the thickness T3 of the bent portion 49 is formed to be greater than the thickness T4 of the thick portion 49c (see FIG. 41B). The magnetic plate 40 is completed by this fitting step.

Thereafter, the magnetic plates 40 produced by this manufacturing method are arranged on both axial ends of the main core portion 31 (setting step). Thus, the stator core 21 is completed.

According to this manufacturing method, the outer surface of the bent portion 49 is formed into a substantially right angle through twice upsetting machining operations (constraining-fitting step and fitting step). Therefore, a deformed amount of the bent portion 49 (i.e., gaps G1 and G2) caused by the respective upsetting machining operations becomes small.

If it is necessary to form the outer surface of the bent portion 49 into the substantially right angle by one upsetting machining operation, after the bending step of the rotor opposing portion 44, the fitting step using the second mold 111 must be carried out without carrying out the constraining-fitting step using the first mold 101. In this case, the gap between the bent portion 49 of the magnetic plate 40 and the flat surface 115 of the die 112 immediately after the bending step is large, and the deformed amount of the bent portion 49 that corresponds to the gap is increased. Hence, excessive deformation occurs in the bent portion 49 (entrapment at the inner side portion) and the bent portion 49 easily becomes cracked. According to the manufacturing method of the fourth embodiment, on the other hand, the gap G1 becomes small by the second constraining portion 107 of the constraining die 102, and since the thick portion 49c is formed on the bent portion 49 by the constraining-fitting step, the gap G2 is small also in the subsequent fitting step. Hence, excessive deformation does not occur in the bent portion 49 in each of the upsetting machining operations (constraining-fitting step and fitting step) and generation of a crack is suppressed.

The advantages of the fourth embodiment will now be described.

(29) The manufacturing method of the fourth embodiment includes the constraining-fitting step of constraining a portion (constrained surface 49a) of the outer surface of the bent portion 49 of the magnetic plate 40 close to the stacked portion 41 by the constraining die 102, and of pressing the rotor opposing portion 44 in this constrained state by the fitting punch 104 toward the bent portion 49 in the axial direction. According to this manufacturing method, when the constraining-fitting step is carried out, since the portion of the outer surface of the bent portion 49 close to the stacked portion 41 is constrained by the constraining die 102, an inner side deformed amount of the bent portion 49 is suppressed by the constraint (holding) of the constraining die 102, and entrapment at the inner side of the bent portion 49 is suppressed. By the constraint carried out by the constraining die 102, a breaking force (shearing force) applied to the stacked portion 41 in the thickness direction when pressed by the fitting punch 104 is suppressed to a small value. By the pressing operation carried out by the fitting punch 104, the non-restrained portion 49b of the bent portion 49 close to the rotor opposing portion 44 is deformed by the pressing operation of the fitting punch and the non-restrained portion 49b becomes thicker. According to the manufacturing method of the fourth embodiment, it is possible to limit damage to the bent portion 49 and increase the thickness of the bent portion 49.

(30) The constraining die 102 includes the flat surface 105, which abuts against the bending outer end surface of the stacked portion 41 (plate surface thereof opposite from the rotor opposing portion), and the constraining arcuate surface 107a, which is continuous with the flat surface 105 and which constrains the constrained surface 49a of the bent portion 49. Thus, it is possible for the constraining arcuate surface 107a to constrain the arc-like constrained surface 49a without a gap. Hence, it is possible to stably constrain (hold) the constrained surface 49a and as a result, it is possible to further limit damage to the bent portion 49.

(31) In the fitting step after the constraining-fitting step, the rotor opposing portion 44 is pressed by the fitting punch 114 toward the bent portion 49 in the axial direction in the state where the gap G2 exists between the flat surface 115 of the die 112 and the constrained surface 49a of the bent portion 49. That is, after the constraining-fitting step, the fitting step is carried out in the state where the constrained surface 49a of the bent portion 49 is not constrained. Therefore, a wider range of the bent portion 49 can be thicker. The thick portion 49c is formed on a portion of the bent portion 49 during the constraining-fitting step. Hence, the gap G2 between the bent portion 49 and the die 112 in the subsequent fitting step becomes small. Hence, the deformed amount of the bent portion 49 during the fitting step becomes small, and it is possible to limit damage to the bent portion 49.

(32) Since the surface of the die 112 which is opposed to the outer surface of the bent portion 49 through the gap G2 is a flat surface, the outer surface of the bent portion 49 can be formed into the substantially right angle by the fitting step. Hence, the bent portion 49 can be further made thick.

(33) According to the magnetic plate 40 of the fourth embodiment, the thickness T3 of the bent portion 49 is greater than the thickness of the rotor opposing portion 44 (i.e., thickness T1 of the magnetic plate 40). According to this structure, it is possible to suppress generation of saturation of magnetic fluxes at the bent portion 49 and as a result, and it is possible to obtain an output enhancing effect with the magnetic plate 40 in a preferable manner.

(34) The thickness T1 of the magnetic plate 40 is set to be greater than the thickness T2 of the core sheet 30. Hence, it becomes easy to draw magnetic flux through the magnetic plate 40 and as a result, it is possible to further increase the output. Further, since the thickness T1 of the magnetic plate 40 is greater than the thickness T2 of the core sheet 30, the large chamfered portion 43a (e.g., chamfered portion of arc cross-section having radius of curvature Rm larger than thickness T2 of the core sheet 30) can easily be formed on the corner of the tooth formation portion 43 of the magnetic plate 40. As a result, it is possible to limit damages to the bent portion of the segment conductor 25 in a preferable manner.

The fourth embodiment may be modified as follows.

Figure 47:
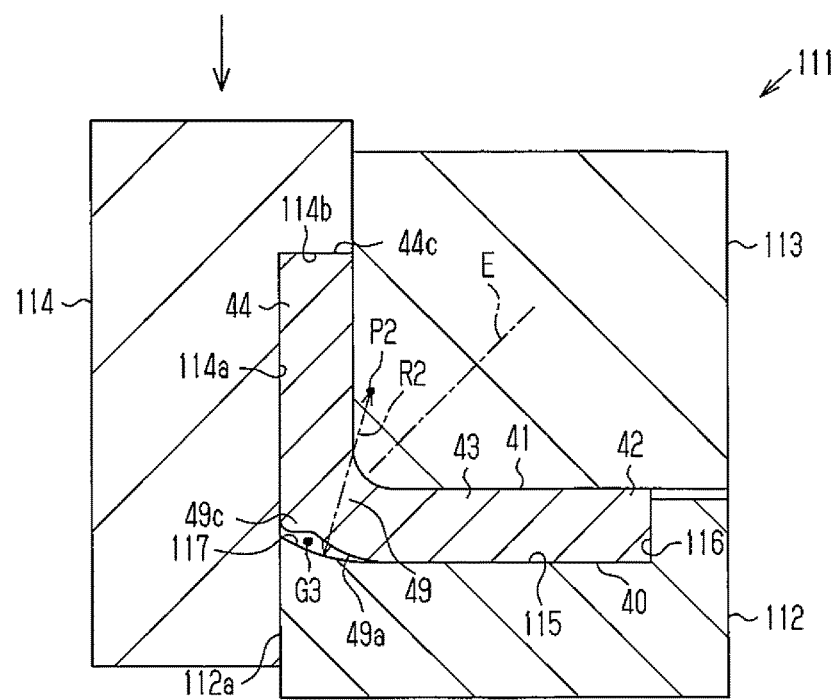
FIG. 47 is a schematic diagram illustrating a fitting step in another example of the fourth embodiment.

In the fourth embodiment, the flat surface 115 of the die 112 of the second mold 111 used for the fitting step is formed into the flat surface extending from the inner circumference of the outer circumference-restraining portion 116 to the radial inner end surface 112a of the die 112, but the invention is not limited to this structure. A shape as shown in FIG. 47 may be employed for example. As shown in FIG. 47, an arcuate surface 117 is formed on a radial inner end of the flat surface 115. The arcuate surface 117 is continuous with the flat surface 115 and is recessed toward the opposite of the bent portion. A radius of curvature R2 of the arcuate surface 117 is set larger than the radius of curvature R1 of the constraining arcuate surface 107a of the constraining die 102 (first mold 101) (i.e., radius of curvature of the constrained surface 49a of the bent portion 49). An arc center P2 of the arcuate surface 117 is set at a position close to the rotor opposing portion 44 with respect to the bisector E of the bent portion 49 of the magnetic plate 40 arranged on the flat surface 115, and a lowest point of the arcuate surface 117 is located on the flat surface 115. Before the fitting punch 114 presses, a gap G3 exists between the arcuate surface 117 and the bent portion 49 (thick portion 49c and constrained surface 49a).

Figure 48:
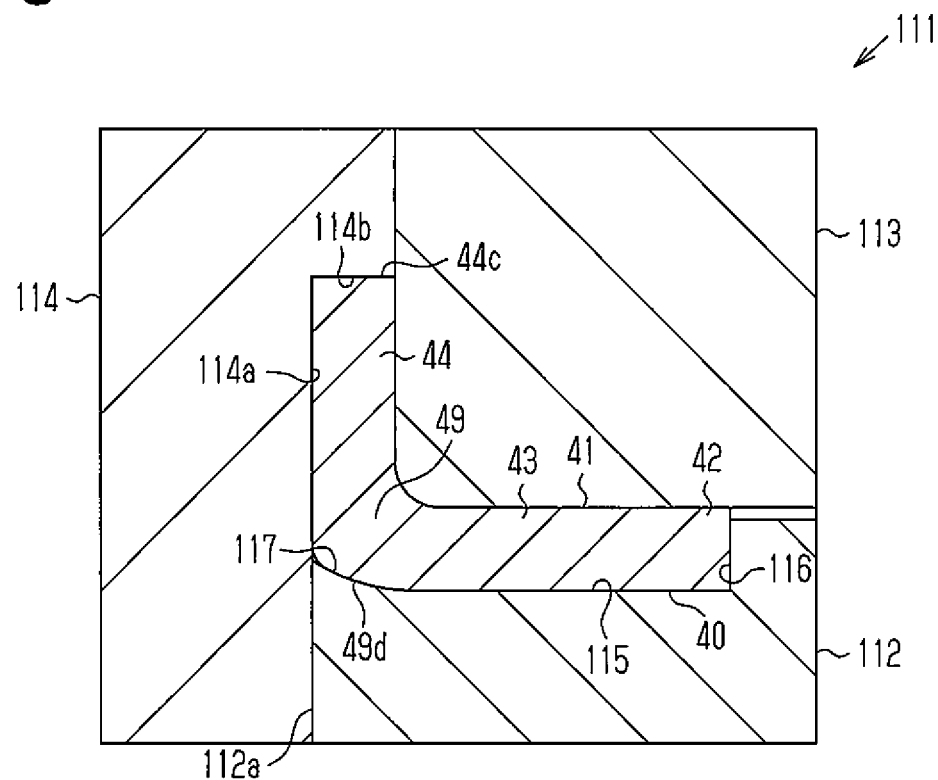
FIG. 48 is a schematic diagram illustrating the fitting step shown in FIG. 47.

As shown in FIG. 48, if the rotor opposing portion 44 is pressed by the fitting punch 114 toward the bent portion 49, a wall of the bent portion 49 flows into the gap G3 and the bent portion 49 is deformed into a shape substantially conforming to the arcuate surface 117. Here, the arcuate surface 117 of the die 112 is formed such that the arcuate surface 117 approaches the bent portion 49. Hence, the gap G3 between the die 112 and the bent portion 49 is smaller than the gap G2 (see FIG. 45) between the die 112 (flat surface 115) and the bent portion 49 in the fourth embodiment. Hence, as compared with the fourth embodiment, a load applied to the bent portion 49 in the fitting step is reduced, and damage to the bent portion 49 is further limited.

Figure 49:
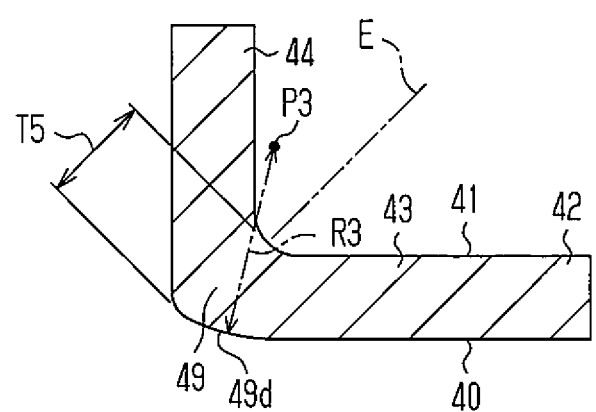
FIG. 49 is a cross-sectional view showing a magnetic plate formed by the fitting step in FIG. 48.

As shown in FIG. 49, according to the magnetic plate 40 formed by the fitting step, an arcuate surface 49d having a shape conforming to the arcuate surface 117 of the die 112 is formed on the outer surface of the bent portion 49. An arc center P3 of the arcuate surface 49d of the bent portion 49 is located close to the rotor opposing portion 44 with respect to the bisector E of the bent portion 49, and a radius of curvature R3 of the arcuate surface 49d is larger than a radius of curvature of the constrained surface 49a after the constraining-fitting step. A thickness T5 of the bent portion 49 is greater than the thickness T4 (see FIG. 41B) of the thick portion 49c after the constraining-fitting step.

According to this manufacturing method, the radius of curvature R2 of the arcuate surface 117 is set larger than the radius of curvature R1 of the constraining arcuate surface 107a (constraining die 102). Hence, in the fitting step, the outer surface of the bent portion 49 (arcuate surface 49d) can be formed into the arc shape along the arcuate surface 117, and the bent portion 49 can be thicker. Thus, it is possible to further limit damage to the bent portion 49.

The arc center P2 of the arcuate surface 117 (arc center P3 of the arcuate surface 49d of the bent portion 49) is set at a position close to the rotor opposing portion 44 with respect to the bisector E of the bent portion 49. Hence, it is possible to obtain an axial length of a surface of the rotor opposing portion 44 which is opposed to the rotor 14, and to make the bent portion 49 thick. Thus, it is possible to form the magnetic plate 40 capable of increasing the drawn amount of magnetic flux from the rotor 14.

Figure 50:
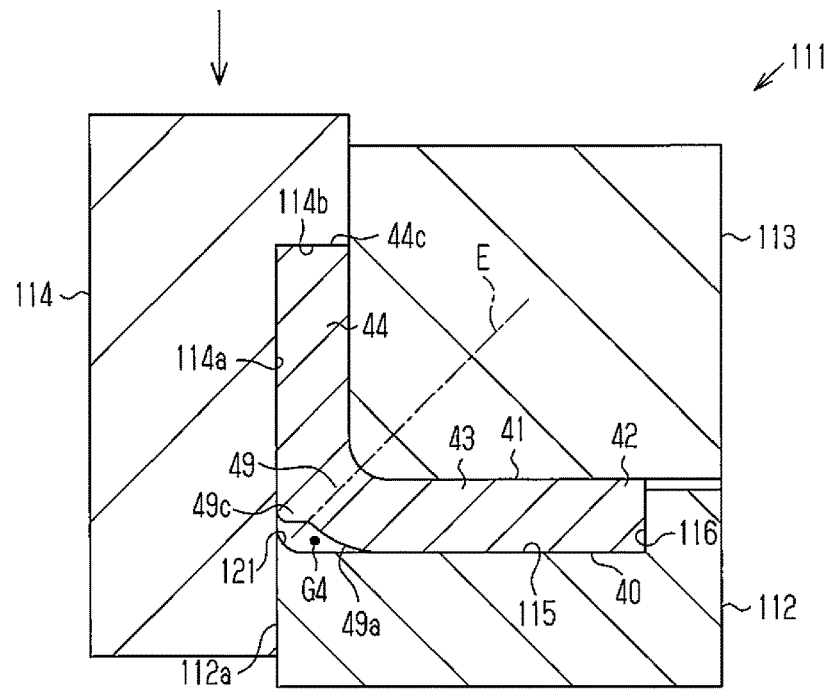
FIG. 50 is a schematic diagram illustrating a fitting step of another example of the fourth embodiment.

The shape of the arcuate surface 117 provided on the radial inner end of the flat surface 115 (position of arc center P2 and radius of curvature R2) is not limited to the above example, and the shape of the arcuate surface 117 may be changed into an arcuate surface 121 as shown in FIG. 50 for example. This arcuate surface 121 is for forming an R-portion 49e (see FIG. 51) of a corner on an outer surface of the bent portion 49. An arc center of the arcuate surface 121 is set on the bisector E of the bent portion 49, and a radius of curvature of the arcuate surface 121 is set smaller than a radius of curvature of the constrained surface 49a. Before the fitting punch 114 presses, a gap G4 exists between the flat surface 115, the arcuate surface 121 and the bent portion 49 (thick portion 49c and constrained surface 49a).

Figure 51:
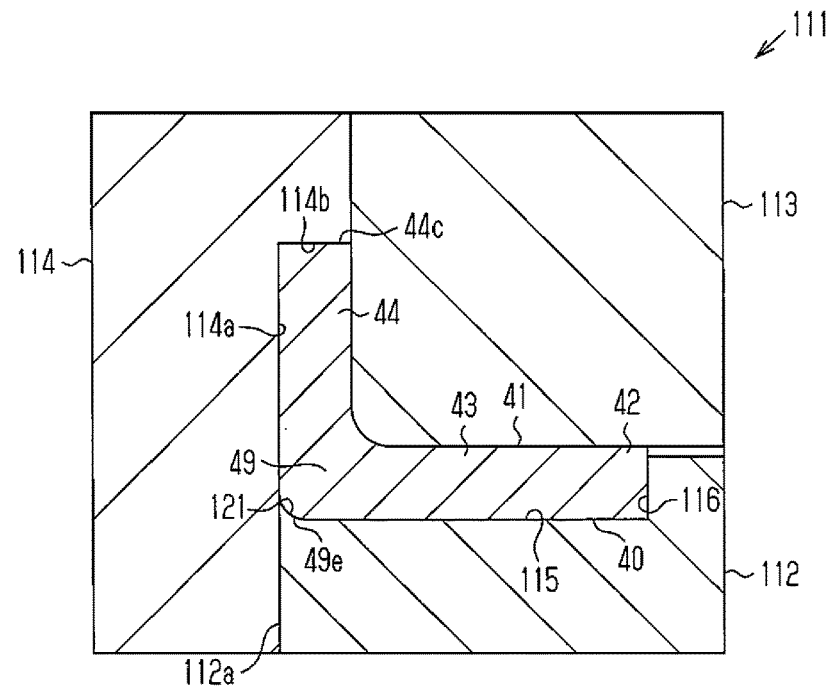
FIG. 51 is a schematic diagram illustrating the fitting step shown in FIG. 50.

As shown in FIG. 51, if the rotor opposing portion 44 is pressed by the fitting punch 114 toward the bent portion 49, the wall of the bent portion 49 flows into the gap G4, and the bent portion 49 is deformed into a shape conforming to the flat surface 115 and the arcuate surface 121. According to this manufacturing method, it is possible to form the R-portion 49e of the corner of the outer surface of the bent portion 49 with the arcuate surface 121 in a preferable manner.

In the fourth embodiment, the constraining arcuate surface 107a of the constraining die 102 constrains a half of the bent portion 49 close to the stacked portion 41 (range of the bent portion 49 closer to the stacked portion 41 than the bisector E), but the range constrained by the constraining arcuate surface 107a is not limited to the fourth embodiment. For example, the constraining range of the constraining arcuate surface 107a may be a half or less of the outer surface of the bent portion 49. Alternatively, the constraining range of the constraining arcuate surface 107a may be enlarged toward the rotor opposing portion 44 beyond the bisector E.

According to the fourth embodiment, in the constraining-fitting step, a constraining surface which constrains the constrained surface 49a of the bent portion 49 is formed into the arcuate surface (constraining arcuate surface 107a), but the invention is not limited to this structure. For example, the constraining surface may be a flat inclined surface which becomes higher toward a radial inner side of the constraining die 102.

The fitting step after the constraining-fitting step is not absolutely necessary, and the magnetic plate 40 may be completed in one constraining-fitting step for example.

Although the straight portions 51 of the segment conductors 25 are arranged in a line along the radial direction in the fourth embodiment, the invention is not limited to this structure and the straight portions 51 may be arranged also in the circumferential direction.

A fifth embodiment of the motor will now be described with reference to FIGS. 52 to 55. A motor 10 of the fifth embodiment is partially common to the motor 10 of the first embodiment. Therefore, only portions which are different from the first embodiment will be described in detail, and description of the common portions will be omitted for the sake of convenience.

Figure 53:
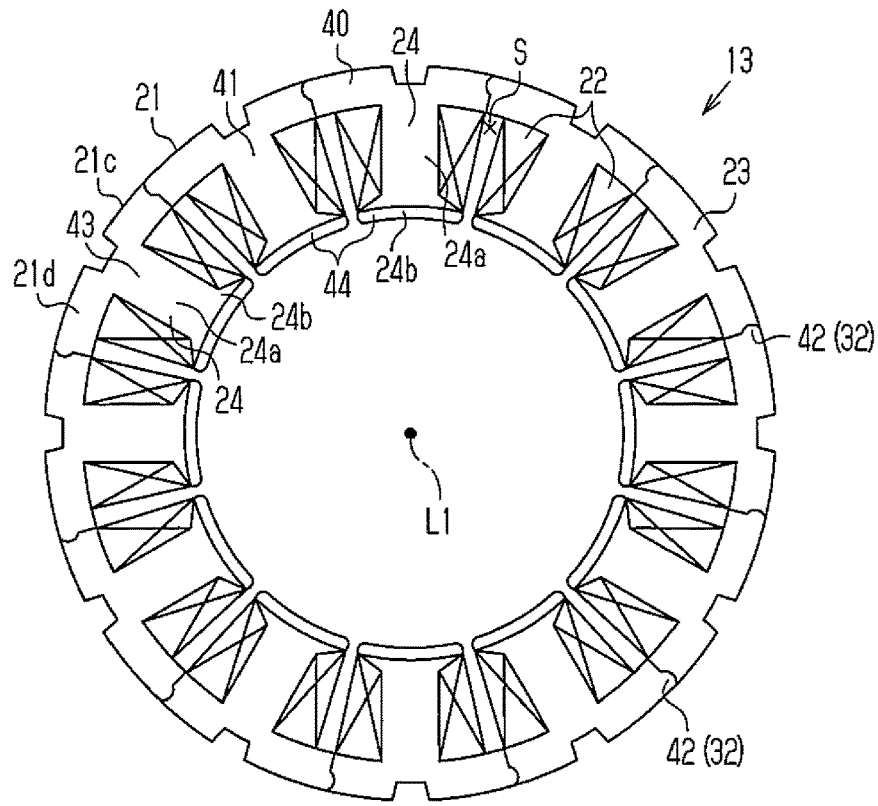
FIG. 53 is a plan view of a stator shown in FIG. 52.

As shown in FIG. 53, a stator core 21 includes a plurality of (twelve in fifth embodiment) core sections 21c respectively including a tooth 24 arranged along a circumferential direction of the motor 10.

As show in FIG. 53, each of the core sections 21c includes a divided fixing portion 21d which is arc in shape as viewed from an axial direction of the motor 10, and the tooth 24 extending radially inward from an inner circumferential surface of the divided fixing portion 21d. In each of the core sections 21c, the tooth 24 extends radially inward from a central portion of the divided fixing portion 21d in the circumferential direction, and the core section 21c has a substantially T-shape as viewed from the axial direction.

The plurality of core sections 21c are connected to one another to form the stator core 21 such that distal ends of the teeth 24 are oriented radially inward and the divided fixing portions 21d form a cylindrical portion 23.

Each of the teeth 24 includes a radially extending portion 24a and a wide portion 24b. The wide portion 24b is located at a distal end (radial inner end) of the radially extending portion 24a, and has a circumferential width which is wider than the radially extending portion 24a.

Core sheets 30 of a main core portion 31 have the same shapes and are arranged such that plate surfaces of the core sheets 30 intersect with the axial direction at right angles. Each of the core sheets 30 includes a first annular portion 32 and a plurality of tooth formation portions 33 extending radially inward (toward the rotor 14) from the first annular portion 32. The core sheets 30 are stacked such that the tooth formation portions 33 are overlapped on one another in the axial direction. The main core portion 31 is formed into a shape which is substantially the same as that of a stacked portion 41 of a later-described magnetic plate 40.

An arc second annular portion 42 which is overlapped on the first annular portion 32 of the core sheet 30 in the axial direction, and a plurality of tooth formation portions 43 extending radially inward from the second annular portion 42 are formed on the stacked portion 41 of the magnetic plate 40. The tooth formation portion 43 of the stacked portion 41 and the tooth formation portion 33 of the core sheet 30 have the same shapes as viewed from the axial direction. The magnetic plate 40 is provided such that the second annular portions 42 of the stacked portion 41 and the tooth formation portions 43 are respectively overlapped on the first annular portions 32 and the tooth formation portions 33 of the core sheet 30 in the axial direction. The core sheets 30 and the annular portions 32 and 42 of the magnetic plate 40 are connected to one another to form a substantially cylindrical shape, and the tooth formation portions 33 and 43 form the teeth 24 of the stator core 21.

Rotor opposing portions 44 as axially extending portions are formed on the radial inner ends (ends close to the rotor 14) of the tooth formation portions 43 of the magnetic plate 40. The rotor opposing portions 44 extend axially outward (opposite side from the main core portion 31).

Figure 54A:
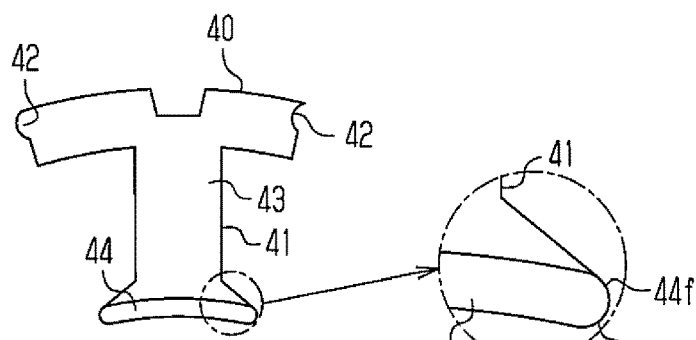
FIG. 54A is a plan view showing a portion of a magnetic plate shown in FIG. 53 including an enlarged view of a main portion of the magnetic plate.
Figure 54B:
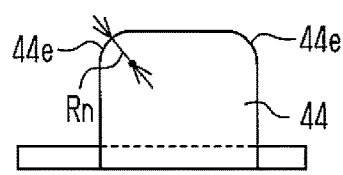
FIG. 54B is a front view showing a portion of the magnetic plate in FIG. 54A.

As shown in FIG. 54B, distal end chamfered portions 44e which are round-chamfered are formed on corners of axial distal end side (axial outer side) of the rotor opposing portion 44. Each of the distal end chamfered portions 44e is round-chamfered such that it has a radius of curvature Rn of two times or more of a wire diameter of an armature winding 22.

As shown in FIG. 54A, first surface chamfered portions 44f are formed on corners of both circumferential end surfaces of the rotor opposing portion 44 on a side opposite from the rotor 14 (radial outer side). The first surface chamfered portions 44f may be formed when the steel sheet is punched into the magnetic plate 40 by metal punching. More specifically, corners which are naturally formed on portions of a plate material upstream in the punching direction may be used as the first surface chamfered portions 44f. Alternatively, projections corresponding to the chamfered portions may be provided on a receiving-side mold which is used for metal punching, and the first surface chamfered portions 44f may be formed at the time of the metal punching. Further, second surface chamfered portions 44g may be formed on corners of both circumferential end surfaces on the side of the rotor 14 (radial inner side).

Figure 52:
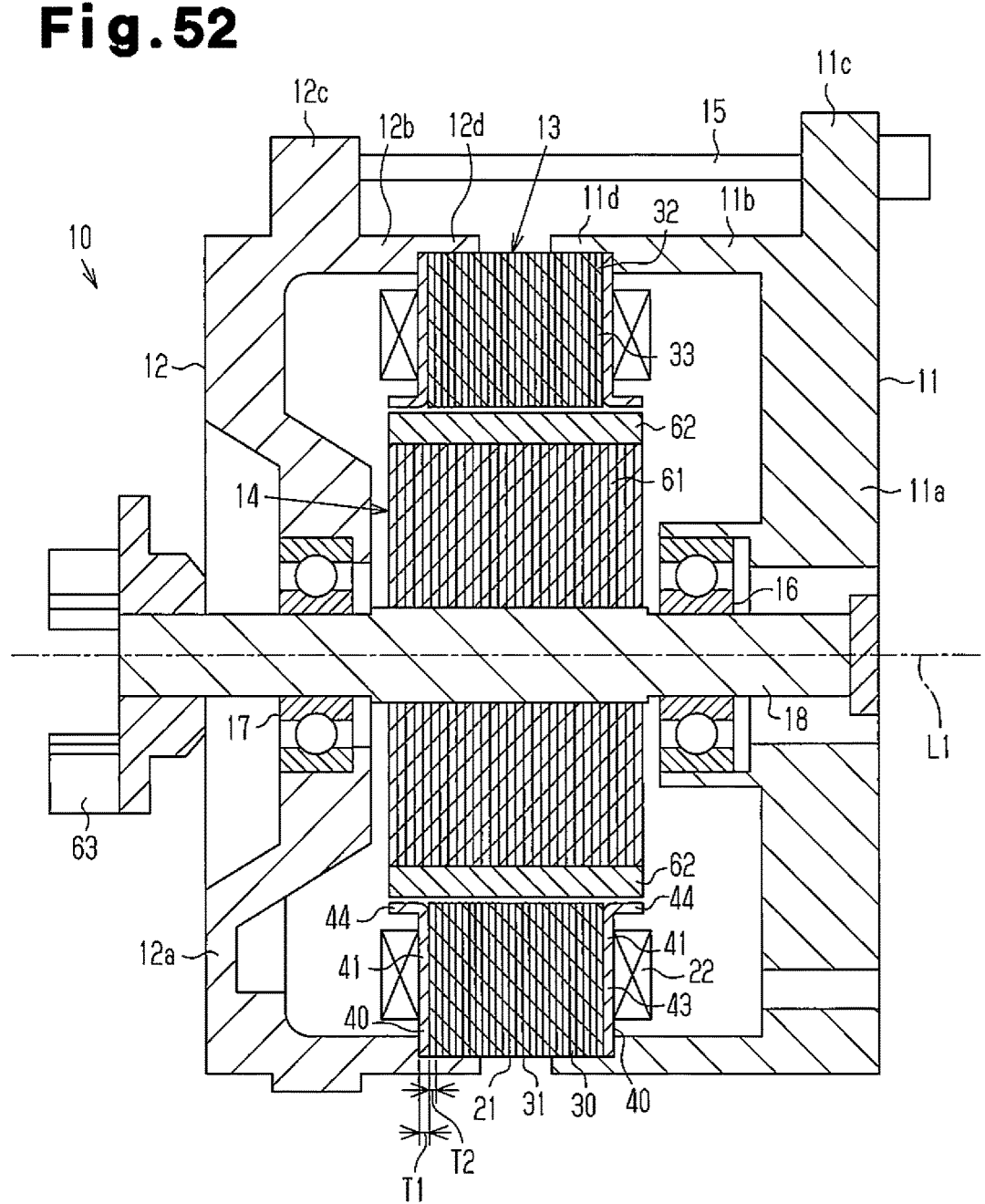
FIG. 52 is a schematic cross-sectional view of a motor according to a fifth embodiment of the present invention.

As shown in FIG. 52, stator holding portions 11b and 12b of frames 11 and 12 which hold the stator 13 having the above-described structure have cylindrical shapes extending from the body portions 11a and 12a of the frames 11 and 12 in the axial direction.

Figure 55:
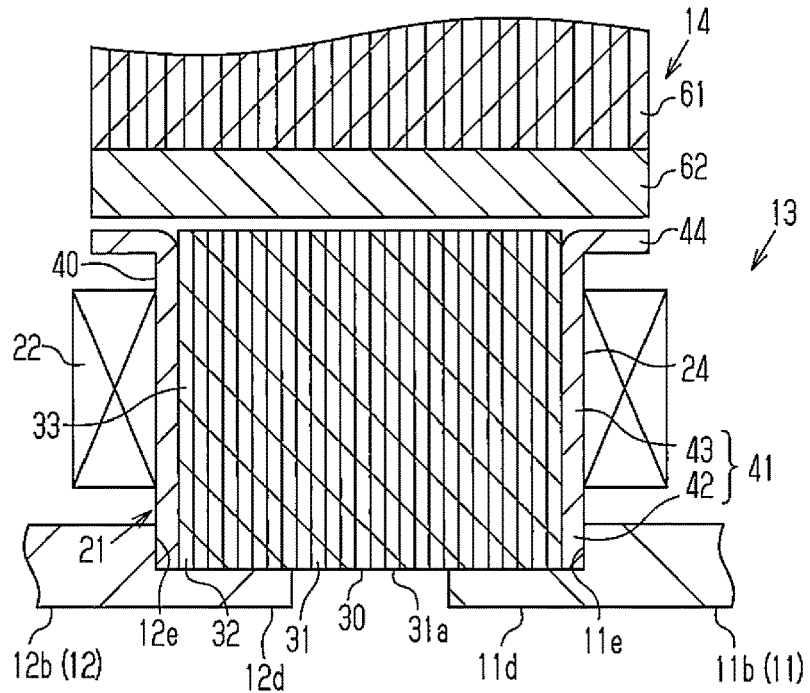
FIG. 55 is a partially enlarged schematic cross-sectional view of the motor shown in FIG. 52.

As shown in FIG. 55, fitting portions 11d and 12d are respectively formed on distal ends (axial inner ends) of the stator holding portions 11b and 12b.

In the stator core 21, an outer circumferential side of the stacked portion 41 of the magnetic plate 40 is held between the stator holding portions 11b and 12b of the frames 11 and 12. More specifically, the fitting portions 11d and 12d of the stator holding portions 11b and 12b are respectively fitted over outer circumferential edges of both axial ends of the stacked portion 41 of the magnetic plate 40 and the main core portion 31, and the abutting surfaces 11e and 12e respectively abut against outer peripheral end surfaces of two axial sides of the stacked portion 41 of the magnetic plate 40. In this state, the frames 11 and 12 are connected and fixed to each other through a through bolt 15. Thus, the stacked portion 41 of the magnetic plate 40 is held between the stator holding portions 11b and 12b in the axial direction. An outer circumferential surface of the main core portion 31 of the stator core 21 is exposed outside from between distal ends of the stator holding portions 11b and 12b.

The operation of the fifth embodiment will now be described.

Since the stator core 21 of the fifth embodiment includes the core section 21c, it is possible to easily wind the armature winding 22 around each of the teeth 24.

The advantages of the fifth embodiment will now be described.

(35) The plurality of core sections 21c having the tooth formation portions 33 and 43 (teeth 24) around which the armature windings 22 are wound are arranged in the circumferential direction to form the stator core 21. It is possible to wind the armature windings 22 around the tooth formation portions 33 and 43 (teeth 24) provided on the independent core sections 21c. Further, since the armature winding 22 is wound in the state of the core section 21c, surrounding around the core section 21c can freely be utilized. Hence, it is possible to make it easy to wind the armature winding 22.

(36) The distal end chamfered portions 44e formed by chamfering corners are formed on the corners on the axial distal end sides of the rotor opposing portion 44 as the axially extending portion. Hence, even if the winding 22 and the corner come into contact with each other when the winding 22 is wound, it is possible to limit damage to the winding 22.

(37) Each of the distal end chamfered portions 44e is formed by round-chamfering such that it has the radius of curvature of two times or more of the wire diameter of the armature winding 22. Hence, it is possible to further limit damage to the armature winding 22.

(38) Since it is unnecessary to reduce the stacked portions 41 of the magnetic plate 40 in size so that the stacked portions 41 do not interfere with the frames 11 and 12 in the axial direction, it is possible to suppress the reduction in output.

(39) Since it is unnecessary to reduce the stacked portions 41 of the magnetic plate 40 in size in the radial direction so that the stacked portions 41 do not interfere with the stator holding portions 11b and 12b in the axial direction, it is possible to suppress the reduction in output. In order to enhance the output by making the thickness T1 of the magnetic plate 40 greater than the thickness T2 of the core sheet 30, it is possible to suppress vibration in the axial size of the entire motor 10 by adjusting the number of core sheets 30 which are thinner than the magnetic plate 40.

(40) The first surface chamfered portions 44f are formed on the corners of both the circumferential end surfaces of the rotor opposing portion (axially extending portion) 44 on the side opposite from the rotor 14. Hence, even if the winding 22 comes into contact with the first surface chamfered portion 44f, it is possible to limit damage to the winding. Since the two circumferential end surfaces of the rotor opposing portion 44 are separated from the rotor 14 in the radial direction, a skew effect can be obtained in the circumferential direction.

(41) The second surface chamfered portions 44g are formed on the corners of the both the circumferential end surfaces of the rotor opposing portion 44 on the side closer to the rotor 14. Hence, even if the winding 22 comes into contact with the second surface chamfered portion 44g, it is possible to limit damage to the winding. Since the two circumferential end surfaces of the rotor opposing portion 44 are separated from the rotor 14 in the radial direction, a skew effect can be obtained in the circumferential direction.

The fifth embodiment may be modified as follows.

Although it is not especially mentioned in the fifth embodiment, it is possible to employ a structure which magnetically skews the rotor opposing portion 44 in the circumferential direction. If the axially extending portion extending axially outward from the end close to the rotor is magnetically skewed with respect to the tooth formation portion and the stacked portion in the circumferential direction, it is possible to smooth variation in magnetic flux and to reduce cogging torque.

Such an example will now be described as structures S8 to S13. The structures S8 to S13 which will now be described may appropriately be combined with the embodiment and the other modifications.

Structure S8

Figure 56A:
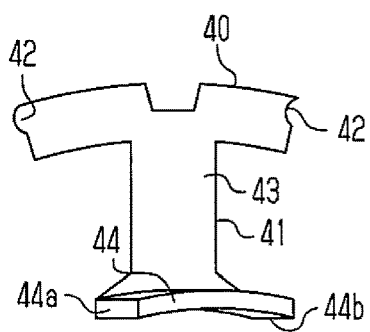
FIG. 56A is a plan view showing a portion of a magnetic plate in another example of the fifth embodiment.
Figure 56B:
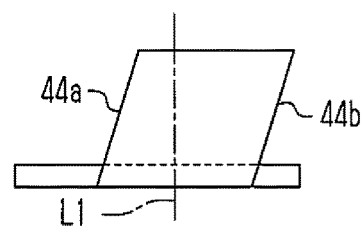
FIG. 56B is a front view showing a portion of the magnetic plate in FIG. 56A.

As shown in FIGS. 56A and 56B, the rotor opposing portion 44 includes side edges 44a and 44b as circumferential sides on both circumferential sides. The side edges 44a and 44b incline in a direction of an axis L1 (axial direction) of the rotation shaft 18. The side edge 44a inclines to approach a circumferential central side, and the side edge 44b inclines to separate away from the circumferential central side. Inclination angles of the side edges 44a and 44b with respect to the axis L1 are substantially equal to each other. Hence, the rotor opposing portion 44 is formed such that a circumferential width thereof on its axial basal end side (axial inner side) is equal to circumferential widths of distal ends of the tooth formation portions 33 and 43 which form the wide portion 24b of the tooth 24.

Structure S9

Figure 57A:
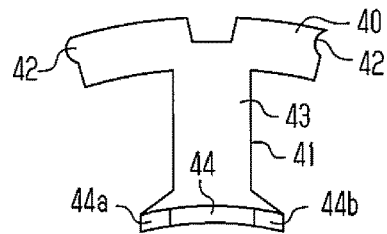
FIG. 57A is a plan view showing a portion of a magnetic plate in another example of the fifth embodiment.
Figure 57B:
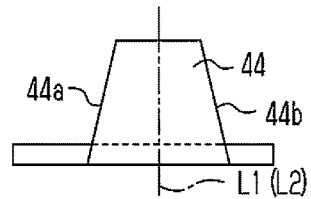
FIG. 57B is a front view showing a portion of the magnetic plate in FIG. 57A.

As shown in FIGS. 57A and 57B, the side edges 44a and 44b incline with respect to the axis L1 (axial direction) of the rotation shaft 18. The side edges 44a and 44b incline such that they approach a circumferential central portion of the rotor opposing portion 44 axially outward (opposite side from the stacked portion 41). The side edge 44a located on one of sides in the circumferential direction and the side edge 44b located on the other side in the circumferential direction are formed symmetrically with respect to a phantom line L2 (straight line along the axis L1) extending through a circumferential center of the rotor opposing portion 44. Hence, the rotor opposing portion 44 is formed such that the circumferential width of its axial basal end side (axial inner side) is equal to the circumferential widths of the distal ends of the tooth formation portions 33 and 43 which form the wide portion 24b of the tooth 24, the circumferential width of the rotor opposing portion 44 becomes narrower toward its axial distal end (axial outer side), and the rotor opposing portion 44 has a trapezoidal shape as viewed from the radial direction. All of the rotor opposing portions 44 of the fifth embodiment have the same shapes.

Since the circumferential width of the rotor opposing portion 44 becomes narrower axially outward, it is possible to suppress the leakage magnetic flux. Thus, it is possible to suppress the increase in torque ripple caused by an increase in the leakage magnetic flux.

Structure S10

Figure 58A:
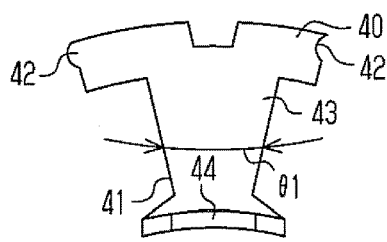
FIG. 58A is a plan view showing a portion of a magnetic plate in another example of the fifth embodiment.
Figure 58B:
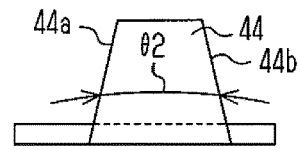
FIG. 58B is a front view showing a portion of the magnetic plate in FIG. 58A.

As shown in FIGS. 58A and 58B, inclined surfaces of the side edges 44a and 44b of the rotor opposing portion 44 may be straight in shape, and an inclination angle θ2 thereof may be smaller than a radiation angle θ1 of the tooth formation portion 43.

Since the inclined surfaces of the side edges 44a and 44b of the rotor opposing portion 44 are straight in shape, it is possible to further smooth the variation in magnetic flux, and to reduce cogging torque.

Structure S11

Only the side edge 44a on the one side in the circumferential direction may be inclined so that the rotor opposing portion 44 is magnetically skewed.

Structure S12

A radial length (thickness) of the rotor opposing portion 44 may be changed in the circumferential direction so that the rotor opposing portion 44 is magnetically skewed.

Structure S13

The rotor opposing portion 44 may be formed into the trapezoidal shape such that its circumferential width becomes wider axially outward so that the rotor opposing portion 44 is magnetically skewed.

Figure 59A:
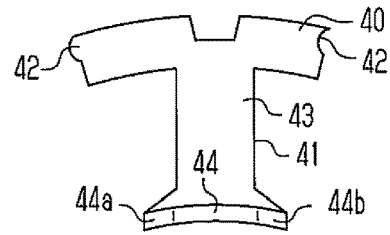
FIG. 59A is a plan view showing a portion of a magnetic plate in another example of the fifth embodiment.
Figure 59B:
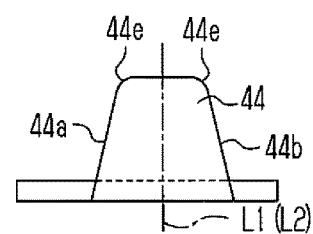
FIG. 59B is a front view showing a portion of a magnetic plate in another example of FIG. 59A.

According to the structures S8 to S13, since the rotor opposing portion 44 can be formed into such a shape that it is magnetically skewed in the circumferential direction, it is possible to reduce cogging torque. Incidentally, the rotor opposing portion 44 of the structures S8 to S13 is not overlapped on other rotor opposing portion 44 which are adjacent to the former rotor opposing portion 44 in the circumferential direction and another tooth formation portion 33 which is adjacent to the former rotor opposing portion 44 as viewed from the axial direction. Although it is not especially mentioned in the structures S8 to S13, distal end chamfered portions 44e which are round-chamfered may be formed on corners of axial distal end sides of the rotor opposing portion 44 like the fifth embodiment. As one example thereof, a rotor opposing portion 44 may be formed as shown in FIGS. 59A and 59B. In this example, like the Structure S9, the rotor opposing portion 44 is formed into a trapezoidal shape as viewed from the radial direction, and distal end chamfered portions 44e which are round-chamfered are formed on corners of the axial distal end sides of the rotor opposing portion 44.

Figure 60A:
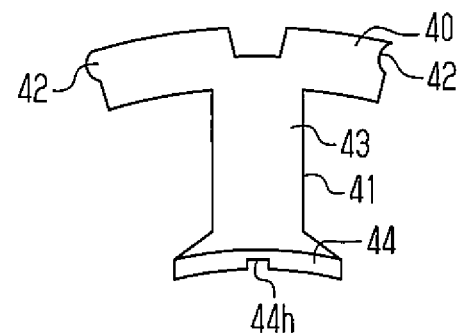
FIG. 60A is a plan view showing a portion of a magnetic plate in another example of the fifth embodiment.
Figure 60B:
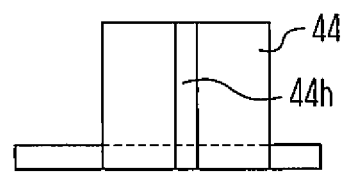
FIG. 60B is a front view showing a portion of the magnetic plate in FIG. 60A.

Although it is not especially mentioned in the fifth embodiment, a slit 44h may be formed in the rotor opposing portion 44 as shown in FIGS. 60A and 60B. According to this structure, it is possible to suppress cogging torque.

Although the distal end chamfered portions 44e are round-chamfered in the fifth embodiment, the invention is not limited to this structure.

Figure 61A:
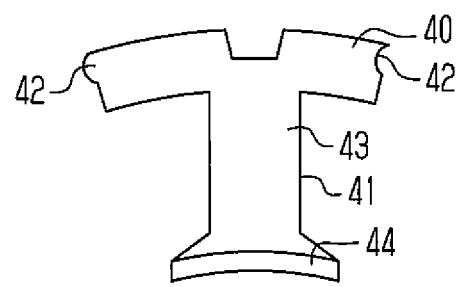
FIG. 61A is a plan view showing a portion of a magnetic plate in another example of the fifth embodiment.
Figure 61B:
FIG. 61B is a front view showing a portion of the magnetic plate in FIG. 61A.

The distal end chamfered portions may not be provided as shown in FIGS. 61A and 61B.

Figure 62A:
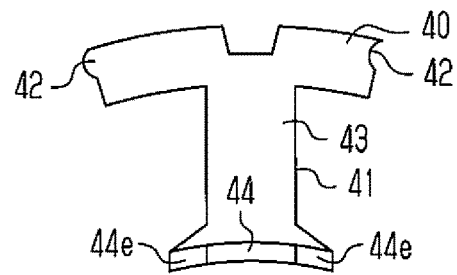
FIG. 62A is a plan view showing a portion of a magnetic plate in another example of the fifth embodiment.
Figure 62B:
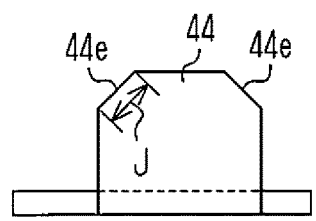
FIG. 62B is a front view showing a portion of the magnetic plate in FIG. 62A.

The distal end chamfered portions 44e may be chamfered as shown in FIGS. 62A and 62B. At this time, each of the distal end chamfered portions 44e is formed such that a length of a side obtained by chamfering is a length J which is two times or more of a wire diameter of the armature winding 22. According to this structure, even if the armature winding 22 comes into contact with the corner (distal end chamfered portion 44e), it is possible to limit damage to the armature winding 22, and to more reliably suppress the breaking of wire of the armature winding 22.

Figure 63:
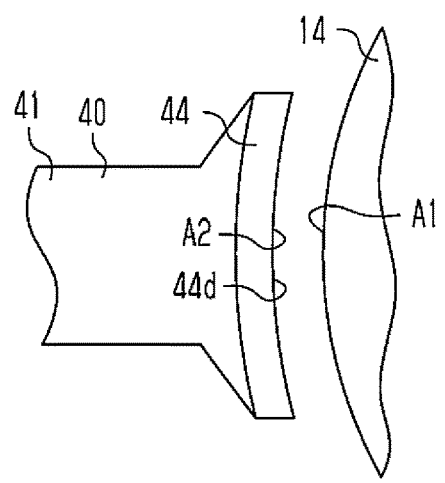
FIG. 63 is a partially enlarged schematic plan view of a motor in another example of the fifth embodiment.

Although it is not especially mentioned in the fifth embodiment and the modifications, as shown in FIG. 63, the rotor opposing surface 44d of the rotor opposing portion 44 may be formed into an arc shape as viewed from the axial direction, and the arc shape may have a curvature A2 which is smaller than a curvature A1 of the outer circumference of the rotor 14. According to this structure, since the rotor opposing surface 44d is separated from the rotor 14 circumferentially outward, it is possible to more reliably reduce cogging torque.

In the fifth embodiment, the stator holding portions 11b and 12b of the frames 11 and 12 directly hold in between the magnetic plate 40 in the axial direction, and the stator holding portions 11b and 12b do not abut against the main core portion 31 in the axial direction, but the invention is not limited to this structure.

The invention claimed is:
1. A motor comprising:
a rotation shaft;
a stator including a stator core and an armature winding, wherein the stator core includes a main core portion, which is formed by a plurality of core sheets stacked in an axial direction of the rotation shaft, and a magnetic plate, which is arranged on an axial end of the main core portion;
a first frame and a second frame respectively arranged on two axial sides of the stator core to hold in between the stator core in the axial direction, the first frame and the second frame rotatably supporting the rotation shaft; and
a rotor opposed to the stator core in a radial direction, wherein the stator core includes an outer circumferential surface exposed to an exterior from between the first frame and the second frame, each of the core sheets includes a tooth formation portion around which the armature winding is wound, the magnetic plate includes a stacked portion, which is stacked on the axial end of the main core portion and which includes an end located toward the rotor, and an axially extending portion, which extends toward an outer side in the axial direction from the end located toward the rotor and which is opposed to the rotor in the radial direction, the first and second frames hold in between the main core portion in the axial direction through the stacked portion of the magnetic plate, at least one of the first frame and the second frame covers a boundary between the magnetic plate and the main core portion, the magnetic plate has a larger thickness than the core sheets, the armature winding includes a projection that projects toward the outer side in the axial direction from the stator core, and the projection is opposed to the axially extending portion through a gap in the radial direction.

2. The motor according to claim 1, wherein
the tooth formation portion extends toward the rotor, and
the tooth formation portion has a circumferential width that decreases toward the rotor.

3. The motor according to claim 1, wherein
the axially extending portion is one of a plurality of axially extending portions,
the axially extending portions are formed so as not to be overlapped in the axial direction with a circumferentially adjacent one of the axially extending portions and also not to be overlapped in the axial direction with the tooth formation portion that is opposed to the circumferentially adjacent one of the axially extending portions.

4. The motor according to claim 1, wherein
the axially extending portion includes a circumferential side inclined relative to the axial direction, and
the circumferential side magnetically skews the axially extending portion in the circumferential direction.

5. The motor according to claim 4, wherein
the stacked portion includes a portion shaped identically to the tooth formation portion, and
the axially extending portion is integrally with the stacked portion and formed by bending a distal side of the stacked portion.

6. The motor according to claim 4, wherein the axially extending portion has a circumferential width that decreases toward the outer side in the axial direction.

7. The motor according to claim 4, wherein
the circumferential side of the axially extending portion is one of two circumferential sides, each including two inclined surfaces,
each of the two inclined surfaces is straight, and
an inclination angle between the two inclined surfaces is smaller than a radiation angle of the tooth formation portion.

8. The motor according to claim 1, wherein the axially extending portion includes at least one of an axial length that varies in the circumferential direction and a radial length that varies in the circumferential direction such that the axially extending portion is magnetically skewed in the circumferential direction.

9. The motor according to claim 1, wherein
the axially extending portion includes a rotor opposing surface having an arcuate shape as viewed in the axial direction, and
the rotor opposing surface has a smaller curvature than an outer circumference of the rotor.

10. The motor according to claim 1, wherein the magnetic plate is one of two magnetic plates, and the two magnetic plates are respectively arranged on two axial sides of the main core portion.

11. The motor according to claim 1, wherein the rotor includes a field magnet formed by a ferrite magnet.

12. The motor according to claim 1, wherein
the stator core includes a plurality of slots extending in the axial direction,
the armature winding is formed by a plurality of segment conductors inserted into the plurality of slots,
the plurality of segment conductors each include projections projecting from the slots in the axial direction,
the projections are electrically connected to each other to form the armature winding, and
each of the projections is laid out to oppose the axially extending portion in the radial direction.

13. The motor according to claim 12, wherein
a chamfered portion is formed on a corner of the stacked portion forming an axial end of the slot.

14. The motor according to claim 1, wherein
the tooth formation portion extends toward the rotor, and
the axially extending portion includes circumferential sides respectively located at two circumferential sides of the axially extending portion and inclined in symmetry relative to the axial direction.

15. The motor according to claim 14, wherein
the axially extending portion is one of a plurality of axially extending portions stacked in the radial direction, and
an inclination angle of the circumferential sides relative to the axial direction increases at locations farther from the rotor.

16. The motor according to claim 1, wherein
the rotor includes a field magnet,
when h represents an axial length of the axially extending portion, t represents a radial length of the axially extending portion, and s represents an axial extending length of the field magnet with respect to the axially extending portion, the magnetic plate and the field magnet are formed to satisfy $$h = t \times K - 0.5\,s,$$

where K is a coefficient, and $0 < K < 6.3$ is satisfied.

17. The motor according to claim 16, wherein the magnetic plate is formed such that the coefficient K satisfies $5.4 < K < 6.3$.

18. The motor according to claim 1, wherein
the rotor includes a rotor core and a field magnet, which is arranged on a surface of the rotor core opposed to the stator,
the rotor core includes a positioning portion that positions the field magnet in the circumferential direction, and
the positioning portion is formed on the rotor core at a position that is not opposed to at least the stacked portion of the magnetic plate in the radial direction.

19. The motor according to claim 18, wherein the positioning portion is formed in at least an axially central portion of the rotor.

20. The motor according to claim 18, wherein the positioning portion is formed in at least at an axial end of the rotor.

21. The motor according to claim 18, wherein
the positioning portion is shaped to have a circumferential width that gradually decreases toward the stator in the radial direction, and
the field magnet includes corners located at two circumferential sides located toward the rotor core in the radial direction, and the corners are shaped in conformance with the positioning portion.

22. The motor according to claim 21, wherein
the corners each include inclined surfaces, and
the inclined surfaces are shaped to be symmetric to a straight line extending through a radial center of the rotation shaft and a circumferential center of the positioning portion.

23. The motor according to claim 18, further comprising a cylindrical cover located between the rotor and the stator in the radial direction,
wherein the field magnet is held between the rotor core and the cylindrical cover in the radial direction and fixed to the rotor core.

24. The motor according to claim 1, wherein the rotor includes a rotor core, and the rotor core includes a plurality of core sheets stacked in the axial direction.

25. The motor according to claim 1, wherein
the stacked portion of the magnetic plate includes a first tooth formation portion,
the stator core includes a tooth that includes the first tooth formation portion stacked in the axial direction with a second tooth formation portion, which is the tooth formation portion of the core sheet,
the tooth is one of a plurality of teeth,
the armature winding is inserted into a slot formed between adjacent ones of the teeth in the circumferential direction,
the first tooth formation portion includes a first radially extending portion, which extends in the radial direction, and a first flange, which projects toward two circumferential sides at an end of the first radially extending portion located toward the rotor,
the second tooth formation portion includes a second radially extending portion, which extends in the radial direction, and a second flange, which projects toward two circumferential sides from an end of the second radially extending portion located toward the rotor, and
the first flange has a radial width that differs from that of the second flange.

26. The motor according to claim 25, wherein the radial width of the second flange is smaller than the radial width of the first flange.

27. The motor according to claim 26, wherein
the first tooth formation portion abuts, in the axial direction, against a boundary of the second radially extending portion and the second flange in the second tooth formation portion, and
the first flange has a larger circumferential width than the boundary in the second tooth formation portion.

28. The motor according to claim 26, wherein a resin molded product fills a void of a second flange at a side opposite to the rotor.

29. The motor according to claim 28, wherein the resin molded product is formed in the stator core through insert molding.

30. The motor according to claim 25, wherein the second radially extending portion has a circumferential width that decreases toward the rotor.

31. The motor according to claim 1, wherein
the stacked portion of the magnetic plate includes a first tooth formation portion,
the stator core includes a tooth that includes the first tooth formation portion stacked in the axial direction with a second tooth formation portion, which is a tooth formation portion of the core sheet,
the tooth is one of a plurality of teeth,
the armature winding is inserted into a slot formed between adjacent ones of the teeth in the circumferential direction,
the first tooth formation portion includes a first radially extending portion, which extends in the radial direction, and a first flange, which projects toward two circumferential sides from an end of the first radially extending portion located toward the rotor, and
the second tooth formation portion includes two circumferential end surfaces, and the two circumferential end surfaces extend straight as viewed in the axial direction from a basal end to a distal end of the second tooth formation portion.

32. The motor according to claim 1, wherein
a slot is formed between adjacent ones of the teeth in the circumferential direction,
the armature winding includes a plurality of segment conductors, and
the segment conductors are arranged in the slot along a line in the radial direction.

33. The motor according to claim 1, wherein the stacked portion of the magnetic plate is swaged and fixed to the core sheet at an axial end of the main core portion.

34. The motor according to claim 1, wherein the stator core includes a plurality of core sections arranged in the circumferential direction, and each of the plurality of core sections includes the tooth formation portion.

35. The motor according to claim 1, wherein the axially extending portion includes an axial distal end that defines a distal end chamfered portion formed by chamfering a corner.

36. The motor according to claim 35, wherein
the distal end chamfered portion is formed by rounding the corner, and
the distal end chamfered portion has a radius of curvature that is two times or greater than that of the armature winding.

37. The motor according to claim 35, wherein
the distal end chamfered portion is formed by linearly chamfering the corner, and
the distal end chamfered portion includes a side obtained when linearly chamfering the corner that has a length that is two times or greater than a diameter of the armature winding.

38. The motor according to claim 1, wherein the axially extending portion includes a slit extending in the axial direction.

39. The motor according to claim 1, wherein the axially extending portion includes a first surface chamfered portion, and the first surface chamfered portion is formed on a corner in two circumferential side surfaces of the axially extending portion at a side opposite to the rotor.

40. The motor according to claim 1, wherein the axially extending portion includes a second surface chamfered portion, and the second surface chamfered portion is formed on a corner of a circumferential end surface of the axially extending portion located toward the rotor.

41. The motor according to claim 1, wherein
the axially extending portion extends in the axial direction by bending at the end of the stacked portion located toward the rotor,
the magnetic plate includes a bent portion located between the stacked portion and the axially extending portion, and the bent portion is thicker than the axially extending portion.

42. The motor according to claim 41, wherein
the bent portion includes an outer surface that forms an arcuate surface, and the center of the arcuate surface is located at a position closer to the axially extending portion than a bisector of the bent portion.

43. A method for manufacturing the magnetic plate according to claim 1, wherein the axially extending portion is extended in the axial direction by bending stacked portion at a location toward the rotor, the method comprising:
a punching step that punches the stacked portion and the axially extending portion prior to bending out of a plate material;
a bending step that bends the axially extending portion in the axial direction after the punching step; and
a constraining-fitting step that constrains a constrained surface, which is part of an outer surface of a bent portion located toward the stacked portion between the stacked portion and the axially extending portion, with a first die and presses the constrained axially extending portion toward the bent portion in the axial direction with a fitting punch.

44. The method according to claim 43, wherein the first die includes a flat surface, which abuts against a plate surface of the stacked portion located at a side opposite to the axially extending portion, and a constraining arcuate surface, which is continuous with the flat surface and constrains the constrained surface of the bent portion.

45. The method according to claim 44, further comprising a fitting step that presses, after the constraining-fitting step, the axially extending portion with the fitting punch toward the bent portion in the axial direction under a condition in which a gap exists between the constrained surface of the bent portion and a second die, which abuts against a plate surface of the stacked portion located at a side opposite to the axially extending portion, wherein
the second die includes a flat surface, which abuts against the plate surface of the stacked portion located at the side opposite to the axially extending portion, and an arcuate surface, which is continuous with the flat surface, opposed through a gap to the outer surface of the bent portion, and recessed toward an opposite side of the bent portion, and
the arcuate surface has a larger radius of curvature than that of the constraining arcuate surface of the first die.

46. The method according to claim 45, wherein the arcuate surface of the second die has a center set at a position on the magnetic plate located closer to the axially extending portion than a bisector of the bent portion.

47. The method according to claim 43, further comprising a fitting step that presses, after the constraining-fitting step, the axially extending portion with the fitting punch toward the bent portion in the axial direction under a condition in which a gap exists between the constrained surface of the bent portion and a second die, which abuts against a plate surface of the stacked portion located at a side opposite to the axially extending portion.

48. The method according to claim 47, wherein the second die includes a surface that is flat and opposed to an outer surface of the bent portion.

49. A method for manufacturing a stator comprising a setting step that sets a magnetic plate manufactured by the manufacturing method according to claim 43 on an axial end surface of the main core portion of the stator core.

50. The motor according to claim 1, wherein the axially extending portion is shaped to be magnetically skewed in a circumferential direction relative to the tooth formation portion and the stacked portion.

* * * * *

UNITED STATES PATENT AND TRADEMARK OFFICE
CERTIFICATE OF CORRECTION

PATENT NO. : 10,164,487 B2
APPLICATION NO. : 14/162536
DATED : December 25, 2018
INVENTOR(S) : Tatsunori Banba et al.

Page 1 of 1

It is certified that error appears in the above-identified patent and that said Letters Patent is hereby corrected as shown below:

On the Title Page

Column 1, Line 6 the Applicant should be corrected to read as follows:
--DENSO CORPORATION--

Signed and Sealed this
Nineteenth Day of February, 2019

Andrei Iancu
*Director of the United States Patent and Trademark Office*